(12) United States Patent
Shimomura et al.

(10) Patent No.: US 8,708,813 B2
(45) Date of Patent: Apr. 29, 2014

(54) NETWORK GAME SYSTEM, GAME APPARATUS, STORAGE MEDIUM STORING PROGRAM, AND GAME CONTROLLING METHOD

(75) Inventors: Masaru Shimomura, Kyoto (JP); Mikhiro Ishikawa, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 1550 days.

(21) Appl. No.: 12/003,931

(22) Filed: Jan. 3, 2008

(65) Prior Publication Data
US 2008/0227552 A1 Sep. 18, 2008

(30) Foreign Application Priority Data
Mar. 13, 2007 (JP) ................................ 2007-063396

(51) Int. Cl.
A63F 13/35 (2014.01)
A63F 13/70 (2014.01)
(52) U.S. Cl.
USPC .............................................. 463/29; 463/42
(58) Field of Classification Search
USPC ............................................... 463/29, 40–42
See application file for complete search history.

(56) References Cited

U.S. PATENT DOCUMENTS

| | | | | |
|---|---|---|---|---|
| 6,510,502 B1* | 1/2003 | Shimizu | ........................ | 711/164 |
| 7,401,150 B2* | 7/2008 | Shea et al. | ..................... | 709/229 |
| 7,593,988 B2* | 9/2009 | Oreizy et al. | ................. | 709/205 |
| 7,664,816 B2* | 2/2010 | Heron et al. | .................. | 709/204 |
| 7,698,447 B2* | 4/2010 | Fujisawa et al. | ............... | 709/230 |
| 8,360,856 B2* | 1/2013 | Ealey | ................................ | 463/24 |
| 2001/0016519 A1* | 8/2001 | Choe | ................................ | 463/42 |
| 2002/0090996 A1 | 7/2002 | Maehiro | | |
| 2005/0026696 A1* | 2/2005 | Hashimoto et al. | .............. | 463/42 |
| 2005/0027382 A1* | 2/2005 | Kirmse et al. | .................. | 700/91 |
| 2006/0199644 A1 | 9/2006 | Hirota | | |
| 2006/0252548 A1 | 11/2006 | Sasaki et al. | | |
| 2007/0055728 A1* | 3/2007 | Shea et al. | ..................... | 709/204 |
| 2007/0105627 A1* | 5/2007 | Campbell | ........................ | 463/40 |
| 2008/0113809 A1* | 5/2008 | David et al. | ..................... | 463/42 |

FOREIGN PATENT DOCUMENTS

JP 2000-035885 2/2000

(Continued)

OTHER PUBLICATIONS

"F.E.A.R. Combat PC game demo," Gameworld Network, (Aug. 17, 2006) (available at http://downloads.gwn.com/downloads/file.php/id/7033/FEAR_Combat.html).*

(Continued)

*Primary Examiner* — Bach Hoang
(74) *Attorney, Agent, or Firm* — Nixon & Vanderhye PC

(57) ABSTRACT

A network game system includes a plurality of game apparatuses, a game server and a network. In the game apparatuses whose players are acquainted with each other, each-other's profile IDs are registered via a game server, and the contents of the registration are managed by the game server. A game apparatus having a released version game program performs a communication game inviting request on the game server while a game apparatus having its trial version game program performs a communication game participating request on the game server. If the game apparatuses are game apparatuses whose each-other's profile IDs are registered, the game server permits a connection to execute a communication game between these game apparatuses.

21 Claims, 32 Drawing Sheets

(56) References Cited

FOREIGN PATENT DOCUMENTS

| | | |
|---|---|---|
| JP | 2002-045573 | 2/2002 |
| JP | 2002-157204 | 5/2002 |
| JP | 2002-336552 | 11/2002 |
| JP | 2003-71138 | 11/2003 |
| JP | 2004-350910 | 12/2004 |
| JP | 2006-260064 | 9/2006 |
| JP | 2006-334386 | 12/2006 |

OTHER PUBLICATIONS

"Sierra Combats F.E.A.R.," GameSpot (Aug. 8, 2006) (available at http://www.gamespot.com/pc/action/fear/news/6155427/sierra-combats-fear).*

"Uncharted Waters Online La Frontera", http://game.watch.impress.co.jp/docs/20060719/dol.htm, May 14, 2012.

* cited by examiner (A) SCHEDULING (B) ACTUAL EXECUTION TIME (C) ACTUAL EXECUTION TIME (A)  GAME FRIEND'S PROFILE ID REGISTRATION SCREEN 420

(B)  OWN-PROFILE ID DISPLAYING SCREEN 440

GAME FRIEND LIST

| FRIEND'S NAME | PROFILE ID |
|---|---|
| HIROSHI | AAAAA |
| TUBASA | BBBBB |
| MAMORU | CCCCC |
| SEIKO | DDDDD |
| MINAKO | EEEEE |
| ⋮ | ⋮ |

COMMUNICATION MATCH-UP SUBMENU SCREEN (RELEASED VERSION) 500

INVITE FRIEND — 502

PARTICIPATE IN COMMUNICATION GAME DURING INVITATION — 504

CANCEL — 506

NETWORK GAME SYSTEM, GAME APPARATUS, STORAGE MEDIUM STORING PROGRAM, AND GAME CONTROLLING METHOD

CROSS REFERENCE OF RELATED APPLICATION

The disclosure of Japanese Patent Application No. 2007-63396 is incorporated herein by reference.

TECHNICAL FIELD

The illustrative embodiments relate to a network game system, a game apparatus, a storage medium storing a game program and a game controlling method. More specifically, certain exemplary embodiments relate to a network game system, a game apparatus, a storage medium storing a game program and a game controlling method for a network game utilizing a plurality of game apparatuses each capable of communicating with a server via a network.

BACKGROUND AND SUMMARY

In a conventional network game system, for example, a player connects to a server from a terminal (computer, game dedicated machine, cellular phone, etc.) via a network, and selects (decides) a partner for a game from other terminals (other players) connected to the server. Then, the player plays a game (match-up game, role playing game, etc.) with the selected partner.

Furthermore, one example of the related art is disclosed in Japanese Patent Application Laid-Open No. 2002-45573 [A63F 13/12, A63F 13/00, G06F 15/00, H04M 3/42, H04M 11/08] laid-open on Feb. 12, 2002. In the network system of this related art, the terminal integrated with a game program to play a go game as a match-up service program is used and connected to a go club server to thereby perform a communication match-up game with another terminal integrated with the match-up service program via the go club server.

However, in the network system of the related art, only the terminal integrated with the match-up service program can be connected to the go club server to receive a provision of service such as performing a communication match-up game. That is, only the terminal having a released game program version can receive a provision of services in the network. Thus, there is a problem of preventing a terminal not integrated with the match-up service program from participating in the communication match-up game. Accordingly, before purchase of the released version game program, it is impossible experience the game.

Therefore, it is a feature of illustrative embodiments to provide a novel network game system, game apparatus, storage medium storing a game program and game controlling method.

Another feature of the illustrative embodiments is to provide a network game system, a game apparatus, a storage medium storing a game program and a game controlling method allowing a player to easily participate in a communication game.

A further feature of the illustrative embodiments is to provide a network game system, a game apparatus, a storage medium storing a game program and a game controlling method capable of playing a communication game between a game apparatus having a released version game program and a game apparatus having its trial version game program.

The illustrative embodiments may employ the following features in order to solve the above-described problems. It should be noted that reference numerals and supplemental references inside the parentheses which show an example of a corresponding relationship with the illustrative embodiments are provided for ease of understanding and are not limiting in any way.

An exemplary embodiment is directed to a network game system utilizing a plurality of game apparatuses each capable of communicating with a server via a network, and out of the plurality of game apparatuses, a first game apparatus having a released version game program for executing a predetermined game and a second game apparatus having a trial version game program corresponding to the released version game program are present. The first game apparatus includes connection accepting means for performing a connection acceptance to permit a connection from the second game apparatus on the server. The second game apparatus includes connection requesting means for performing a connection request to the first game apparatus on the server by executing the trial version game program, connection information receiving means for receiving connection permission information from the server, and communication game processing means for, when the connection permission information is received by the connection information receiving means, performing a communication game on the basis of the trial version game program by making communications with the first game apparatus indicated by the connection permission information. The server includes connection acceptance determining means for determining whether or not the first game apparatus performs a connection acceptance when the connection request is received from the second game apparatus, and connection permission information transmitting means for, when it is determined by the connection acceptance determining means that the connection acceptance is performed, transmitting connection permission information relating to the first game apparatus which at least performs the connection acceptance to the second game apparatus which has preformed the connection request.

In the exemplary embodiment, a network game system (110) uses a plurality of game apparatuses (12) each capable of making a communication with a server (106) via a network (108). Out of the plurality of game apparatuses, a first game apparatus having a released version game program (200) for executing a predetermined game and a second game apparatus having a trial version game program (200') corresponding to the released version game program are present. In the first game apparatus, connection accepting means (40, S171) performs a connection acceptance to permit a connection from the second game apparatus on the server. That is, a player of the first game apparatus invites the partner of the communication game. On the other hand, in the second game apparatus, by execution of the trial version game program, connection requesting means (40, S209) performs a connection request to the first game apparatus on the server. In the server, connection acceptance determining means (S345) determines the first game apparatus performs a connection acceptance when a connection request is received from the second game apparatus ("YES" in the step S342). When it is determined that a connection acceptance is performed by the connection acceptance determining means ("YES" in the step S345), connection permission information transmitting means (S349) transmits connection permission information (IP address of the first game apparatus, for example) relating to the first game apparatus which at least performs the connection acceptance to the second game apparatus which has preformed the connection request. Then, in the second game apparatus, connection information receiving means (40, S211) receives the connection permission information from the server. In the second game apparatus, when the connection permission information is received by the connection information receiving means ("YES" in the step S211), communication game processing means (S215) performs a communication game on the basis of the trial version game program by making communications with the first game apparatus indicated by the connection permission information (S213).

According to the exemplary embodiment, the server notifies a first game apparatus having the released version game program as a connection destination according to a request from the second game apparatus having the trial version game program to performs a communication game between the first game apparatus and the second game apparatus, and therefore, it is possible to easily participate in the communication game by obtaining a trial version game program delivered for free. Furthermore, it is possible to play a communication game between the game apparatus having the released version game program and the game apparatus having the trial version game program.

In an illustrative feature of the exemplary embodiment the plurality of game apparatuses each further includes other machine identification information transmitting means for transmitting identification information to identify at least other game apparatus to the server. The server further includes other machine identification information registering means for writing the identification information received from each of the game apparatuses to an other machine identification information storing area assigned for each of the game apparatuses, and registration determining means for determining whether or not the identification information of the second game apparatus which has performed the connection request is registered in the other machine identification information storing area as to the first game apparatus which performs the connection acceptance when it is determined by the connection acceptance determining means that the connection acceptance is performed. The connection permission information transmitting means transmits the connection permission information to the second game apparatus when it is determined by the registration determining means that the identification information of the second game apparatus is registered.

In illustrative feature of the exemplary embodiment, the game apparatuses may each further include other machine identification information transmitting means (40, S149). The other machine identification information transmitting means transmits identification information (a profile ID assigned for each communication game in this embodiment) for identifying another game apparatus to the server. In the server, other machine identification information registering means (S325) writes the identification information received from each of the game apparatuses to other machine identification information storing area (122) assigned for each of the game apparatuses. Furthermore, in the server, when it is determined that a connection acceptance is performed by the connection acceptance determining means ("YES" in the step S345), registration determining means (S347) determines whether or not the identification information of the second game apparatus which has performed the connection request is registered in the other machine identification information storing area as to the first game apparatus which performs the connection acceptance. That is, it is determined whether or not the first game apparatus registers the identification information of the second game apparatus which at least performs the connection request. Then, the connection permission information transmitting means transmits the connection permission information to the second game apparatus when it is determined by the connection acceptance determining means that the identification information of the second game apparatus is registered by the registration determining means ("YES" in the step S347).

Further according to the illustrative feature of the exemplary embodiment, in a case that it is determined whether or not the identification information of the second game apparatus as a source of the request is registered in the other machine identification information storing area as to the first game apparatus as a destination of the request, and the identification information is registered, connection permission information is transmitted. Thus, if the identification information is privately informed, identification information is talked between acquaintances and friends opponent to thereby play a communication game. Consequently, it is possible to safely participate in a communication game in comparison with a case that a communication game is played between unspecified partners.

Another illustrative feature of the exemplary embodiment, and the server further comprises selection information transmitting means for transmitting the selection information in which the identification information registered in the other machine identification information storing area as to the second game apparatus is at least made selectable on the side of the second game apparatus to the second game apparatus when the server accepts the connection request from the second game apparatus, and identification information receiving means for receiving the identification information notified from the second game apparatus. The second game apparatus further includes selection information receiving means for receiving the selection information, and connection partner notifying means for notifying to the server the identification information of the first game apparatus selected on the basis of the selection information received by the selection information receiving means. The registration determining means determines whether or not the identification information of the second game apparatus which has notified the identification information is registered in the other machine identification information storing area as to the first game apparatus indicated by the identification information received by the identification information receiving means.

The illustrative feature of the exemplary embodiment further may include, selection information transmitting means (S339) of the server creates selection information (an individual request's state list in this embodiment) in which the identification information registered in the other machine identification information storing area as to the second game apparatus is at least made selectable on the side of the second game apparatus (S337) when accepting a connection request from the second game apparatus, and transmits it to the second game apparatus. In the second game apparatus, selection information receiving means (40, 5203) receives the selection information, and connection partner notifying means (40, S209) notifies the identification information of the first game apparatus selected on the basis of the selection information to the server. Then, in the server, identification information receiving means (S341) receives the identification information notified from the second game apparatus. Then, the registration determining means determines whether or not the identification information of the second game apparatus which has notified the identification information is registered in the other machine identification information storing area as to the first game apparatus indicated by the identification information received by the identification information receiving means.

According to the illustrative feature of the exemplary embodiment, in the second game apparatus, a first game apparatus is selected on the basis of the selection information, so that it is possible to select a player such as an acquaintance, a friend, and then participate in a communication game safely.

A further illustrative feature of the exemplary embodiment where the server further includes connection state setting means for setting a connection state of the first game apparatus to a connectable state when receiving a connection acceptance from the first game apparatus, setting a connection state of the second game apparatus to a connection requesting state when receiving a connection request from the second game apparatus, and the selection information further includes a connection state of another game apparatus, and the second game apparatus further includes other machine information displaying means for displaying another game apparatus and a connection state of the other game apparatus on the basis of the selection information.

In the illustrative feature of the exemplary embodiment, the server further includes connection state setting means (S329, S333). The connection state setting means sets a connection state of the first game apparatus to a connectable state (the partner of the communication game is invited in this embodiment) when receiving a connection acceptance from the first game apparatus ("YES" in the step S327). Furthermore, the connection state setting means sets a connection state (participation in the communication game during inviting is requested in this embodiment) of the second game apparatus to a connection requesting state when receiving a connection request from the second game apparatus ("YES" in the step S331). For example, the selection information includes a connection state of another game apparatus. In the second game apparatus, other machine information displaying means (40, S205) displays another game apparatus and a connection state of the other game apparatus on the basis of the selection information.

According to the illustrative feature of the exemplary embodiment, a connection state of another game apparatus is displayed, so that the player of the second game apparatus can easily select a desired first game apparatus.

In an additional illustrative feature of the exemplary embodiment the identification information further includes game kind information for identifying a kind of a game, the connection requesting means transmits own identification information to the server as the connection request, the selection information transmitting means transmits the selection information in which the identification information including game kind information the same as the game kind information included in the identification information transmitted from the connection requesting means and registered in the other machine identification information storing area as to the second game apparatus is at least made selectable on the side of the second game apparatus to the second game apparatus.

In the illustrative feature of the exemplary embodiment, the identification information includes game kind information (a game code or an application ID in this embodiment) for identifying a kind of a game. Furthermore, the connection requesting means transmits identification information of its own (second game apparatus) as a connection request to the server. Then, in the server, the identification information (connection request) from the connection requesting means (second game apparatus) is received. In the server, the selection information transmitting means creates the selection information in which the identification information including game kind information the same as the game kind information included in the identification information transmitted from the connection requesting means and registered in the other machine identification information storing area as to the second game apparatus is at least made selectable on the side of the second game apparatus. Then, the created selection information is transmitted to the second game apparatus.

According to the illustrative feature of the exemplary embodiment, selection information depending on the kind of the game is transmitted, and therefore, in a case that the server intermediates between the plurality of kinds of communication games, a player can participate in a desired communication game.

An illustrative feature of the exemplary embodiment may include, and the trial version game program is a communication game processing program being a part of the released version game program.

In the illustrative feature of the exemplary embodiment, the trial version game program is a communication game processing program (212a, 212b, 212d, 212e, 220b, 220c) being a part of the released version game program.

According to the illustrative feature of the exemplary embodiment, without having the released version game program, it is possible to play a communication game with a player having the released version game program by executing the trial version game program.

A further exemplary embodiment is a game apparatus capable of communicating with a server via a network, comprises: connection requesting means for performing a connection request to another game apparatus having a released version game program corresponding to a trial version game program on the server by executing the trial version game program; connection information receiving means for receiving connection permission information from the server; and communication game processing means for, when connection permission information is received by the connection information receiving means, performing a communication game on the basis of the trial version game program by making communications with the other game apparatus indicated by the connection permission information.

In the exemplary embodiment it is possible to easily participate in the communication game.

An exemplary embodiment is a storage medium storing a game program of a game apparatus capable of communicating with a server via a network, the game program being a trial version game program and, by executing the trial version game program, causing a computer of the game apparatus to function as connection requesting means for performing a connection request to another game apparatus having a released version game program corresponding to the trial version game program on the server, connection information receiving means for receiving connection permission information from the server, and communication game processing means for, when the connection permission information is received by the connection information receiving means, performing a communication game by making communications with the other game apparatus indicated by the connection permission information.

In the exemplary embodiment it is possible to easily participate in the communication game.

Another exemplary embodiment is a game controlling method of a game apparatus capable of communicating with a server via a network including following steps of: (a) performing a connection request to another game apparatus having a released version game program corresponding to a trial version game program by executing the trial version game program on the server, (b) receiving connection permission information from the server, and (c) performing a communication game on the basis of the trial version game program by making communications with the other game apparatus indicated by the connection permission information when the connection permission information is received by the step (b).

In the exemplary embodiment it is possible to easily participate in the communication game.

The above described, features, aspects and advantages of the illustrative embodiments will become more apparent from the following detailed description of the illustrative embodiments when taken in conjunction with the accompanying drawings.

DETAILED DESCRIPTION

Figure 1:
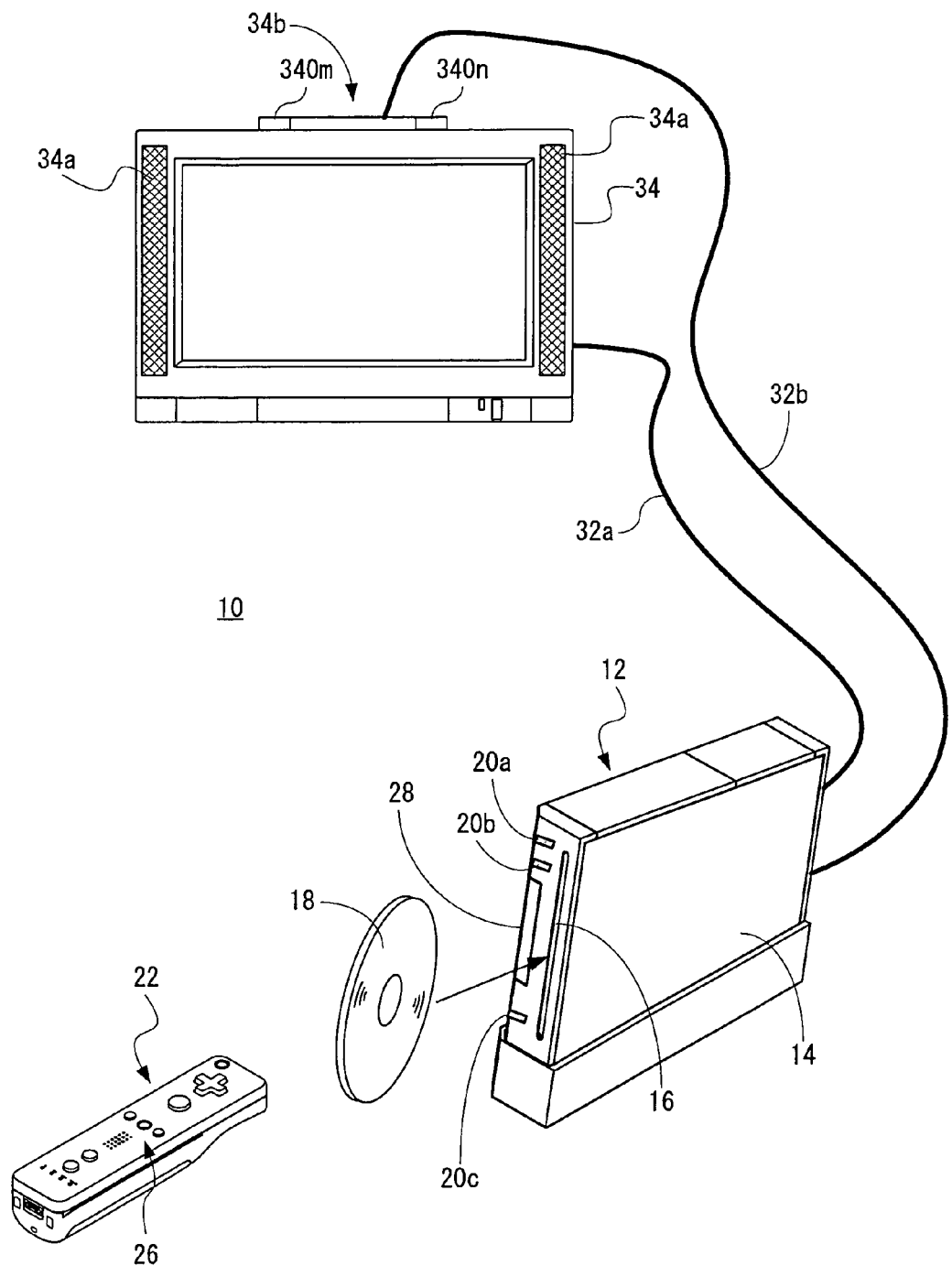
FIG. 1 is an illustrative view showing one embodiment of a game system.

Referring to FIG. 1, a game system 10 of illustrative embodiment includes a video game apparatus (hereinafter simply referred to as "game apparatus") 12 and a controller 22. Although the illustration is omitted, the game apparatus 12 in this embodiment is designed so as to be communicably connectable with a maximum of four controllers 22. Also, the game apparatus 12 and the respective controllers 22 are connected by radio. For example, wireless communication is executed according to Bluetooth (registered trademark) standard, and may be executed by other standards, such as infrared rays and wireless LAN. Alternatively, they may be connected by a wire.

The game apparatus 12 includes a roughly rectangular parallelepiped housing 14, and the housing 14 is provided with a disk slot 16 on a front surface. An optical disk 18 as one example of an information storage medium storing game program, etc. is inserted into the disk slot 16 to be loaded in a disk drive 54 (see FIG. 2) within the housing 14. Around the disk slot 16, an LED and a light guide plate are arranged to allow the disk slot 16 to be turned on or off in response to various processing.

Furthermore, on a front surface of the housing 14 of the game apparatus 12, a power button 20a and a reset button 20b are provided at the upper part thereof, and an eject button 20c is provided below them. In addition, a connector cover for external memory card 28 is provided between the reset button 20b and the eject button 20c, and in the vicinity of the disk slot 16. Inside the connector cover for external memory card 28, an external connector for memory card 62 (see FIG. 2) is provided, through which an external memory card (hereinafter simply referred to as a "memory card") not shown is inserted. The memory card is employed for loading the game program, etc. read from the optical disk 18 to temporarily store it, storing (saving) game data (result data or proceeding data of the game) of the game played by means of the game system 10, and so forth. It should be noted that storing the game data described above may be performed on an internal memory, such as a flash memory 44 (see FIG. 2) inside the game apparatus 12 in place of the memory card. Also, the memory card may be utilized as a backup memory of the internal memory. In addition, in the game apparatus 12, other application except for the game may be executed, and in such a case, data of the other application can be stored in the memory card.

It should be noted that as a memory card, a general-purpose SD card can be employed, but other general-purpose memory cards may also be used. Examples may include, but are not limited to, memory sticks or multimedia cards (registered trademark).

Although omitted in FIG. 1, the game apparatus 12 has an AV cable connector 58 (FIG. 2) on the rear surface of the housing 14, and by utilizing the AV cable connector 58, a monitor 34 and a speaker 34a are connected to the game apparatus 12 through an AV cable 32a. The monitor 34 and the speaker 34a are typically a color television receiver, and through the AV cable 32a, a video signal from the game apparatus 12 is input to a video input terminal of the color television, and a sound signal is input to a sound input terminal. Accordingly, a game image of a three-dimensional (3D) video game, for example, is displayed on the screen of the color television (monitor) 34, and stereo game sound, such as game music, sound effects, etc. is output from right and left speakers 34a. Around the monitor 34 (on the top side of the monitor 34, in this embodiment), a marker unit 34b including two infrared ray LEDs (markers) 34m and 34n is provided. The marker unit 34b is connected to the game apparatus 12 through a power source cable 32b. Accordingly, the marker unit 34b is supplied with power from the game apparatus 12. Thus, the markers 34m and 34n emit lights in front of the monitor 34.

Furthermore, the power of the game apparatus 12 is applied by means of a general AC adapter (not illustrated). The AC adapter is inserted into a standard wall socket for home use, and the game apparatus 12 transforms the house current (commercial power supply) to a low DC voltage signal suitable for driving. In another embodiment, a battery may be utilized as a power supply.

In the game system 10, a user or a player turns the power of the game apparatus 12 on for playing the game (or applications other than the game). Then, the user selects an appropriate optical disk 18 storing a program of a video game (or other applications the player may want to play), and loads the optical disk 18 into the disk drive 54 of the game apparatus 12. In response thereto, the game apparatus 12 starts to execute a video game or other applications on the basis of the program recorded in the optical disk 18. The user operates the controller 22 in order to apply an input to the game apparatus 12. For example, by operating any one of the input means 26, a game or other application is started. Besides the operation on the input means 26, by moving the controller 22 itself, it is possible to move a moving image object (player object) in different directions or change the perspective of the user (camera position) in a 3-dimensional game world.

It should be noted that programs of video games and other applications are stored (installed) in an internal memory (flash memory 42 (see FIG. 2)) of the game apparatus 12, and executed from the internal memory. In such a case, a program stored in a storage medium like an optical disk 18, or the like may be installed onto the internal memory, and the downloaded program may be installed onto the internal memory.

Figure 2:
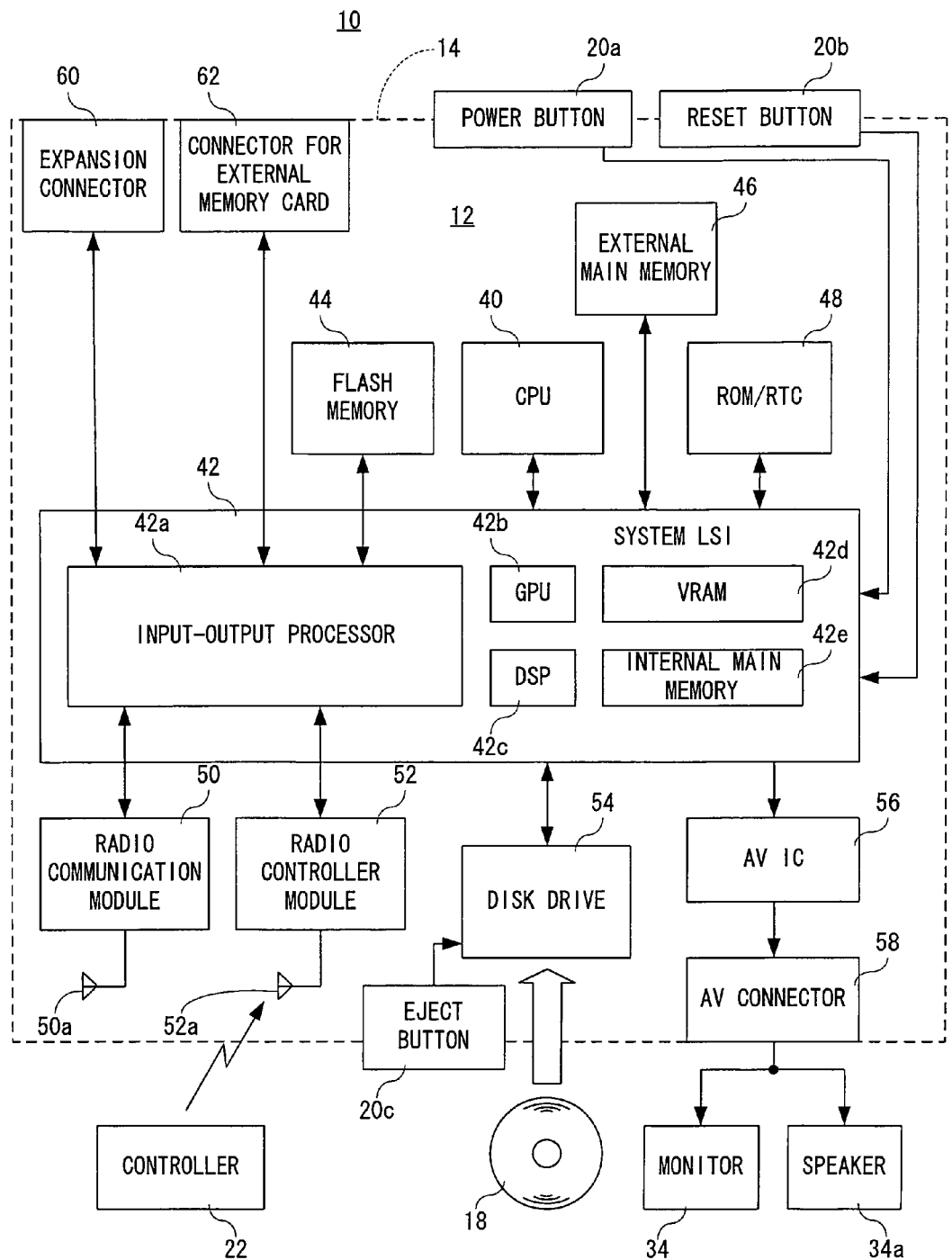
FIG. 2 is a block diagram showing an electric configuration of a game system shown in FIG. 1.

FIG. 2 is a block diagram of an electric configuration of the video game system 10 in FIG. 1's embodiment. Although illustration is omitted, the respective components within the housing 14 are mounted on a printed board. As shown in FIG. 2, the game apparatus 12 has a CPU 40, and functions as a game processor. The CPU 40 is connected with a system LSI 42. The system LSI 42 is connected with an external main memory 46, a ROM/RTC 48, a disk drive 54, and an AV IC 56.

The external main memory 46 is utilized as a work area and a buffer area of the CPU 40 by storing programs like a game program, etc. and various data. The ROM/RTC 48, which is so-called boot ROM, is incorporated with a program for activating the game apparatus 12, and is provided with a time circuit for counting time. The disk drive 54 reads program data, texture data, etc. from the optical disk 18, and writes it in an internal main memory 42e described later or the external main memory 46 under the control of the CPU 40.

The system LSI 42 is provided with an input-output processor 42a, a GPU (Graphics Processor Unit) 42b, a DSP (Digital Signal Processor) 42c, a VRAM 42d and an internal main memory 42e, and these are connected with each other by internal buses although illustration is omitted.

The input-output processor (I/O processor) 42a executes transmission and reception of data, downloads of data, and so forth. The transmission and reception of the data and download of the data are described later in detail.

The GPU 42b is made up of a part of a rendering means, and receives a graphics command (construction command) from the CPU 40 to generate game image data according to the command. Additionally, the CPU 40 applies an image generating program required for generating game image data to the GPU 42b in addition to the graphics command.

Although illustration is omitted, the GPU 42b is connected with the VRAM 42d as described above. The GPU 42b accesses the VRAM 42d to acquire the data (image data: data such as polygon data, texture data, etc.) required to execute the construction command. Additionally, the CPU 40 writes the image data required for drawing to the VRAM 42d via the GPU 42b. The GPU 42b accesses the VRAM 42d to create game image data for drawing.

In this embodiment, a description is made on a case that the GPU 42b generates game image data, but in a case of executing an arbitrary application except for the game application, the GPU 42b generates image data as to the arbitrary application.

Furthermore, the DSP 42c functions as an audio processor, and generates audio data corresponding to a sound, a voice, music, or the like by means of the sound data and the sound wave (tone) data stored in the internal main memory 42e and the external main memory 46.

The game image data and audio data generated as described above are read by the AV IC 56, and output to the monitor 34 and the speaker 34a via the AV connector 58. Accordingly, a game screen is displayed on the monitor 34, and a sound (music) necessary for the game is output from the speaker 34a.

Furthermore, the input-output processor 42a is connected with an expansion connector 60 and a connector for memory card 62 as well as a flash memory 44, a radio communication module 50 and a radio controller module 52. The radio communication module 50 is connected with an antenna 50a, and the radio controller module 52 is connected with an antenna 52a.

The input-output processor 42a can communicate with other game apparatuses and various servers to be connected to a network via a radio communication module 50. It should be noted that it is possible to directly communicate with another game apparatus without going through the network. The input-output processor 42a periodically accesses the flash memory 44 to detect the presence or absence of data (referred to as transmission data) being required to be transmitted to a network, and, in a case that the transmission data is present, transmits it to the network via the radio communication module 50 and the antenna 50*a*. Furthermore, the input-output processor 42*a* receives data (referred to as reception data) transmitted from another game apparatuses via the network, the antenna 50*a* and the radio communication module 50, and stores the reception data in the flash memory 44. If the reception data does not satisfy a predetermined condition, the reception data is abandoned. In addition, the input-output processor 42*a* receives data (download data) downloaded from the download server (104, 106 shown in FIG. 8) via the network, the antenna 50*a* and the radio communication module 50, and stores the download data in the flash memory 44.

Furthermore, the input-output processor 42*a* receives input data transmitted from the controller 22 via the antenna 52*a* and the radio controller module 52, and (temporarily) stores it in the buffer area of the internal main memory 42*e* or the external main memory 46. The input data is erased from the buffer area after being utilized in processing by the CPU 40 (game processing, for example).

In this embodiment, as described above, the radio controller module 52 makes communications with the controller 22 in accordance with Bluetooth standards.

In addition, the input-output processor 42*a* is connected with the expansion connector 60 and the connector for memory card 62. The expansion connector 60 is a connector for interfaces, such as USB, SCSI, etc., and can be connected with medium such as an external storage, and peripheral devices such as another controller other than the controller 22. Furthermore, the expansion connector 60 is connected with a cable LAN adaptor, and can utilize the cable LAN in place of the radio communication module 50. The connector for memory card 62 can be connected with an external storage like a memory card. Thus, for example, the input-output processor 42*a* accesses the external storage via the expansion connector 60 and the connector for memory card 62 to store and read the data.

Although a detailed description is omitted, as shown in FIG. 1, the game apparatus 12 (housing 14) is furnished with the power button 20*a*, the reset button 20*b*, and the eject button 20*c*. The power button 20*a* is connected to the system LSI 42. When the power button 20*a* is turned on, the system LSI 42 set in a mode of a normal energized state in which the respective components of the game apparatus 12 are supplied with power through an AC adapter not shown (referred to as "normal mode"). On the other hand, when the power button 20*a* is turned off, the system LSI 42 is set to a mode in which a part of the components of the game apparatus 12 is supplied with power, and the power consumption is reduced to minimum (hereinafter referred to as "standby mode").

In this embodiment, in a case that the standby mode is set, the system LSI 42 issues an instruction to stop supplying the power to the components except for the input-output processor 42*a*, the flash memory 44, the external main memory 46, the ROM/RTC 48, the radio communication module 50, and the radio controller module 52. Accordingly, in this embodiment, the CPU 40 never executes an application in stand-by mode.

Although the system LSI 42 is supplied with power even in standby mode, supply of clocks to the GPU 42*b*, the DSP 42*c* and VRAM 42*d* are stopped so as not to be driven, realizing reduction in power consumption.

Although illustration is omitted, inside the housing 14 of the game apparatus 12, a fan is provided for excluding heat of the IC, such as the CPU 40, the system LSI 42, etc. to outside. In the standby mode, the fan is also stopped.

However, in a case that the standby mode is not desired, when the power button 20*a* is turned off, the power supply to all the circuit components is completely stopped by making the standby mode unusable.

Furthermore, switching between the normal mode and the standby mode can be performed by turning on and off the power switch 26*h* of the controller 22 by remote control. If the remote control is not performed, setting is made such that the power supply to the radio controller module 52*a* is not performed in the standby mode.

The reset button 20*b* is also connected with the system LSI 42. When the reset button 20*b* is pushed, the system LSI 42 restarts the activation program of the game apparatus 12. The eject button 20*c* is connected to the disk drive 54. When the eject button 20*c* is pushed, the optical disk 18 is removed from the disk drive 54.

Figure 3:
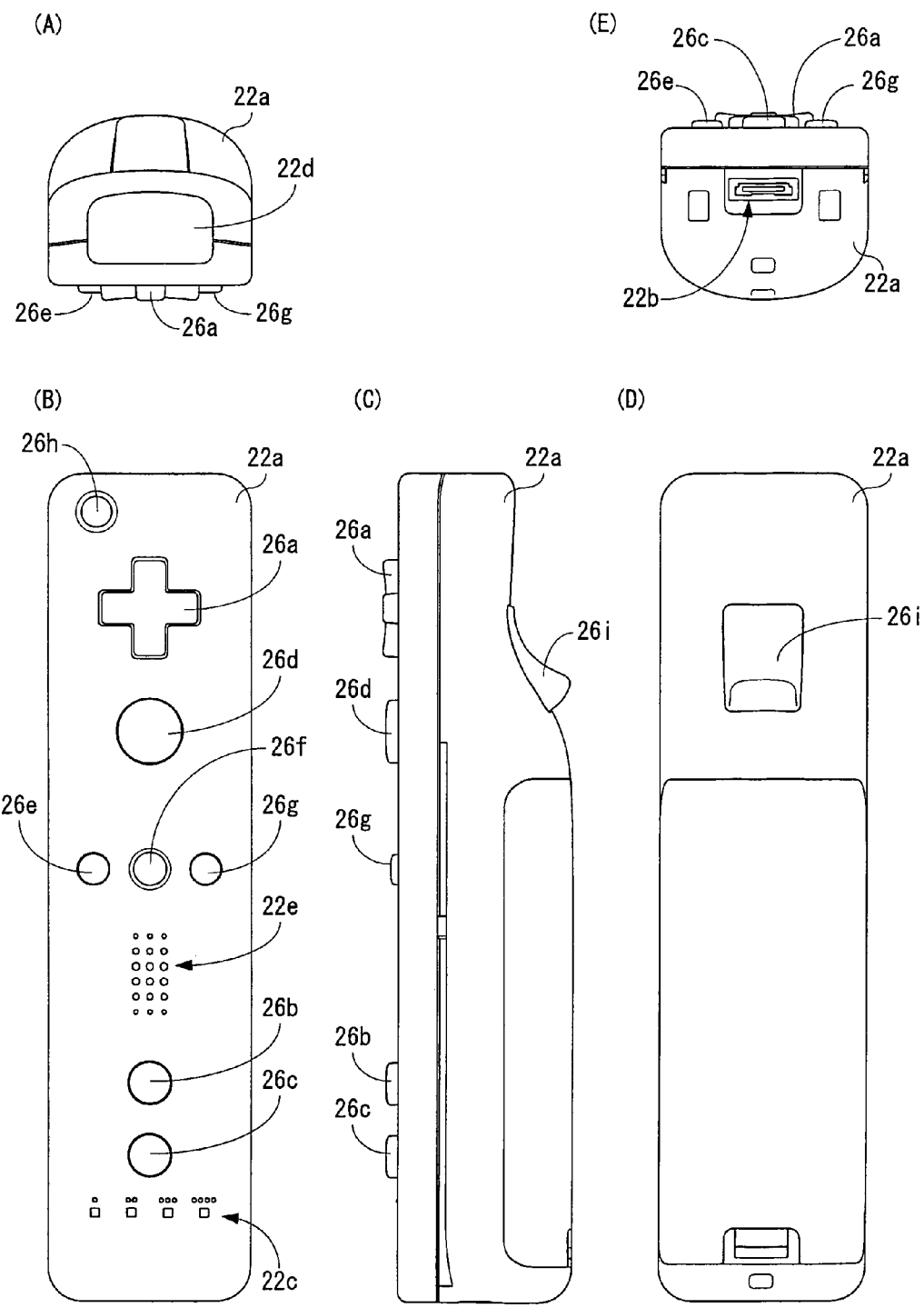
FIG. 3 is an illustrative view explaining an appearance of a controller shown in FIG. 1.

Each of FIG. 3 (A) to FIG. 3 (E) shows one example of an external appearance of the controller 22. FIG. 3 (A) shows a front end surface of the controller 22, FIG. 3 (B) shows a top surface of the controller 22, FIG. 3 (C) shows a right side surface of the controller 22, FIG. 3 (D) shows a lower surface of the controller 22, and FIG. 3 (E) shows a back end surface of the controller 22.

Referring to FIG. 3 (A) and FIG. 3 (E), the controller 22 has a housing 22*a* formed by plastic molding, for example. The housing 22*a* is formed into an approximately rectangular parallelepiped shape and has a size small enough to be held by one hand of a user. The housing 22*a* (controller 22) is provided with the input means (a plurality of buttons or switches) 26. Specifically, as shown in FIG. 3 (B), on an upper face of the housing 22*a*, there is provided a cross key 26*a*, a 1 button 26*b*, a 2 button 26*c*, an A button 26*d*, a −button 26*e*, a HOME button 26*f*, a +button 26*g* and a power switch 26*h*. Moreover, as shown in FIG. 3 (C) and FIG. 3 (D), an inclined surface is formed on a lower surface of the housing 22*a*, and a B-trigger switch 26*i* is formed on the inclined surface.

The cross key 26*a* is a four directional push switch, including four directions of front (or upper), back (or lower), right and left operation parts. By operating any one of the operation parts, it is possible to instruct a moving direction of a character or object (player character or player object) that is be operable by a player or instruct the moving direction of a cursor.

The 1 button 26*b* and the 2 button 26*c* are respectively push button switches, and are used for a game operation such as adjusting a viewpoint position and a viewpoint direction on displaying the 3D game image, i.e. a position and an image angle of a virtual camera. Alternatively, the 1 button 26*b* and the 2 button 26*c* can be used for the same operation as that of the A-button 26*d* and the B-trigger switch 26*i* or an auxiliary operation.

The A-button switch 26*d* is the push button switch, and is used for causing the player character or the player object to take an action other than that instructed by a directional instruction, specifically arbitrary actions such as hitting (punching), throwing, grasping (acquiring), riding, and jumping, etc. For example, in an action game, it is possible to give an instruction to jump, punch, move a weapon, and so forth. Also, in a roll playing game (RPG) and a simulation RPG, it is possible to instruct to acquire an item, select and determine the weapon and command, and so forth. Furthermore, the A button switch 26*d* is used for instructing decision of an icon or a button image pointed by the pointer (instruction image) on the game screen. For example, when the icon and the button image are decided, an instruction or a command (command of the game) set in advance corresponding thereto can be input.

The −button 26e, the HOME button 26f, the +button 26g, and the power supply switch 26h are also push button switches. The −button 26e is used for selecting a game mode. The HOME button 26f is used for displaying a game menu (menu screen). The +button 26g is used for starting, re-starting, or pausing a game. The power supply switch 26h is used for turning on/off a power supply of the game apparatus 12 by remote control.

In this embodiment, note that the power supply switch for turning on/off the controller 22 itself is not provided, and the controller 22 is set at on-state by operating any one of the switches or buttons of the input means 26 of the controller 22, and when not operated for a certain period of time (30 seconds, for example) or more, the controller 22 is automatically set at off-state.

The B-trigger switch 26i is also the push button switch, and is mainly used for inputting a trigger such as shooting and designating a position selected by the controller 22. In a case that the B-trigger switch 26i is continued to be pushed, it is possible to make movements and parameters of the player object constant. In a fixed case, the B-trigger switch 26i functions in the same way as a normal B-button, and is used for canceling the action or the command determined by the A-button 26d.

As shown in FIG. 3 (E), an external expansion connector 22b is provided on a back end surface of the housing 22a, and as shown in FIG. 3 (B), an indicator 22c is provided on the top surface and the side of the back end surface of the housing 22a. The external expansion connector 22b is utilized for connecting another expansion controller not shown different from the controller 22. The indicator 22c is made up of four LEDs, for example, and shows identification information (controller number) of the controller 22 by lighting any one of the four LEDs and depending on the lighted LED, and the indicator 22c shows the remaining amount of power of the controller 22 depending on the number of LEDs to be emitted.

In addition, the controller 22 has an imaged information arithmetic section 80 (see FIG. 4), and as shown in FIG. 3 (A), on the front end surface of the housing 22a, light incident opening 22d of the imaged information arithmetic section 80 is provided.

Furthermore, the controller 22 has a speaker 86 (see FIG. 4), and the speaker 86 is provided inside the housing 22a at the position corresponding to a sound release hole 22e between the 1 button 26b and the HOME button 26f on the tope surface of the housing 22a as shown in FIG. 3 (B).

Note that as shown in FIG. 3 (A) to FIG. 3 (E), the shape of the controller 22 and the shape, number and setting position of each input means 26 are simply illustrative examples, and needless to say may be suitably modified for the illustrative embodiments.

Figure 4:
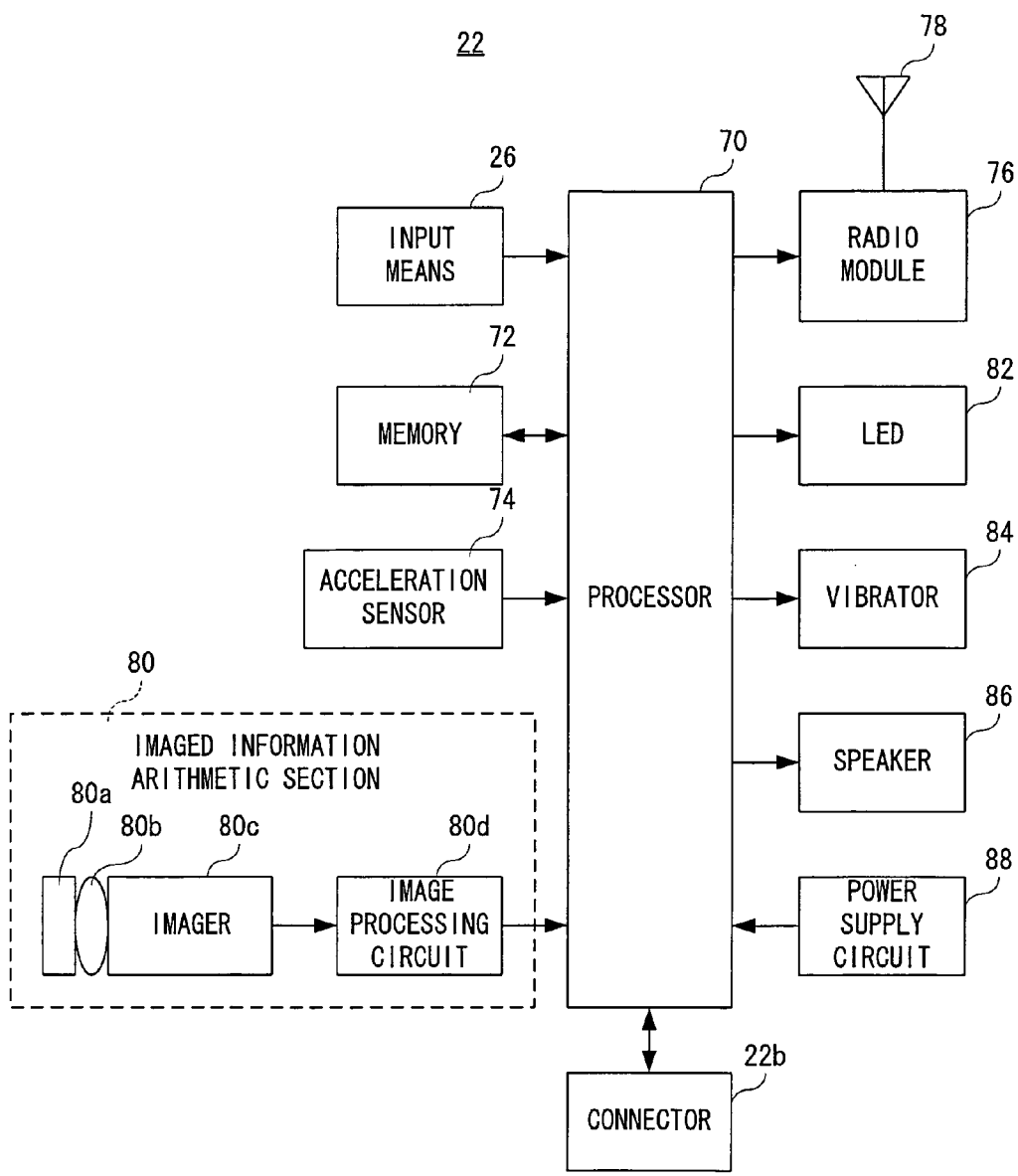
FIG. 4 is a block diagram showing an electric configuration of the controller shown in FIG. 3.

FIG. 4 is a block diagram showing an electric configuration of the controller 22. Referring to FIG. 4, the controller 22 includes a processor 70, and the processor 70 is connected with the external expansion connector 22b, the input means 26, a memory 72, an acceleration sensor 74, a radio module 76, the imaged information arithmetic section 80, an LED 82 (the indicator 22c), a vibrator 84, a speaker 86, and a power supply circuit 88 by an internal bus (not shown). Moreover, an antenna 78 is connected to the radio module 76.

It should be noted that although omitted in FIG. 4, the indicator 22c is made up of four LEDs 82 as described above.

The processor 70 is in charge of an overall control of the controller 22, and transmits (inputs) information (input information) inputted by the input means 26, the acceleration sensor 74, and the imaged information arithmetic section 80 as input data to the game apparatus 12 via the radio module 76 and the antenna 78. At this time, the processor 70 uses the memory 72 as a working area or a buffer area. An operation signal (operation data) from the aforementioned input means 26 (26a to 26i) is inputted to the processor 70, and the processor 70 stores the operation data once in the memory 72.

Moreover, the acceleration sensor 74 detects each acceleration of the controller 22 in directions of three axes of vertical direction (y-axial direction), lateral direction (x-axial direction), and forward and rearward directions (z-axial direction). The acceleration sensor 74 is typically an acceleration sensor of an electrostatic capacity type, but the acceleration sensor of other type may also be used.

For example, the acceleration sensor 74 detects the accelerations (ax, ay, and az) in each direction of x-axis, y-axis, z-axis for each first predetermined time, and inputs the data of the acceleration (acceleration data) thus detected to the processor 70. For example, the acceleration sensor 74 detects the acceleration in each direction of the axes in a range from −2.0 g to 2.0 g (g indicates a gravitational acceleration. The same thing can be the hereafter.) The processor 70 detects the acceleration data given from the acceleration sensor 74 for each second predetermined time, and stores it in the memory 72 once.

The processor 70 creates input data including at least one of the operation data, acceleration data and marker coordinate data as described later, and transmits the input data thus created to the game apparatus 12 for each third predetermined time (5 msec, for example).

In this illustrative embodiment, although omitted in FIG. 3 (A) to FIG. 3 (E), the acceleration sensor 74 is provided inside the housing 22a and in the vicinity on the circuit board where the cross key 26a is arranged.

It will be appreciated by those skilled in the art from the description of this specification that a computer, such as a processor (CPU 40, for example) of the game apparatus 12 or the processor (processor 70, for example) of the controller 22 executes processing on the basis of an acceleration signal output from the acceleration sensors 74, and whereby, more information relating to the controller 22 can be estimated or calculated (determined).

The controller is incorporated with the single axis acceleration sensor 74, for example, and in a case that processing is executed on the side of the computer assuming that the controller 22 is in a static state, that is, processing is executed considering that accelerations detected by the acceleration sensor 74 is only gravitational accelerations, if the controller 22 is actually in a static state, it is possible to know whether or not the orientations of the controller 22 is inclined with respect to the direction of gravity or to what extent they are inclined on the basis of the detected acceleration. More specifically, when a state in which the detection axis of the acceleration sensor 74 is directed to a vertically downward direction is taken as a reference, merely whether or not 1G (gravitational acceleration) is imposed on can show whether or not the controller 22 is inclined, and the size can show to what extent it is inclined.

Furthermore, if a multi-axes acceleration sensor 74 is mounted on the controller 22, by further performing processing on an acceleration signal of each axis, it is possible to more precisely know to what extent the controller 22 is inclined with respect to the direction of gravity. In this case, on the basis of outputs from the acceleration sensor 74, the processor 70 may perform processing of calculating data of inclined angle of the controller 22, but perform processing of estimating an approximate inclination on the basis of the outputs from the acceleration sensor 74 without performing the processing of calculating the data of the inclined angle.

Thus, by using the acceleration sensor 74 in conjunction with the processor 70, it is possible to determine an inclination, an orientation or a position of the controller 22.

On the other hand, assuming that the acceleration sensor 74 is in a dynamic state, accelerations according to the movement of the acceleration sensor 74 is detected in addition to the gravitational acceleration component, and therefore, if the gravitational acceleration component is removed by predetermined processing, it is possible to know a moving direction, etc. More specifically, in a case that the controller 22 being furnished with the acceleration sensor 74 is accelerated and moved by the hand of the user, acceleration data generated by the acceleration sensor 74 is processed, and whereby, it is possible to calculate various movements and/or positions of the controller 22.

Additionally, even when assuming that the acceleration sensor 74 is in a dynamic state, if an acceleration in correspondence with the movement of the acceleration sensor 74 is removed by the predetermined processing, it is possible to know the inclination with respect to the direction of gravity. In another embodiment, the acceleration sensor 74 may contain a built-in signal processing apparatus or other kinds of dedicated processing apparatuses for performing desired processing on the acceleration signal (acceleration data) output from the incorporated acceleration detecting means before outputting the acceleration signal to the processor 70. For example, in a case that the acceleration sensor 74 is one for detecting a static acceleration (gravitational acceleration, for example), the built-in or dedicated processing apparatuses may be one for transforming the detected acceleration signal into the inclined angle (or other preferable parameters) corresponding thereto.

The radio module 76 modulates a carrier of a predetermined frequency by the input data, by using a technique of Bluetooth, for example, and emits its weak radio wave signal from the antenna 78. Namely, the input data is modulated to the weak radio wave signal by the radio module 76 and transmitted from the antenna 78 (controller 22). The weak radio wave signal is received by the radio controller module 52 provided to the aforementioned game apparatus 12. The weak radio wave thus received is subjected to demodulating and decoding processing. This makes it possible for the game apparatus 12 (CPU 40) to acquire the input data from the controller 22. Then, the CPU 40 performs processing of an application (game processing), following the input data and the program (game program).

In addition, as described above, the controller 22 is provided with the imaged information arithmetic section 80. The imaged information arithmetic section 80 is made up of an infrared ray filter 80a, a lens 80b, an imager 80c, and an image processing circuit 80d. The infrared ray filter 80a passes only infrared rays from the light incident from the front of the controller 22. As described above, the markers 340m and 340n placed near (around) the display screen of the monitor 34 are infrared LEDs for outputting infrared lights forward the monitor 34. Accordingly, by providing the infrared ray filter 80a, it is possible to image the image of the markers 340m and 340n more accurately. The lens 80b condenses the infrared rays passing thorough the infrared ray filter 80a to emit them to the imager 80c. The imager 80c is a solid imager, such as, for example, a CMOS sensor and a CCD, and images the infrared rays condensed by the lens 80b. Accordingly, the imager 80c images only the infrared rays passing through the infrared ray filter 80a to generate image data. Hereafter, the image imaged by the imager 80c is called an "imaged image". The image data generated by the imager 80c is processed by the image processing circuit 80d. The image processing circuit 80d calculates a position of an object to be imaged (markers 340m and 340n) within the imaged image, and outputs each coordinate value indicative of the position to the processor 70 as imaged data (marker coordinates data to be described later) for each fourth predetermined time. It should be noted that a description of the process in the image processing circuit 80d is made later.

Figure 5:
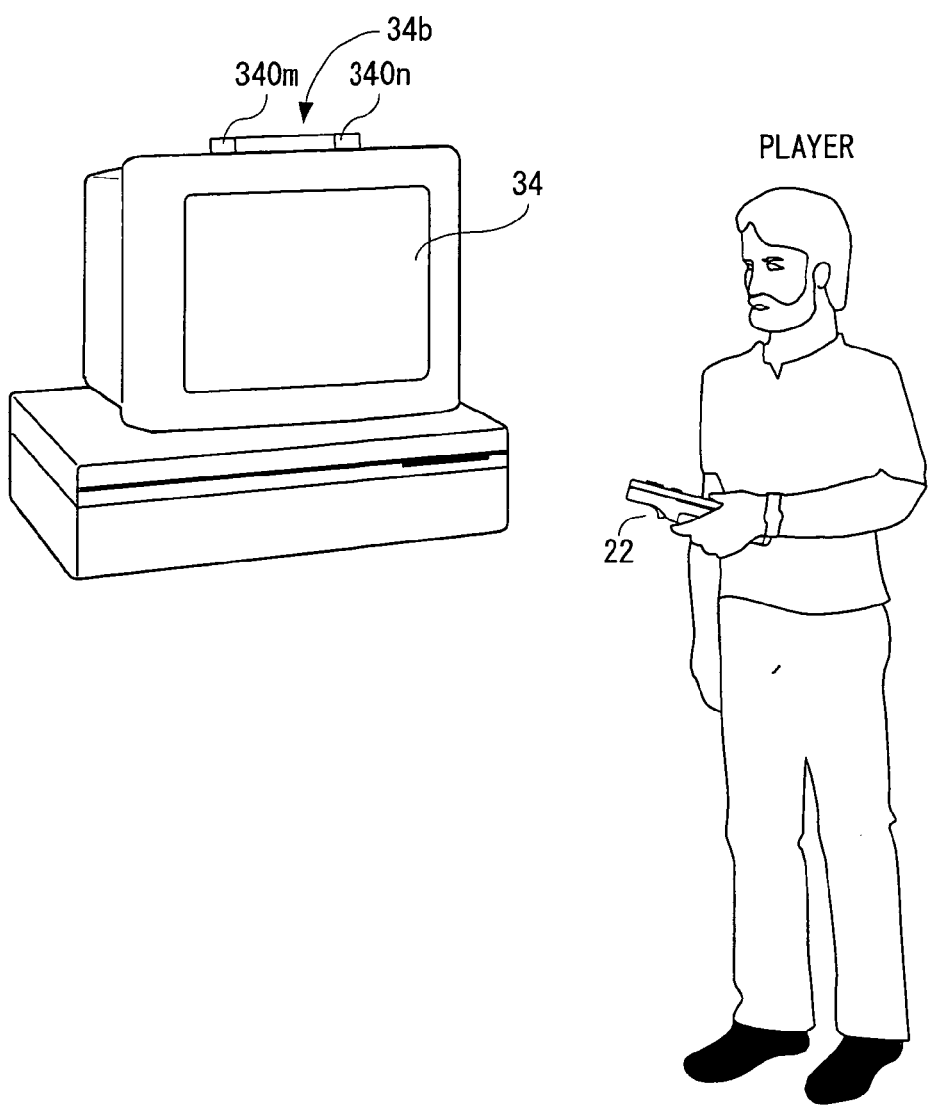
FIG. 5 is an illustrative view roughly explaining a state in which a game is played by utilizing the controller shown in FIG. 1.

FIG. 5 is an illustrative view summarizing a state when a player plays a game by utilizing a controller 22. As shown in FIG. 5, when playing the game by means of the controller 22 in the video game system 10, the player holds the controller 22 with one hand. Strictly speaking, the player holds the controller 22 in a state that the front end surface (the side of the incident light opening 22d of the light imaged by the imaged information arithmetic section 80) of the controller 22 is oriented to the markers 340m and 340n. It should be noted that as can be understood from FIG. 1, the markers 340m and 340n are placed in parallel with the horizontal direction of the screen of the monitor 34. In this state, the player performs a game operation by changing a position on the screen indicated by the controller 22 and changing a distance between the controller 22 and each of the markers 340m and 340n.

Figure 6:
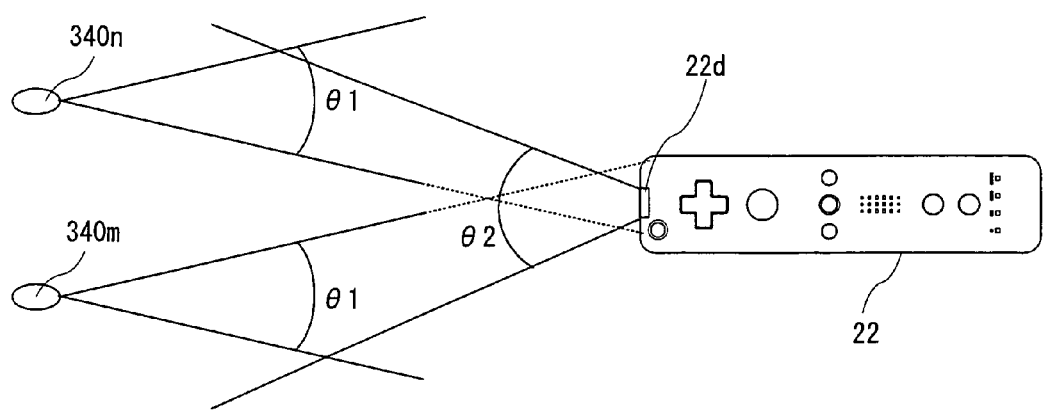
FIG. 6 is an illustrative view explaining viewing angles of markers and the controller shown in FIG. 1.

FIG. 6 is a view showing viewing angles between the respective markers 340m and 340n, and the controller 22. As shown in FIG. 6, each of the markers 340m and 340n emits infrared rays within a range of a viewing angle θ1. Also, the imager 80c of the imaged information arithmetic section 80 can receive incident light within the range of the viewing angle θ2 taking the line of sight of the controller 22 as a center. For example, the viewing angle θ1 of each of the markers 340m and 340n is 34° (half-value angle) while the viewing angle θ2 of the imager 80c is 41°. The player holds the controller 22 such that the imager 80c is directed and positioned so as to receive the infrared rays from the markers 340m and 340n. More specifically, the player holds the controller 22 such that at least one of the markers 340m and 340n exists in the viewing angle θ2 of the imager 80c, and the controller 22 exists in at least one of the viewing angles θ1 of the marker 340m or 340n. In this state, the controller 22 can detect at least one of the markers 340m and 340n. The player can perform a game operation by changing the position and the orientation of the controller 22 in a range satisfying the state.

If the position and the orientation of the controller 22 are out of the range, the game operation based on the position and the orientation of the controller 22 cannot be performed. Hereafter, the above-described range is called an "operable range."

Figure 7:
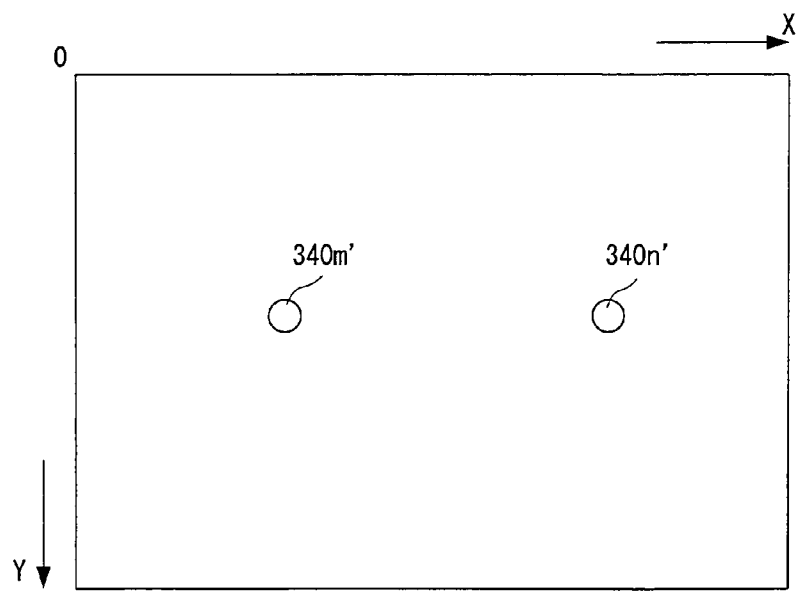
FIG. 7 is an illustrative view showing one example of an imaged image including object images.

If the controller 22 is held within the operable range, an image of each of the markers 340m and 340n is imaged by the imaged information arithmetic section 80. That is, the imaged image obtained by the imager 80c includes an image (object image) of each of the markers 340m and 340n as an object to be imaged. FIG. 7 is a view showing one example of the imaged image including an object image. The image processing circuit 80d calculates coordinates (marker coordinates) indicative of the position of each of the markers 340m and 340n in the imaged image by utilizing the image data of the imaged image including the object image.

Since the object image appears as a high-intensity part in the image data of the imaged image, the image processing circuit 80d first detects the high-intensity part as a candidate of the object image. Next, the image processing circuit 80d determines whether or not the high-intensity part is an object image on the basis of the size of the detected high-intensity part. The imaged image may include images other than the object image due to sunlight through a window and light of a fluorescent lamp in the room as well as the images 340*m*' and 340*n*' corresponding to the two markers 340*m* and 340*n* as an object image. The determination processing whether or not the high-intensity part is an object image is executed for discriminating the images 340*m*' and 340*n*' of the two markers 340*m* and 340*n* as an object image from the images other than them, and accurately detecting the object image. More specifically, in the determination process, it is determined whether or not the detected high-intensity part is within the size of the preset predetermined range. Then, if the high-intensity part is within the size of the predetermined range, it is determined that the high-intensity part represents the object image. On the contrary, if the high-intensity part is not within the size of the predetermined range, it is determined that the high-intensity part represents the images other than the object image.

In addition, as to the high-intensity part which is determined to represent the object image as a result of the above-described determination processing, the image processing circuit 80*d* calculates the position of the high-intensity part. More specifically, the barycenter position of the high-intensity part is calculated. Here, the coordinates of the barycenter position are called a "marker coordinate". Also, the barycenter position can be calculated with more detailed scale than the resolution of the imager 80*c*. Now, the resolution of the imaged image imaged by the imager 80*c* shall be 126×96, and the barycenter position shall be calculated with the scale of 1024×768. That is, the marker coordinate is represented by the integer from (0, 0) to (1024, 768).

Additionally, the position in the imaged image shall be represented by a coordinate system (XY coordinate system) taking the upper left of the imaged image as an origin point, the downward direction as an Y-axis positive direction, and the right direction as an X-axis positive direction.

Also, if the object image is properly detected, two high-intensity parts are determined as an object image by the determination process, and therefore, two marker coordinates are calculated. The image processing circuit 80*d* outputs data indicative of the calculated two marker coordinates. The data (marker coordinate data) of the output marker coordinates is included in the input data by the processor 70 as described above, and transmitted to the game apparatus 12.

The game apparatus 12 (CPU 40) detects the marker coordinate data from the received input data to thereby calculate an instructed position (instructed coordinate) by the controller 22 on the screen of the monitor 34 and a distances from the controller 22 to each of the markers 340*m* and 340*n* on the basis of the marker coordinate data. More specifically, from the position of the mid point of the two marker coordinates, a position to which the controller 22 faces, that is, an instructed position is calculated. The distance between the object images in the imaged image is changed depending on the distance between the controller 22 and each of the markers 340*m* and 340*n*, and therefore, the game apparatus 12 can grasp the distance between the controller 22 and each of the markers 340*m* and 340*n* by calculating the distance between the two marker coordinates.

Figure 8:
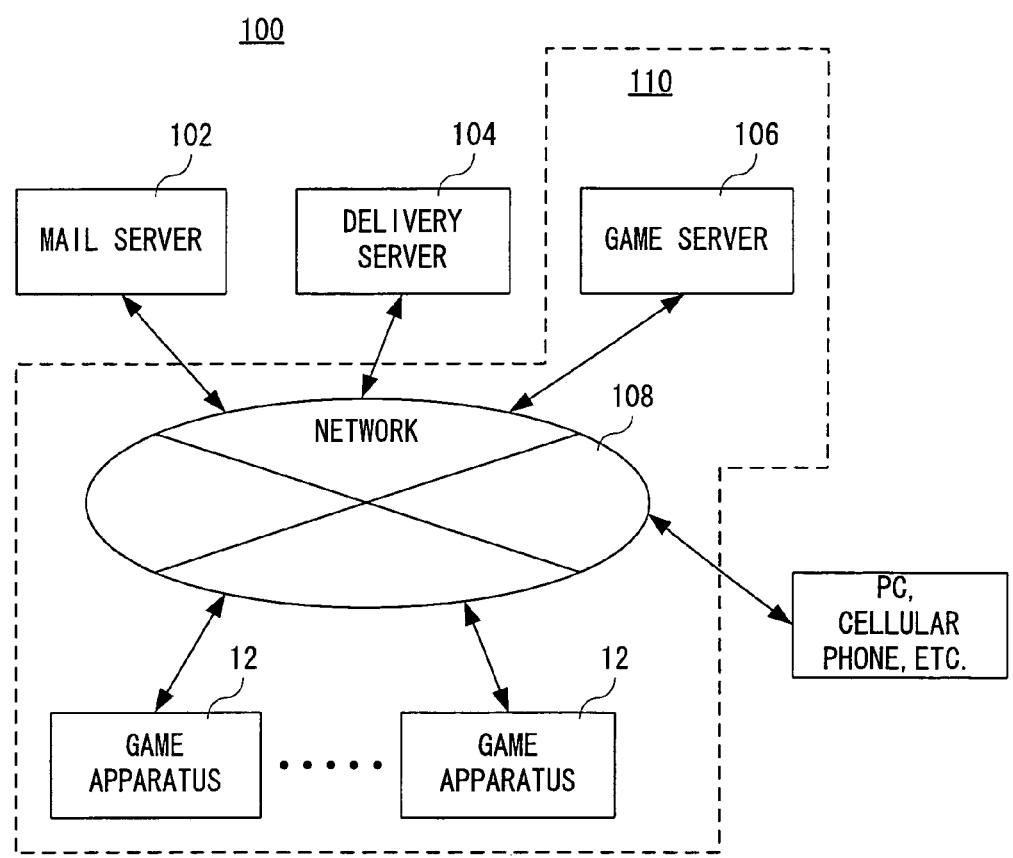
FIG. 8 is an illustrative view showing one example of a communication system.

FIG. 8 is an illustrative view showing one example of a communication system 100 (including the network game system 110) by utilizing the above-described game apparatus 12. As shown in FIG. 8, the communication system 100 includes a plurality of game apparatuses 12, and the respective game apparatuses 12 are connected to a mail server 102, a delivery server 104 and a game server 106 via a network 108 such as the Internet, a LAN, etc. By being connected to such the network 108, it becomes possible to perform transmitting and receiving of messages via the mail server 102 and download of data from the delivery server 104 or the game server 106.

It should be noted that although a description is made on a case that a plurality of game apparatuses 12 are connected to the network 108 in this illustrative embodiment, since the communication game is played by two or more game apparatuses 12, and therefore, at least two game apparatuses 12 may be connected to the network 108. Furthermore, a plurality of delivery servers 104 may be provided depending on the kind of the download data (content). In addition, a plurality of game servers 106 may be provided depending on the kind of the game. As described later, in this embodiment, the game server 106 functions as a server delivering a game program. It should be noted that another server delivering a game program may be provided independent of the game server 106. For example, the delivery server 104 may deliver the game program.

In addition, the network 108 is also connected with a PC and a cellular phone via a cellular phone network. Other various electronic appliances can be connected to the network 108 to perform transmitting and receiving of messages with the game apparatus 12 via the mail server 102.

The game apparatuses 12 are capable of communicating with each other via the network 108. A message input by a player and a message generated by a game apparatus 12 is transformed into an electronic mail format so as to be transmitted and received (exchanged) between the game apparatuses 12 via the network 106 and the mail server 108. Thus, as a mail server 102, it is possible to use versatile mail servers. Thus, the game apparatus 12 can transmit and receive messages, i.e., electronic mails with terminals (terminal except for other game apparatuses 12), such as a PC, a cellular phone. Such message transmitting and receiving process in the game apparatus 12 is automatically executed according to a predetermined schedule without the user issuing a transmitting and receiving instruction, and therefore, the user can play a game or other applications with a message held without periodically checking the mail by itself. Furthermore, the game apparatus 12 can perform transmitting and receiving of messages only with a game apparatus 12 or other terminals except for the game apparatus 12 (hereinafter, simply referred to as "other terminal") whose destination is registered in the address book (friend list 44*d* described later), which prevents the user from receiving unnecessary messages like "spam" even by utilizing versatile mail systems.

The game apparatus 12 can execute a message board function being an application for displaying the received message on the monitor 34. The message specific to the other application (game, etc.) and the data to be utilized by only the application are made readable in only the application. Thus, in a case that a message has to be transmitted to only the specific user, if data dependent on an individual application is included in the message and transmitted, it can be made in a format unreadable by the message board function. However, irrespective of the kind of the application, a referable message is displayed by the message board function on the monitor 34 so as to be referred (read) by anyone.

The message board function is an application having a function to display a received message on the monitor 34, and displays a message acquired from the network 108. Additionally, a message created for the user as well as the message received from other game apparatuses 12 and other terminals can similarly be displayed. Therefore, in a case that the game apparatus 12 is not connected to the network 108, the message board function can be used as a message board for home use and a personal note pad, and a record created by an application like a game, etc. can be browsed by the message board function afterward. At this time, if the message created in the game apparatus 12 is stored in a format similar to that of the message acquired from the network 108 (electronic mail format in the embodiment) in the same area, there is no need to separately prepare processing for display. For example, at a time of creating notes or messages, data is converted into an electronic mail format, or in the game program processing, data in an electronic mail format may be created.

Figure 9:
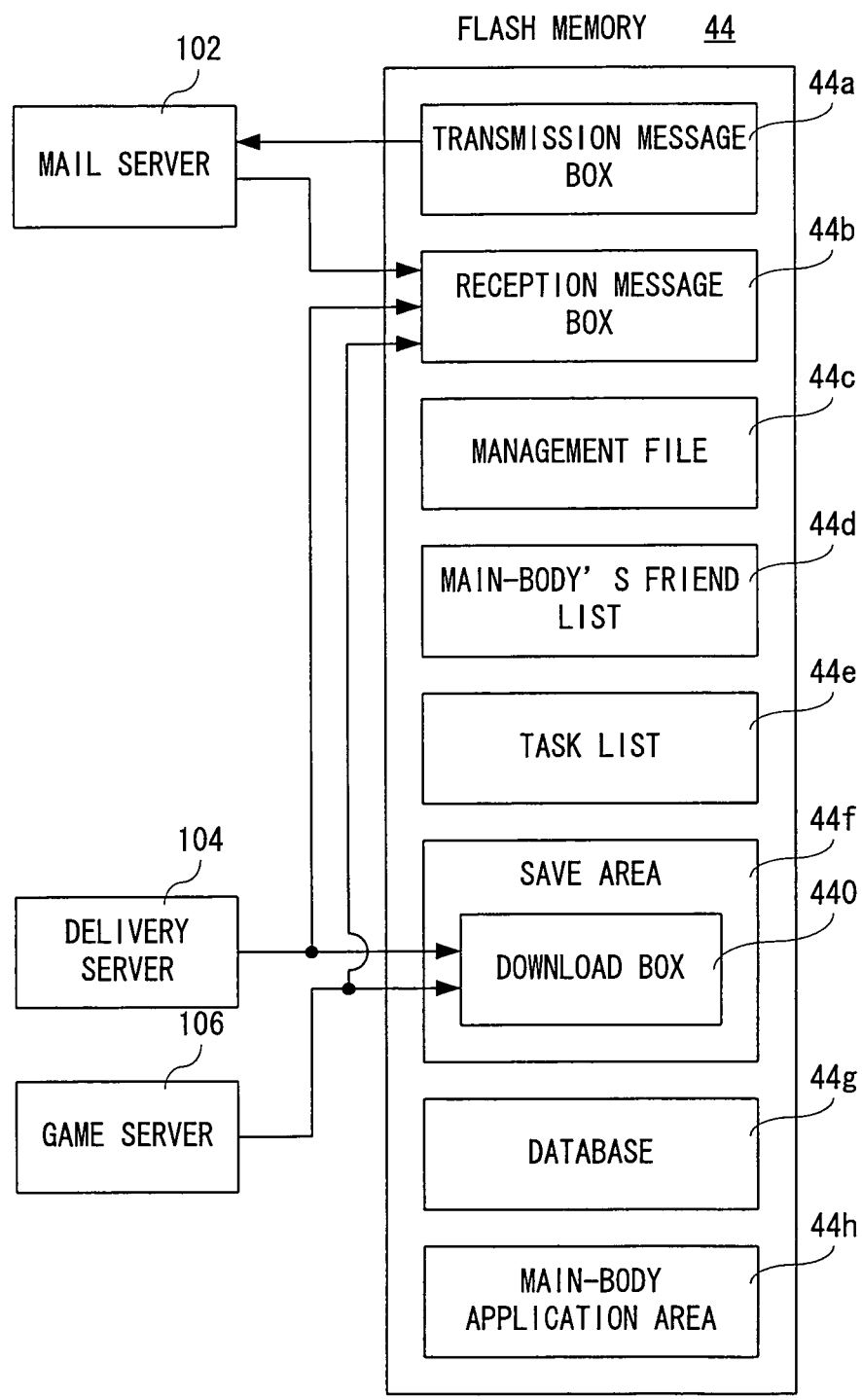
FIG. 9 is an illustrative view schematically showing memory areas of a flash memory integrated in the game apparatus.

FIG. 9 is an illustrative view diagrammatically showing a configuration of data stored in the flash memory 44 integrated in the game apparatus 12. By utilizing FIG. 9, the outline of message transmitting, receiving processing, and download processing in this illustrative embodiment are explained.

Additionally, the download processing described in FIG. 9 is executed by the input-output processor 42a according to a task, but may be executed by the CPU 40 in accordance with an instruction from the player as described later.

The game apparatus 12 performs transmitting and receiving of messages with the mail server 102, downloading data from the delivery server 104 or the game server 106, and two kinds of the communication processing. The message transmitting and receiving process and the download processing according to a task (see FIG. 10) are executed by the input-output processor 42a.

The flash memory 44 includes a transmission message box 44a, a reception message box 44b, a management file 44c, a main-body's friend list 44d, a task list 44e, a save area 44f, a database 44g and a main-body application area 44h.

The transmission message box 44a is an area for storing a message in an electronic mail format (regarding as transmission data) to other game apparatus 12 and other terminals from the game apparatus 12. As understood from FIG. 9, the transmission data is transmitted to the mail server 102. Accordingly, the game apparatus 12 can transmit a message to other game apparatus 12 via the mail server 102 and the network 108. The input-output processor 42a referrers to the transmission message box 44a on the basis of a predetermined schedule (every ten minutes, for example), and transmits, if transmission data is stored, the stored transmission data to the network 108. When the transmission data is transmitted to the network 108, the transmission data is deleted from the transmission message box 44a.

Thus, since the transmission of the electronic mail is performed independent of an application by the input-output processor 42a, in the application executed by the CPU 40, such as the message board function, the game, etc., by merely performing processing of creating a message and then recording the message in an electronic mail format in the transmission message box 44a, it is possible to transmit the message to the network 108.

It should be noted that in this embodiment, more versatile data in an electronic mail format is transmitted and received with a mail server 102, but the data is not limited to the electronic mail format, and a variety of formats may be utilized. Especially, in a case that communication is limited to the communication between the game apparatuses 12, there is no need to be a versatile format, and even if a transmission with another terminal, a format, which can be executed in the other terminal, can be applied. Any server other than the mail server 102 which retains the electronic mail message until access is made from the terminal receiving the electronic mail can be applied.

Furthermore, in a case that a transmission function of the game apparatus 12 is stopped for some reason, or in a case that a communication failure occurs, transmitting the transmission data is not performed, and an excess volume of data in the transmission message box 44a may occur. In such a case, registering the transmission message in the transmission message box 44a is not accepted.

The reception message box 44b is an area for storing a message in an electronic mail format ("reception data") received from other game apparatus 12, other terminal, and the delivery server 104. As understood from FIG. 9, the reception data is transmitted from the mail server 102, the delivery server 104 and the game server 106. The input-output processor 42a accesses the mail server 102 on the basis of a predetermined schedule (for every ten minutes, for example) to confirm whether or not a new arriving e-mail is present in the mail server 102, and if a new arriving e-mail is present, the new arriving e-mail is received so as to be stored in the reception message box 44b as reception data. In the reception message box 44b, the reception data is held until it is opened (utilized) and deleted by an application, or the reception message box 44b is full. It should be noted that when the reception message box 44b becomes full, every time that new reception data is received, the reception data is deleted from the oldest one. In a case that the game apparatus 12 is in a normal mode, the reception data held in the reception message box 44b is moved to a database 44g according to the header information except for one attached with the data depending on an application, such as game data, and is readable by the message board function.

It should be noted that the reception data from the mail server 102 is a message from other game apparatus 12 and other terminal. The reception data from the delivery server 104 and the game server 106 is a message like a notice to a plurality of users from an administrator, etc. of the delivery server 104 and the game server 106. For example, from the administrator, etc. of the delivery server 104 and the game server 106, a message, such as information of the latest game application (game software) and information of an event in the game are transmitted (notified). A detailed description of storing data received from the delivery server 104 and the game server 106 in the reception message box 44b is made later.

The management file 44c is management information on the game apparatus 12, and stores information specific to the game apparatus 12, such as identification information of the game apparatus 12, a profile of the user, etc. which may be read as necessary. Although a detailed description is omitted, as a profile of the user, identification information of the user (including a profile ID described later) to be assigned for each application by execution of the application is applied.

The main-body's friend list 44d corresponds to a so-called address book of electronic mail, in which identification information (or mail address) of registered other game apparatuses 12 and mail addresses of other terminals are described. The main-body's friend list 44d can be referred from various applications as well as when the message board function is executed.

The task list 44e is a list of tasks representing a schedule for downloading data from the delivery server 104 and the game server 106, and stores a task registered in advance for the game apparatus 12 and a task arbitrarily registered by the user. Each of the tasks are executed to allow execution of the download processing. It should be noted that in this embodiment one task can be registered in one application.

Figure 10:
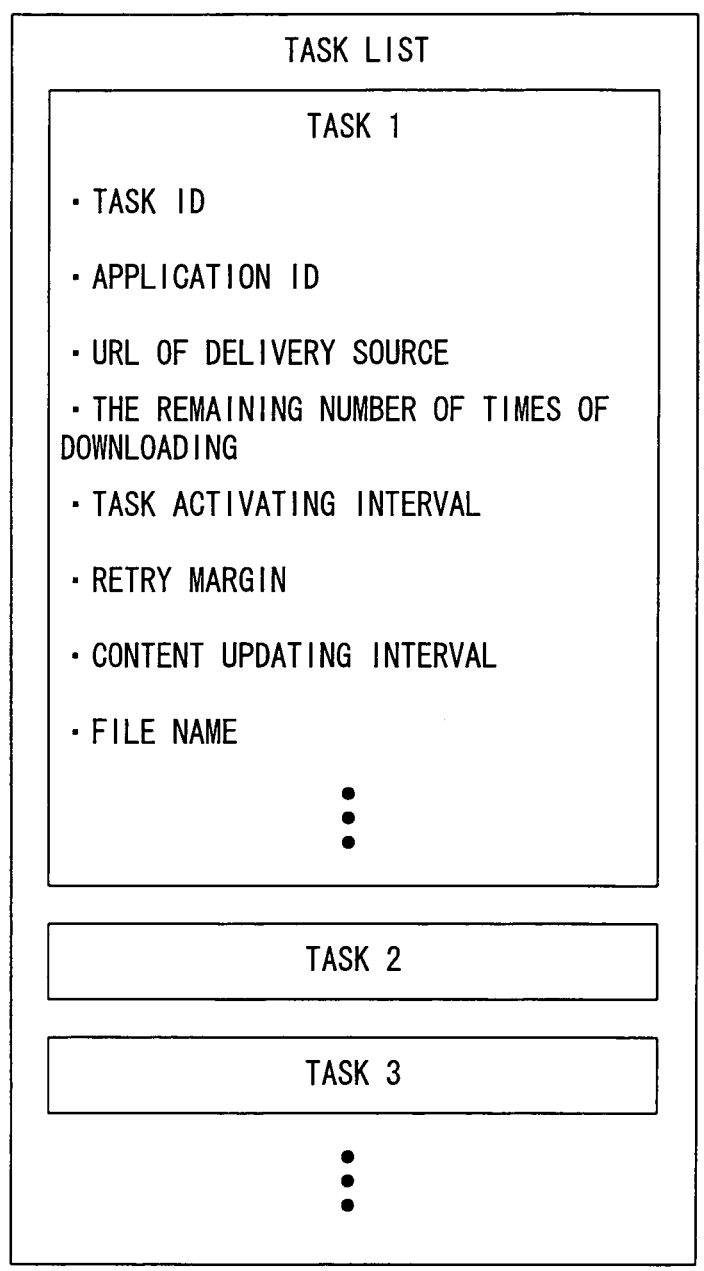
FIG. 10 is an illustrative view showing one example of a task list of download in this embodiment.

FIG. 10 shows one example of attribute information included in each task. One task includes identification information of a task (task ID), identification information of an application (application ID), a URL of a delivery source, the remaining number of times of downloading, a task activating interval, a retry margin, a content updating interval, and a file name.

The task ID is an ID for uniquely identifying a task. The application ID is an ID for uniquely identifying an application in which a task is registered. The application ID is determined in correspondence with the application which performs a task registering process.

The URL of the delivery source indicates the place of the delivery source (delivery server 104 and game server 106), and includes a file name of the download data. The URL of the delivery source is set by the user, and automatically set by the application.

The remaining number of times of downloading indicates a download executable count. In this embodiment, when the game apparatus 12 (input-output processor 42*a*) transmits a connection request (request) to the network 108 (delivery server 104 and the game server 106) for downloading download data, the remaining number of times of downloading may be subtracted by 1. Then, when the remaining number of times of downloading is 0, the task is deleted from the task list 44*e* to make the task unexecutable. By setting the remaining number of times of downloading, it is possible to perform delivery of the download data at a necessary time, capable of preventing useless download processes from continuously being executed even when the delivery of the download is not needed.

The task activating interval is a time interval of executing a task, and specifically means a time (period) from execution of a task to execution of a next task. It should be noted that at a time of a task being registered, a next task executable time is determined by taking the registered time as a reference. The task activating interval is set by a user, and automatically set in correspondence with the kind of the download data (content).

The retry margin is an allowable time when an executing time (estimated time) of the next task determined by an interval of activating the download can be delayed. For example, in a case that the power of the game apparatus 12 is completely turned off, in a case that a failure occurs to the network, and so forth, the download processing (task) cannot be executed. Thereafter, in a case that a next task executable state comes, in a case that the estimated time is significantly delayed, the data to be downloaded itself may already be unneeded. Thus, at a time of registering the task, the retry margin is set. When an estimated time of the task is determined in correspondence with the task activating interval, a retry allowable hour (retry allowed hour) is determined in correspondence with the retry margin. When the retry allowable hour expires, the task is not executed, and then deleted from the task list 44*e*. The retry margin is set by a user, and automatically set depending on the kind of the download data.

The content updating interval is an average value of the intervals for updating a content (download data) to be set in the delivery source concerning the URL of the delivery source. Thus, depending on the kind of the download data, taking the average value of the intervals for updating the download data indicated by the content activating interval into consideration, the task activating interval is set. More specifically, if the task activating interval is set to be longer than the content updating interval, useless downloading like acquiring the same download data again can be eliminated. On the contrary thereto, if the task activating interval is set to be shorter than the content updating interval, missing the download of the content to be updated can be eliminated. The average value of the update intervals may be a value presumed in advance, and in order to update the task, every time that the download is executed, the average value of the update intervals is acquired from the delivery server 104 and the game server 106 so as to update the task.

The file name is a file name applied when the download data is stored, and can be, for example designated by an option. It should be noted that the download data is attached with a file name, and therefore, data with a predetermined file name can be acquired without designating the file name.

It should be noted that the execution of the task is described in detail. The download data can be used in the application indicated by the identification information (application ID). For example, in the game application, the download data is data like an additional map, an additional character, an addition item, etc. as to the game.

Returning to FIG. 9, the save area 44*f* is an area storing (saving) data of an application, and includes a download box 440 within the area. The download box 440 is an area to store download data downloaded from the delivery server 104 and the game server 106 according to a task as described above. It should be noted that the download box 440 also stores download data downloaded from the delivery server 104 and the game server 106 by the CPU 40 according to an instruction from the user.

Although detailed description is omitted, an application ID for identifying the application registering a task and an application that the CPU 40 is execution is applied to the download data in advance. It should be that the application ID is not necessarily applied to the download data in advance, and in another embodiment, when the application ID is registered in the download box 440, the application ID indicated by the attribute information of the task is referred so as to be applied. Thus, in a case that download data of various kinds of the applications is stored in the download box 440, it is possible to identify each download data by the application ID. Furthermore, the save area 44*f* ensures an area for each application. Thus, in another embodiment, a download box for each application may be provided in the area for storing application data corresponding to the download data.

The database 44*g* is an area for storing a message for each date utilized in the above-described message board function, and can be referred from other application. As described above, the reception data is stored in the reception message box 44*b*, but since the capacity of the reception message box 44*b* is limited, when the reception message box 44*b* is full, the reception data is deleted from the oldest one. Accordingly, the database 44*g* is provided for storing a message for a long time and for sharing the message, and the reception data (message) except for one utilized in the individual application, such as one attached with game data is moved to the database 44*g* from the reception message box 44*b*. At this time, the header information of the message is referred so as to be stored in each area of the database 44*g* managed for each date. For example, if a year, month and day, and time are described as information of the message board date and time designation, the reception data is stored in the area corresponding to the designated year, month and day. However, if the header information of a message is not designated by a date and time, etc., the message is stored in the area corresponding to the date when the message is received. The managing method of an area for each date is only necessary to set a folder for each day and store the message in a corresponding folder, for example. Furthermore, the file name at a time of storage may be a file name representing an hour.

Although illustration is omitted, in a case that a memory card is attached to the connector for memory card 62, the content of the database 44g can be backed up in the memory card automatically or in accordance with an instruction by the user.

The main-body application area 44h is an area for storing a program (software) of an application incorporated as a main body function. For example, applications of the function (main body function) of the game apparatus 12 itself, such as a menu program at a time of activating the game apparatus 12, a message board function, a friend registration function are stored (installed) in the main-body application area 44h. That is, the game apparatus 12 is able to read a program of a game, etc. stored in the optical disk 18 to execute the application, and read a program stored in the flash memory 44 to execute the application. Furthermore, software except for the above description may be added to a program to be stored in the main-body application area 44h.

Figure 11:
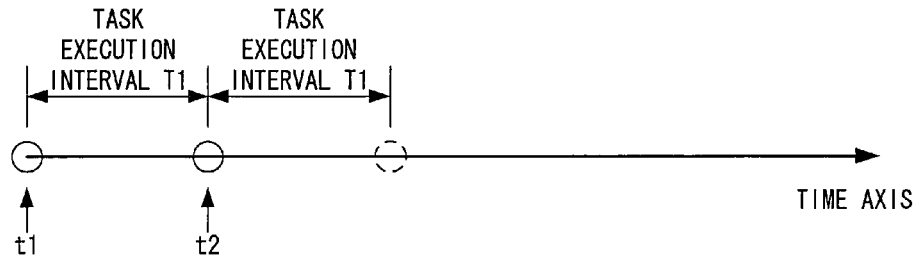
FIG. 11 is an illustrative view showing a scheduling and an executing hour of the tasks.
Figure 11:
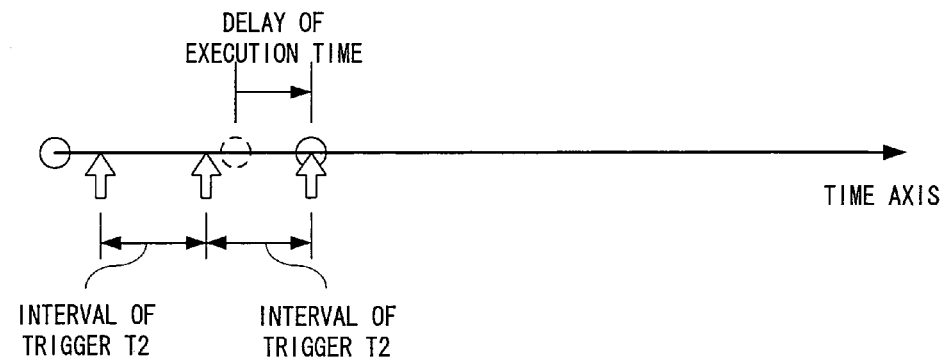
Figure 11:
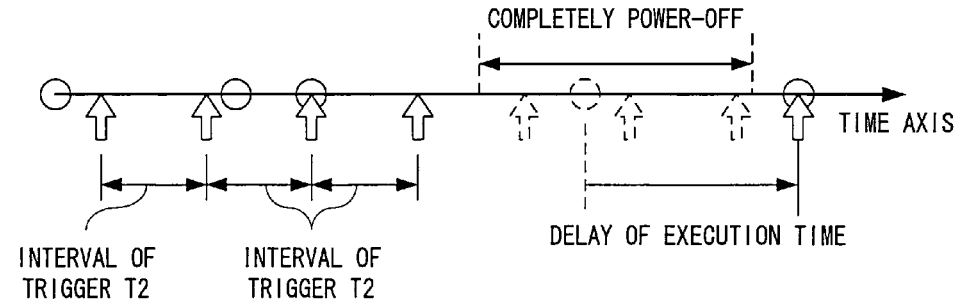

Now, an outline of the download process to be executed by the input-output processor 42a is explained. It should be noted that the download processing is performed on the server (the delivery server 104 and the game server 106 in this embodiment) set to the URL of the source of delivery described in the above-described task. As shown in FIG. 11 (A), when a certain task is registered in the task list 44e, the task is scheduled by taking the time t1 as a reference. For example, in the example shown in FIG. 11 (A), scheduling of the task is executed at a time (estimated time) t2 in accordance with an execution interval T1 of the task. Additionally, the execution time interval T1 corresponds to the task activating interval of the attribute information of the task. The time can be obtained from the ROM/RTC 48. When the task is executed, a next task is executed at the estimated time evaluated by adding the execution time interval T1 to the executing time. The downloading task decrements the remaining number of times of downloading by one when a downloading is executed. At this time, a scheduling of an estimated time (execution estimated time) when the next task is executed is made.

As shown in FIG. 11 (B), inside the input-output processor 42a, a trigger is generated every predetermined time per unit of time of the processing, and at a time of generating the trigger, processing of comparing a trigger generation time, and the afore-stated estimated time of transmitting and receiving of messages and an estimated time of downloading, etc. is performed. If the estimated time expires, the processing is activated. Thus, if the scheduling of the task is set after the trigger generation, the task is executed at the next trigger generation, and therefore, an actual executing time of the task may slightly be delayed from the estimated time t2 set in FIG. 11 (A).

Furthermore, as shown in FIG. 11 (C), execution of the task itself may be stopped similar to a case that the power of the game apparatus 12 is completely off unlikely to the standby mode. In such a case, the task is executed after the game apparatus 12 is activated again, but a long-delay of an executing time of the task may occur.

Additionally, execution of the task can temporarily be stopped or restarted in accordance with the request from an application, and in such a case also, a delay of an executing time of the task may occur.

If a delay of an executing time of the task occurs, the data to be downloaded may be already useless. Therefore, if a delay occurs, a retry margin is set as attribute information of the task in order to determine whether or not the execution of the task is allowed. More specifically, when a task is executed, it is determined whether or not timing when the execution of the task is started (current hour) is after the retry allowable time which is obtained by adding a time indicated by a retry margin to the estimated time of the task execution. Then, if the current time is after the retry allowable time, the task execution is not performed, and the task is deleted from the task list 44e. On the other hand, if the current time is before the retry allowable time, the task is executed to continue the following processing.

Figure 12:
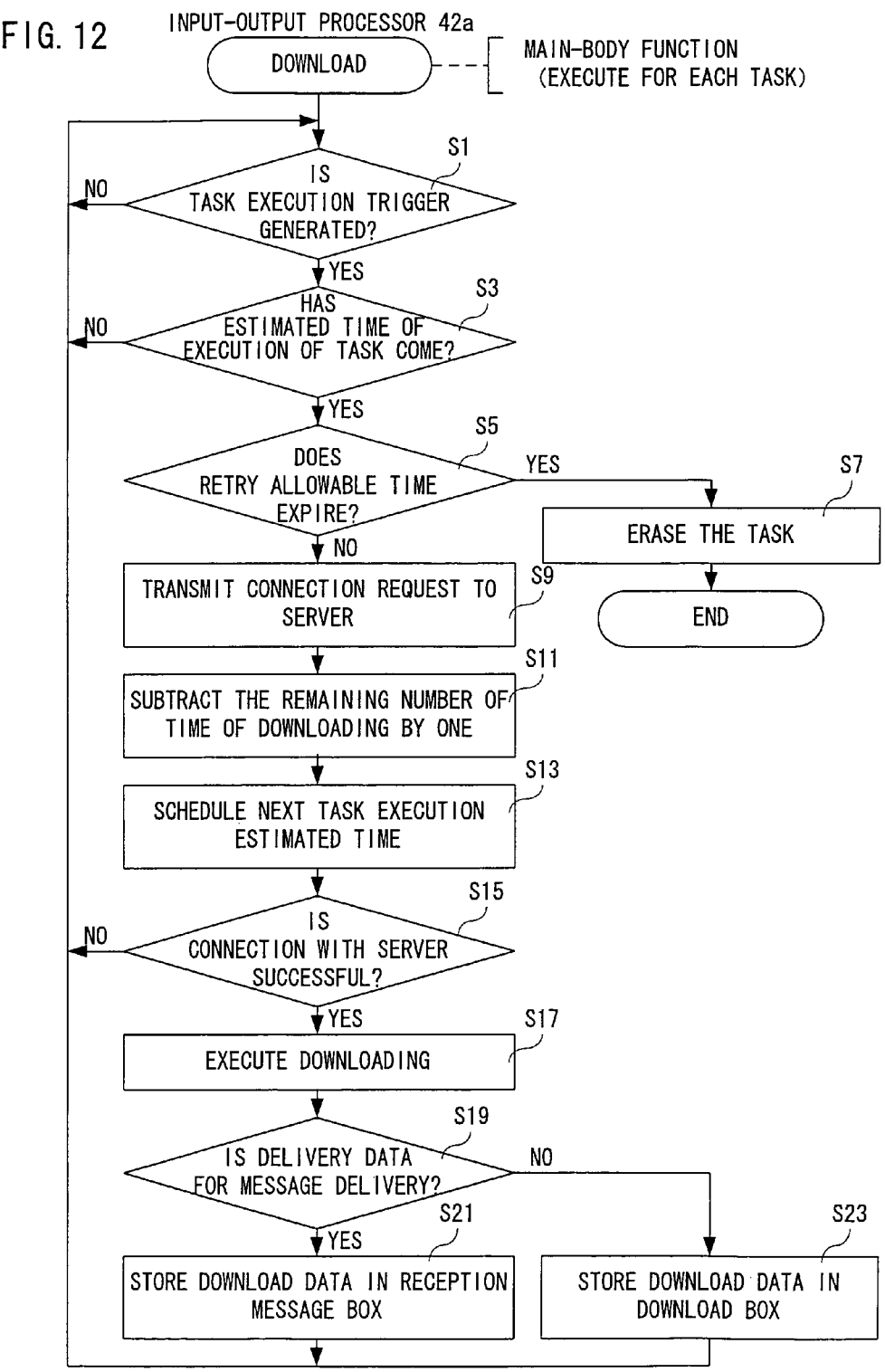
FIG. 12 is a flowchart showing download processing of an input/output processor shown in FIG. 2.

More specifically, the input-output processor 42a executes download processing based on the task according to the flowchart shown in FIG. 12. The download processing is executed by the input-output processor 42a independent of the CPU 40, and is executed in also the above-described standby mode. Furthermore, while the CPU 40 executes an application, it is independently executed. It should be noted that the download processing continues to be executed every time that a trigger is generated within the input-output processor 42a as described above in a state a task is registered. Furthermore, the download processing is executed in each task.

As shown in FIG. 12, the input-output processor 42a detects generation of a trigger (task execution trigger) for executing a task in step S1. If "NO" in step S1, that is, if a task execution trigger is not generated, the process returns to the step S1 as it is. On the other hand, if "YES" in step S1, that is, if a task execution trigger is generated, it is determined whether or not an estimated time of execution of the task has come in a step S3. Strictly speaking, the input-output processor 42a determines whether or not the current hour is after the execution estimated time.

If "NO" in step S3, that is, if the current time is not the estimated time of execution of the task, the process returns to the step S1 as it is. On the other hand, if "YES" in step S3, that is, if the current time is the estimated time of execution of the task, it is determined whether or not the current time is after a retry allowable time in a step S5. If "YES" in step S5, that is, if it is after the retry allowable time, the task is erased from the task list 44e in step S7, and the download processing is ended.

However, since the download processing is executed for each task, this means that the task relating to the download processing is ended, but the download processing as to other task is activated (executed) in response to the generation of the trigger thereafter.

On the other hand, if "NO" in step S5, that is, if it is not after a retry allowable time, a connection request is transmitted to the server (104, 106) in step S9. That is, the input-output processor 42a sends an access request to the URL of the source of delivery of the content indicated by the attribute of the task, that is, the download data. Next, in step S11, the remaining number of times of downloading as to the task is subtracted by one. Here, although illustration is omitted, the input-output processor 42a deletes the task from the task list 44e at a time when the remaining number of times of downloading becomes zero so as to prevent a next downloading from being performed. In step S13, a next task execution estimated time is scheduled.

Then, in step S15, it is determined whether or not a connection with the server (104, 106) is successful. If "NO" in step S15, that is, if a connection with the server (104, 106) is unsuccessful, the process directly returns to step S1. In this embodiment, the input-output processor 42a directly returns to step S1 when a connection with the server (104, 106) is unsuccessful, but where a connection is unsuccessful even if a connection request is transmitted at predetermined number of times (three times of retry, for example), the process may be returned to step S1. Furthermore, in a case that an error occurs to the network 108 and the server (104, 106), the retry may not be performed. Furthermore, in a case that such an error occurs, when the above-described subtraction from the remaining number of times is performed, the process may be ended without executing a download, and therefore, the process in step S11 may be performed between step S15 and step S17.

If "YES" in step 15, that is, if a connection with the server (104, 106) is successful, downloading is executed in step S17. That is, the input-output processor 42a acquires download data. Then, in step S19, it is determined whether or not the download data is data for a message delivery. For example, assuming that the data for message delivery is the data in an electronic mail format, the input-output processor 42a determines whether or not the acquired download data is in an electronic mail format. Or, information indicative of the message delivery data is included in the download data, and after execution of the download, the download data may be transformed into the data in an electronic mail format in the game apparatus 12. For example, in this embodiment, as a content delivered as message delivery data, a message showing that a delivery of a new application is started from the source of delivery (delivery server 104, the game server 106) and a message showing that addition data as to a certain application is delivered are considered.

If "YES" in step 19, that is, if the download data is data for message delivery, the download data is stored in the reception message box 44b as reception data in step S21, and the process returns to step S1. On the other hand, if "NO" in step S19, that is, if the download data is not data for message delivery, the download data is stored in the download box 44O in step S23, and the process then returns to step S1.

Additionally, the message delivery data stored in the reception message box 44b is output to the monitor 34 by the message board function to notify the player of a message from the source of the delivery.

A network game system 110 is made up of two or more game apparatuses 12, a game server 106 and a network 108, for example. Also, the network game system 110 may include a mail server 102 and a delivery server 104.

In such a network game system 110, a certain game apparatus 12 connected to the network 108 can play a communication game with another game apparatus 12 to be connected to the network 108. In what follows, a detailed description is made. In this illustrative embodiment, a parent machine means a game apparatus 12 which invites participation in the communication game, and a child machine means a game apparatus 12 which desires participation in the communication game. Furthermore, in the network game system 110 of this embodiment, a game apparatuses 12 having a released version game program as to a predetermined game and a game apparatus 12 having a trial version game program corresponding to the released version are mixed.

Figure 13:
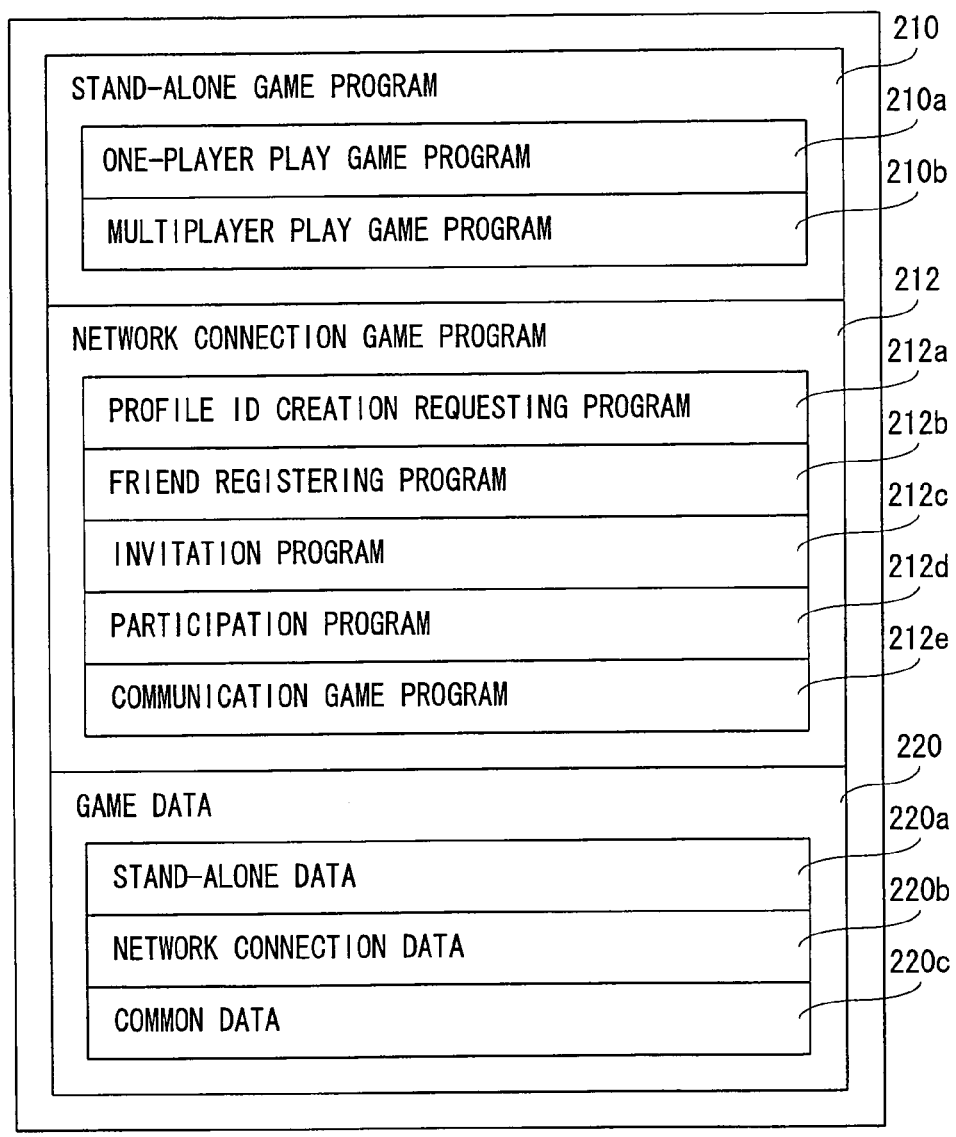
FIG. 13 is an illustrative view showing one example of a released version game program.

With reference to FIG. 13, the released version game program 200 includes a stand-alone game program 210, a network connection game program 212 and game data 220. The stand-alone game program 210 is a program for playing a game by the single game apparatus 12 having the released version game program 200 without making communications with other game apparatuses 12. The stand-alone game program 210 includes a one-player game program 210a and a multiplayer game program 210b. The one-player game program 210a is a program for playing a game by utilizing the game apparatus 12 by one person. The multiplayer game program 210b is a program for playing a game by utilizing the game apparatuses 12 by two or more persons.

The network connection game program 212 is a program for playing a communication game by making communications with other game apparatuses 12. The network connection game program 212 is made up of a profile ID creation requesting program 212a, a friend registering program 212b, an invitation program 212c, a participation program 212d and a communication game program 212e.

The profile ID creation requesting program 212a is a program for transmitting a creation request (temporary profile ID in this embodiment) of a profile ID of the user or the player mainly used for user authentication in the communication game to the game server 106. Here, the profile ID requested to be created is a profile ID of the game apparatus 12, itself (own). The friend registering program 212b is a program for registering a friend's name (name, nickname, designation, etc.) and a profile ID of the friend in a list (game friend list) of friends (users, players) which can be decided as partners of the communication game.

The invitation program 212c is a program for inviting a partner with which a communication game is played prior to playing the communication game. In this embodiment, since the game server 106 acts as intermediary with a partner of the communication game, by execution of the invitation program 212c, a request of acceptance of inviting a partner with which a communication game is played is transmitted to the game server 106. The participation program 212d is a program for requesting participation in the communication game prior to playing the communication game. As described above, in this embodiment, since the game server 106 acts as intermediary with a partner of the communication game, by execution of the participation program 212d, a request of participation in the communication game is transmitted to the game server 106. That is, the game apparatus 12 having the game program 200 of the released version can participate in the communication game as a parent machine (game apparatus executing the invitation program 12) or a child machine (game apparatus executing the participation program 12). The communication game program 212e is a program for playing a communication game, and executing processing of a main routine of the communication game. The communication game program 212e is executed after the partner of the communication game is decided by inviting a participant in the communication game, requesting participation in the communication game, and so forth.

The game data 220 includes stand-alone data 220a, network connection data 220b and common data 220c. The stand-alone data 220a is image data (data such as polygon, texture, etc.) used only when a game is played by a single game apparatus 12. The network connection data 220b is data such as image data used only when a communication game is played. The common data is data such as image data commonly used when a game is played by a single game apparatus 12 and when a communication game is played.

Figure 14:
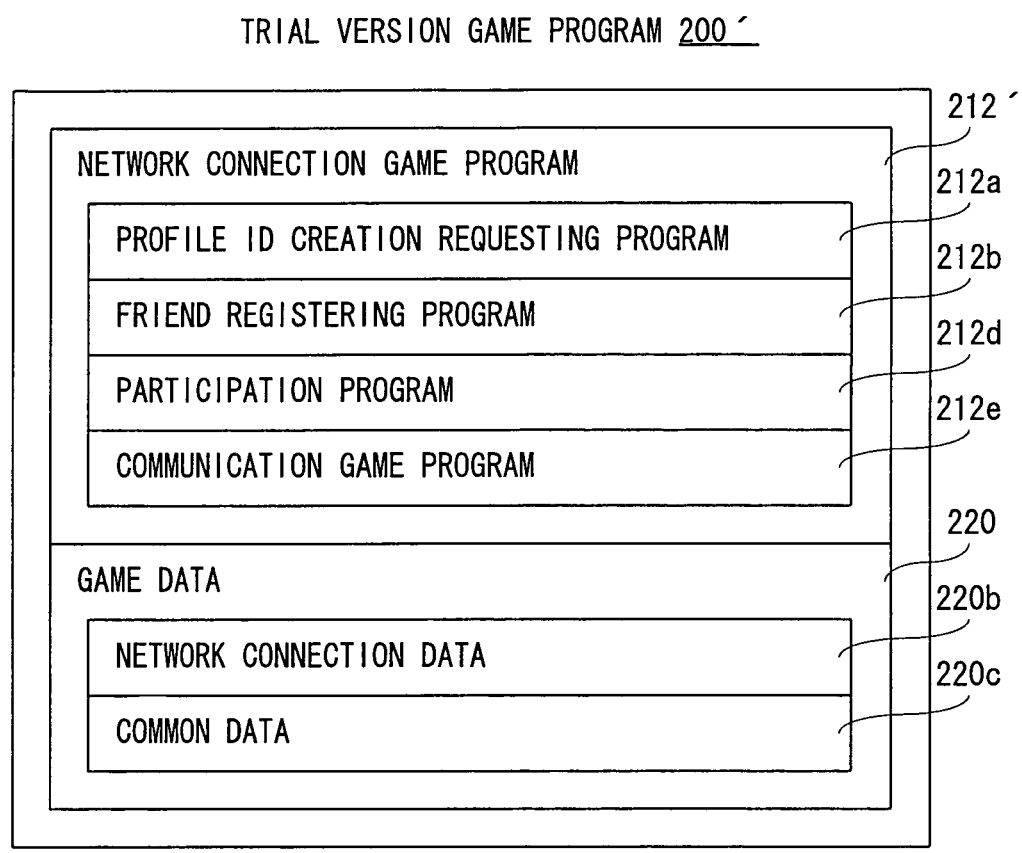
FIG. 14 is an illustrative view showing one example of a trial version game program corresponding to the released version game program shown in FIG. 13.

Furthermore, with reference to FIG. 14, a trial version game program 200' includes a network connection game program 212' and game data 220'. As understood by referring to FIG. 13 and FIG. 14 the trial version game program 200' is made up of a part of the released version game program 200. More specifically, the trial version game program 200' does not include the stand-alone game program 210. That is, only the communication game is executable.

Additionally, in the trial version game program 200' shown in FIG. 14, parts of programs and game data the same as the programs and the game data included in the released version game program 200 shown in FIG. 13 are designated by the same reference numerals. Furthermore, a duplicated description of the same program and the same game data is omitted.

As understood from FIG. 14, the invitation program 212c is not included in the network connection game program 212'. That is, in the game apparatus 12 having a trial version game program 200', a request for participation in the communication game is only performed. In other words, the game apparatus 12 only functions as a child machine in the communication game. Furthermore, the trial version game program 200' does not include the stand-alone game program 210, so that it does not play a game by a single game apparatus 12. Thus, in the game data 220', stand-alone data 220a is also not stored.

Figure 15:
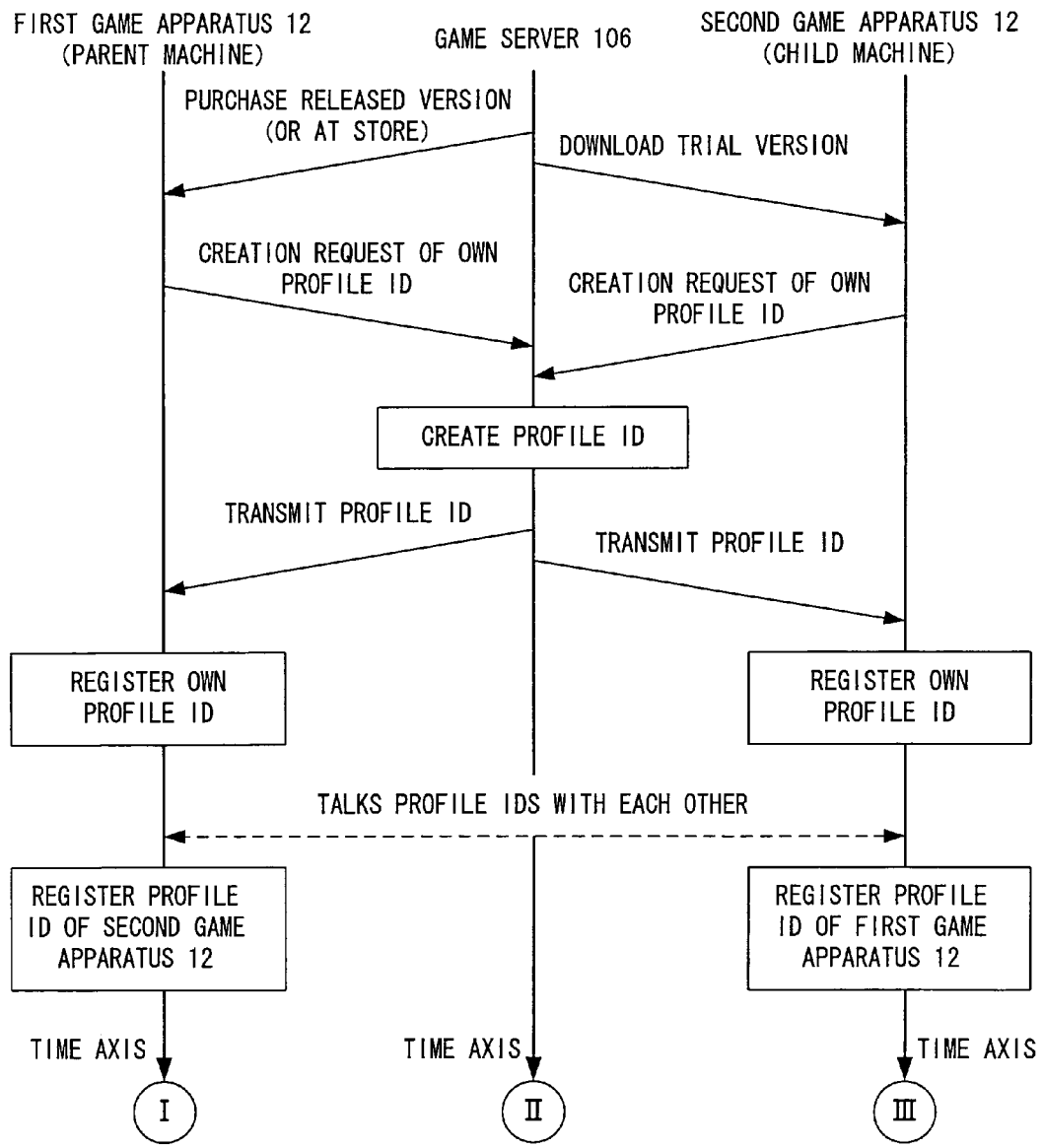
FIG. 15 is a descriptive diagram showing a part of the flow until two game apparatuses play a communication game via a game server.
Figure 16:
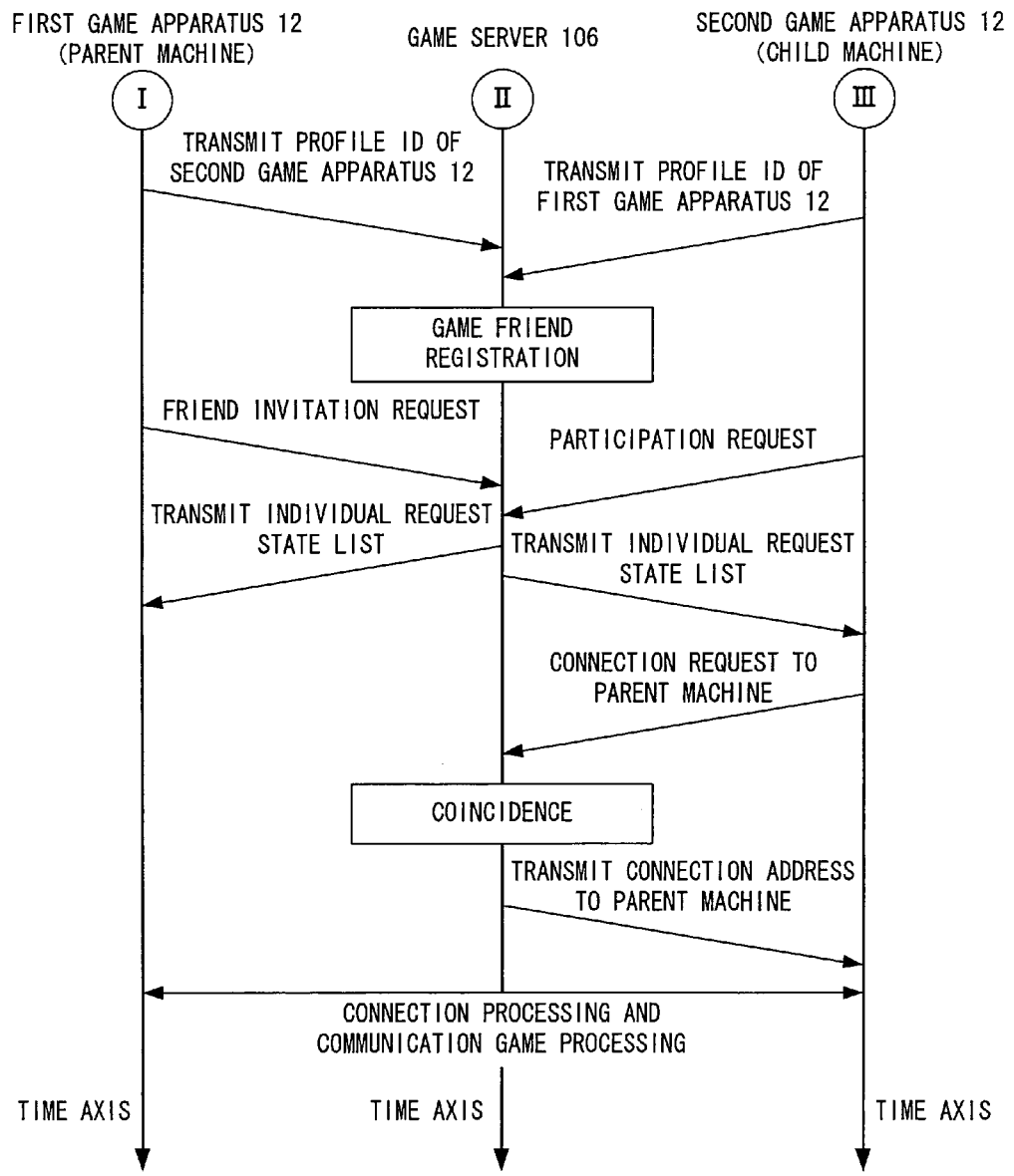
FIG. 16 is a descriptive diagram showing another part of the flow until the two game apparatuses play a communication game via the game server continuing from FIG. 15.

FIG. 15 and FIG. 16 is a descriptive diagram showing one example of a flow until the first game apparatus 12 and the second game apparatus 12 play a communication game in a chronological order. Here, for simplicity, processing of playing a communication game by making communications between two game apparatuses 12 via the network 108 is described, but it is needless to say that three or more game apparatuses 12 can play a communication game. In this case, one game apparatus 12 functions as parent machine, and the other game apparatuses 12 function as child machines. Also, players who play a communication game are at least acquainted with each other.

Additionally, FIG. 15 and FIG. 16 show that processing of the first game apparatus 12 and the second game apparatus 12 are simultaneously executed for convenience of explanation, but are not necessarily executed at the same time.

As shown in FIG. 15, the first game apparatus 12 purchases an optical disk 18 containing a released version game program 200 from an administrator (manager) of the game server 106 or from a provider providing the game via the game server 106. It should be noted that the optical disk 18 storing the released version game program 200 may be purchased in a store. Or, the released version game program 200 may be made downloadable from the game server 106 similar to a trial version game program 200' described later. Here, in a case that the released version game program 200 is downloaded from the game server 106, billing processing is performed by making a payment with a prepaid card, a credit card, etc.

On the other hand, the second game apparatus 12 downloads the trial version game program 200' from the game server 106 for free. That is, in a case that the trial version game program 200' is downloaded from the game server 106, billing processing is not performed. However, an optical disk 18 containing the trial version game program 200' can be made available for free. In such a case, the trial version game program 200' may be stored as an extra bonus in an optical disk 18 storing a released version game program of another game, in an optical disk 18 as an extra bonus of a magazine, or in an optical disk 18 delivered for free, and so forth.

Figure 17:
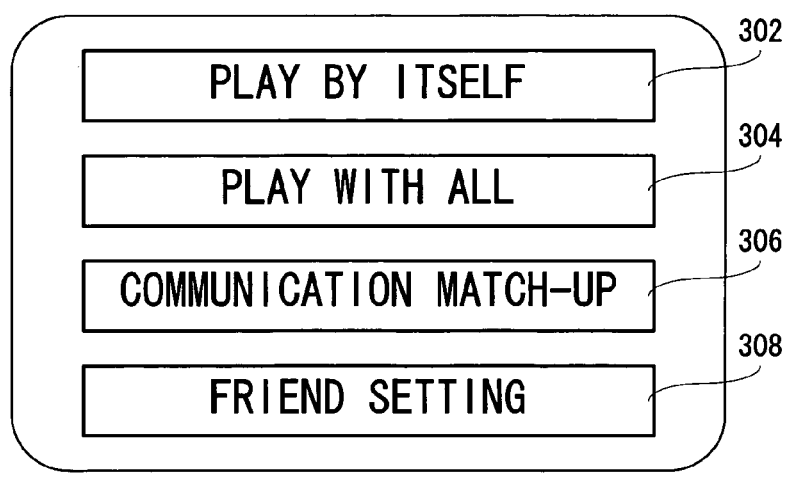
FIG. 17 is an illustrative view showing one example of a menu screen displayed on a monitor.
Figure 17:

Here, when the released version game program 200 is started-up in the first game apparatus 12, a menu screen 300 shown in FIG. 17(A) is displayed on the monitor 34 connected with the first game apparatus 12. As shown in FIG. 17(A), four button images (or icon) 302, 304, 306, 308 are provided on the menu screen 300. On the menu screen 300, all the button images 302-308 can be selected (turned on). When the button image 302 is turned on, a one person playable game can be played by the single first game apparatus 12. Furthermore, when the button image 304 is turned on, a multi-persons playable game can be played by the single first game apparatus 12. In addition, when the button image 306 is turned on, playing a communication game with another game apparatus 12 is selected. Furthermore, when the button image 308 is turned on, it is possible to register a profile ID of a game fiend (the partner of the communication game) and view a profile ID of the first game apparatus 12 (own) as described later.

Also, when the trial version game program 200' is started-up in the second game apparatus 12, a menu screen 300' shown in FIG. 17(B) is displayed on the monitor 34. On the menu screen 300', button images 302-308 are displayed similar to the menu screen 300. However, both button image 302 and the button image 304 are grayed out, and cannot be turned on (selected). That is, in the trial version game program 200' of this embodiment, the game played by the single game apparatus 12 which is playable in the released version game program 200 cannot be played.

In this embodiment, when the released version game program 200 is purchased, in order to make a notification of other playable games, the button image 302 and the button image 304 are displayed so as to be grayed out on the menu screen 300', but it is not necessarily limited thereto. The button image 302 and the button image 304 may not be displayed, or the button image 302 and the button image 304 are displayed in a selectable manner and when the button image 302 and the button image 304 are selected, a message showing that it is not playable in the trial version may be displayed on the monitor 34.

Here, in a case that the released version game program 200 is started-up for the first time, when the button image 306 is turned on, the first game apparatus 12 requests the game server 106 to create a profile ID to be used in the communication game. Similarly, in a case that trial version game program 200' is started-up for the first time, when the button image 306 is turned on, the second game apparatus 12 requests the game server 106 to create a profile ID to be used in the communication game. The reason is that the profile ID has not yet been created, and the profile ID of the partner of the communication game has not yet been registered.

It should be noted that when the released version game program 200 and the trial version game program 200' is started-up at the second time onward, in a case that the own profile ID has not yet been registered (the button image 306 is not turned on when the first start-up, for example), creation of the own profile ID is requested to the game server 106.

Returning to FIG. 15, the first game apparatus 12 requests the game server 106 to create the own profile ID. The second game apparatus 12 also requests the game server 106 to create the own profile ID.

The game server 106 creates respective profile IDs when accepting creation requests of the profile ID from the first game apparatus 12 and the second game apparatus 12. Then, the game server 106 transmits the created profile IDs to the respective first game apparatus 12 and the second game apparatus 12.

In this embodiment, the profile ID is made up of an MAC address of the radio communication module 50 of the game apparatus 12, a game code (ID indicating the kind of the game (application ID)), and a random number (8 bytes). It should be noted that the profile ID to be transmitted from the game server 106 to the game apparatus 12 is added with data for a CRC (Cyclic Redundancy Check) check.

Each of the first game apparatus 12 and the second game apparatus 12 receive a profile ID transmitted from the game server 106, and stores it in a management file 44c within the flash memory 44. Although detailed description is omitted, in a case that profile IDs are thus transmitted (delivered) to the first game apparatus 12 and the second game apparatus 12 from the game server 106, the game server 106 may directly transmit them so as to be directed to the first game apparatus 12 and the second game apparatus 12, and the first game apparatus 12 and the second game apparatus 12 may execute download processing. Here, the download processing can be executed according to a task as described above, or executed according to an instruction from the user or the player.

Succeedingly, a user (player) of the first game apparatus 12 and a player of the second game apparatus 12 exchange their own profile IDs with each other. For example, the players may exchange their profile IDs in conversation, and may exchange them by mail or by electronic mail. As described above, by transmitting and receiving messages between the first game apparatus 12 and the second game apparatus 12, it is possible to exchange the profile IDs. Accordingly, in the first game apparatus 12, it is possible to register the profile ID of the second game apparatus 12 in the friend list (game friend list) of the communication game. On the other hand, in the second game apparatus 12, it is possible to register the profile ID of the first game apparatus 12 in the game friend list.

Figure 18:
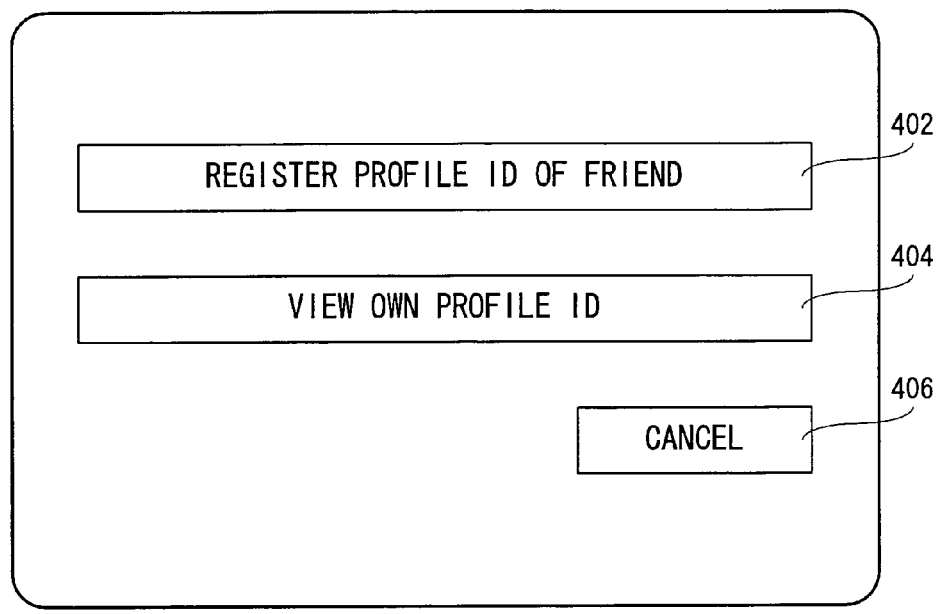
FIG. 18 is an illustrative view showing one example of a friend setting submenu screen displayed on the monitor.
Figure 19:
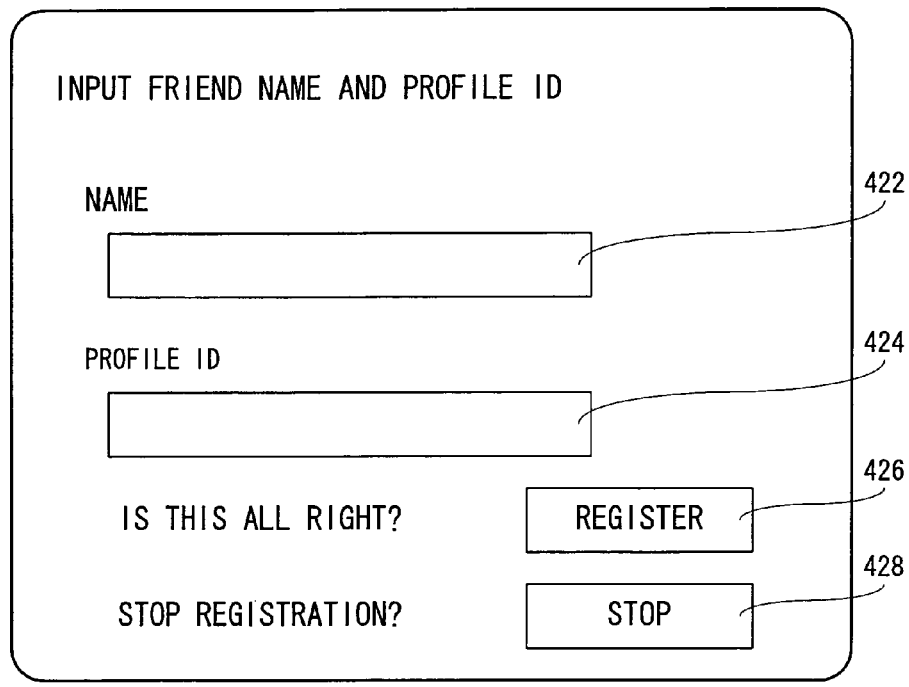
FIG. 19 is an illustrative view showing one example of a game fiend's profile ID registration screen and one example of an own-profile ID displaying screen which are displayed on the monitor.
Figure 19:
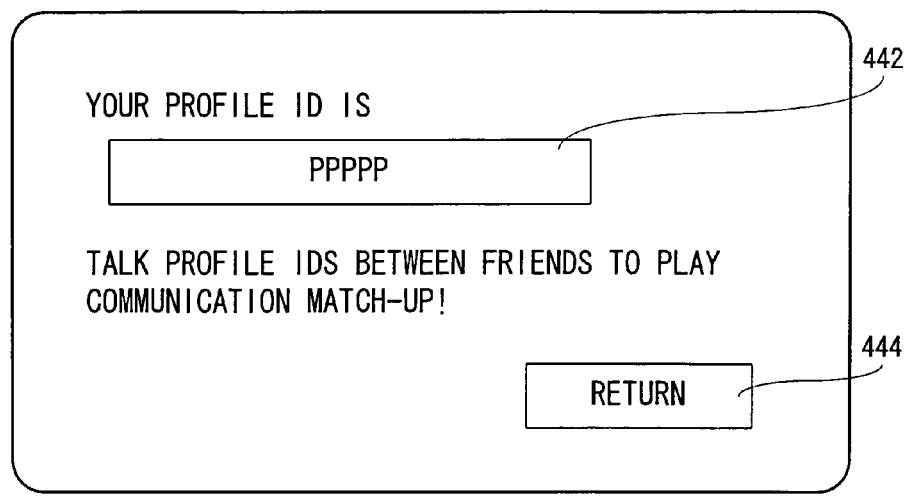

Here, when the button image 308 is selected on the menu screen 300 shown in FIG. 17(A) (this holds true for the menu screen 300' shown in FIG. 17(B)), a friend setting submenu screen 400 shown in FIG. 18 is displayed on the monitor 34. On the sub menu screen 400, three button images 402, 404, 406 are displayed. When the button image 402 is selected, a partner (game fiend) who is allowed to play a communication game can be registered. More specifically, a game fiend's profile ID registration screen 420 shown in FIG. 19(A) is displayed on the monitor 34. On the registration screen 420, an entry field 422 and an entry field 424 are provided, and a button image 426 and a button image 428 are also provided. In the entry field 422, a name (designation) of the player registered as a game fiend is input. Furthermore, in the entry field 424, a profile ID (added with data for CRC check) of the player to be registered as a game fiend is input. When the button image 426 is turned on in a state that a name is input to the entry field 422, and the profile ID is input to the entry field 424, the player and the profile ID are registered in the friend list shown in FIG. 20. However, when the button image 428 is turned on the registration screen 420, the registration of the game fiend is canceled, and the process returns to the sub menu screen 400.

Figures 20, 21:
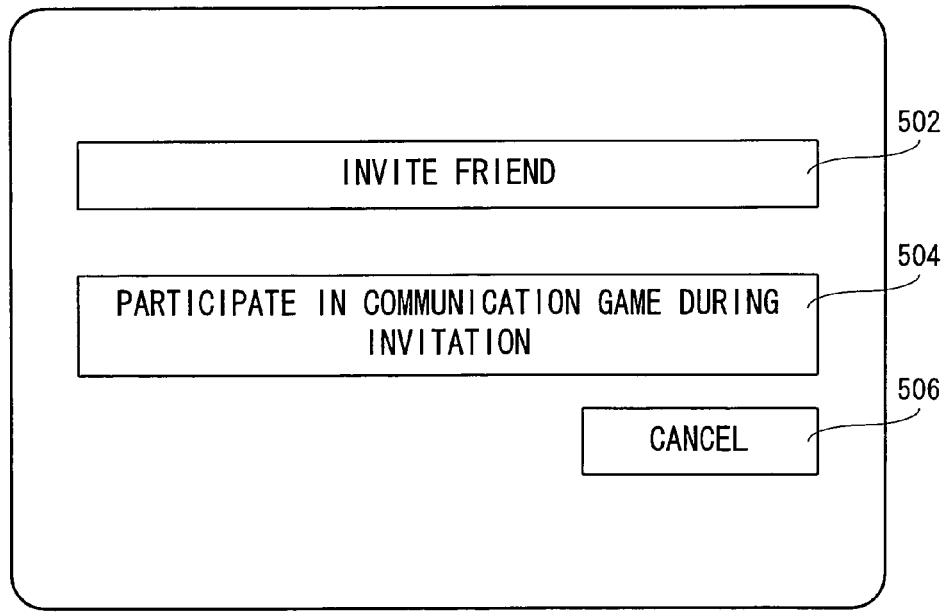
FIG. 20 is an illustrative view showing a game friend list stored in each of the server and the game apparatus.
FIG. 21 is an illustrative view showing one example of a communication match-up submenu screen.

Here, as shown in FIG. 20, in the game friend list, the profile ID decided with respect to the player (game apparatus 12) in correspondence with the name or the designation (an identification information of the player may be possible) of the player is described. It should be noted that in FIG. 20, the profile ID is represented by five alphabetic characters, for simplicity. Although illustration is omitted, the game friend list is stored in an area assigned to the application's (game application of this embodiment) save area 44f provided in the flash memory 44.

Returning to FIG. 18, when the button image 404 is turned on, in the sub menu screen 400, an own-profile ID displaying screen 440 shown in FIG. 19(B) is displayed on the monitor 34. As shown in FIG. 19(B), a display area 442 and a button image 444 are provided on the display screen 440. In the display area 442, the own profile ID which is created in the game server 106 and registered in the game apparatus 12 is displayed. Also here, the profile ID is represented by five alphabetic characters for simplicity. Strictly speaking, a character string being made up of the profile ID added with data for CRC check is displayed. Furthermore, when the button image 444 is turned on, it returns to the above-described sub menu screen 400. That is, the player confirms the own profile ID on the display screen 440, and exchanges the profile ID with other players (acquaintances or friends) as described above.

Returning to FIG. 18, when the button image 406 is turned on the sub menu screen 400, the sub menu screen 400 is ended to return to the above-described menu screen 300.

When each-other's profile IDs are registered between the first game apparatus 12 and the second game apparatus 12 in their game friend lists, the first game apparatus 12 transmits the profile ID of the second game apparatus 12 to the game server 106 as shown in FIG. 16. On the other hand, the second game apparatus 12 transmits the profile ID of the first game apparatus 12 to the game server 106.

When receiving the profile IDs transmitted from the first game apparatus 12 and the second game apparatus 12, the game server 106 registers these in the game friend list. Although described in detail, the game server 106 manages data (player data) for each player (game apparatus 12), and includes a game friend list of the player corresponding to the player data. Although illustration is omitted, the content of the game friend list included in the player data managed by the game server 106 is the same as that of the game friend list as to the game registered in the game apparatus 12 of the player. Accordingly, the game server 106 registers the profile ID of the second game apparatus 12 in the game friend list of the first game apparatus 12, and registers the profile ID of the first game apparatus 12 in the game friend list of the second game apparatus 12.

Then, the first game apparatus 12 performs a friend inviting request on the game server 106 according to a player's instruction. More specifically, in the first game apparatus 12, the button image 306 is turned on, in the menu screen 300 shown in FIG. 17(A), a communication match-up submenu screen 500 shown in FIG. 21 is displayed on the monitor 34, and a button image 502 is further turned on the sub menu screen 500.

Here, the sub menu screen 500 shown in FIG. 21 is a screen for determining whether to participate in the communication game as a parent machine or as a child machine. That is, in the game apparatus 12 having the released version game program 200, the player can participate in the communication game by selecting whether the parent machine or the child machine. When the button image 502 is turned on, a friend inviting request is performed on the game server 106 in order to participate in the communication game as a parent machine. When a button image 504 is turned on, a participation request is performed on the game server 106 in order to participate in a communication game during inviting as a child machine. Thus, the first game apparatus 12 having the released version game program 200 can participate in the communication game as a child machine (not shown). Furthermore, when a button image 506 is turned on, participation to the communication game is canceled, and the process returns to the menu screen 300 shown in FIG. 17(A).

On the other hand, the second game apparatus 12 performs a participation request to the communication game on the game server 106. Here, in the second game apparatus 12 having the trial version game program 200', only the participation request to the communication game is performed as described above, and therefore, even if the button image 306 is turned on the menu screen 300', a participation request is directly performed on the game server 106 without the sub menu screen 500 as described above being displayed.

When receiving a friend inviting request and a participation request, the game server 106 transmits a list (individual request's state list) indicative of a state of request as to the communication game of each of the game fiends to the first game apparatus 12 (parent machine) and the second game apparatus 12 (child machine). Although described later, in the individual request's state list, a request's state (invitation, participation, on line, off line) for each player's name is described.

Figure 22:
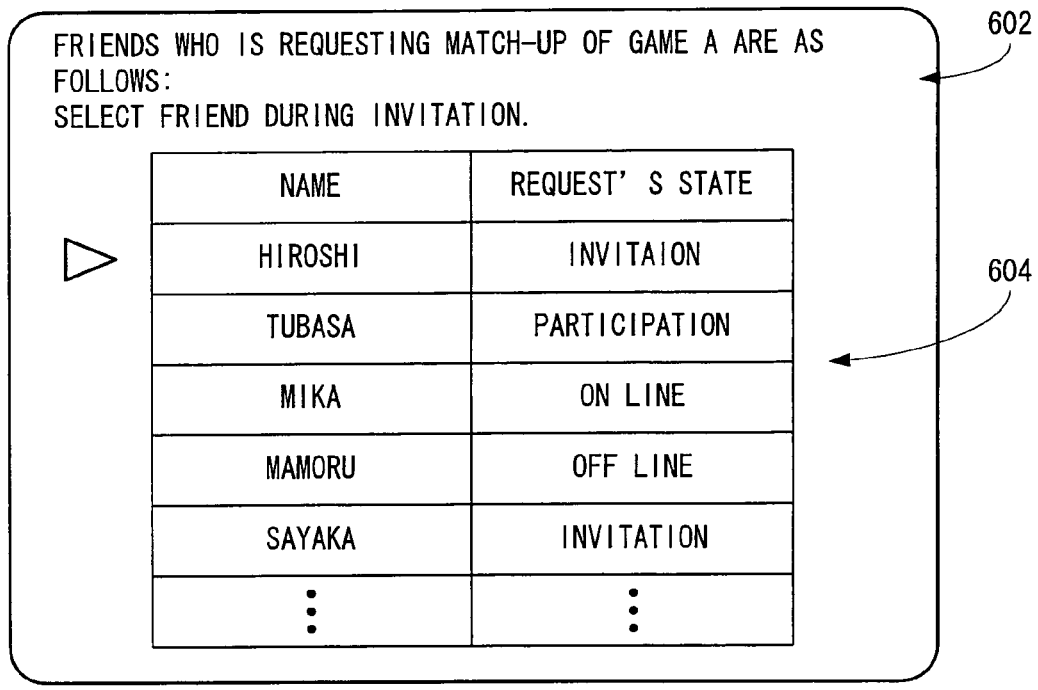
FIG. 22 is an illustrative view showing one example of an individual request's state list displaying screen.

When each of the parent machine and the child machine receives the individual request's state lists, it displays the request's state list on the monitor 34 so as to be known to the player. For example, an individual request's state list displaying screen 600 shown in FIG. 22 is displayed on the monitor

34. It should be noted that the display screen 600 is an example when a participation request is made and displayed on the child machine. As shown in FIG. 22, on the display screen 600, a display area 602 is set at the upper portion of the screen, and a request's state display portion 604 is set below it. In the display area 602, a message showing that a parent machine as a partner of the communication game (game A in FIG. 22) has to be selected is displayed. Furthermore, a table in which a request's state corresponding to the player's name is described is displayed on the display portion 604.

Here, if the request's state is "invitation", this means a state in which a participant in the communication game is being invited (during invitation). Furthermore, if the request's state is "participation", this means a state in which a participation request to the communication game is being performed. In addition, if the request's state is "on line", this means a state in which although a connection to the network 108 is made, but an invitation request and a participation request have not been performed yet. In addition, if the request's state is "off line", this means a state in which a connection to the game server 106 is not made. It should be noted that a disconnected state to the game server 106 is a state that the game apparatuses 12 (the first game apparatus 12 and the second game apparatus 12, here) play a communication game via the network 108, or the power of the game apparatus 12 is turned off (including a standby mode).

Additionally, illustration of the display screen of the request's state to be displayed on the parent machine is omitted. Briefly speaking, as to the parent machine, in order to wait for the participation request, a message showing that wait until a participation request is issued is displayed in the display area 602 of the display screen 600 shown in FIG. 22. Furthermore, in the display area 604, an individual request's state list shown in FIG. 22 is displayed. However, if a participation request is not issued for a long time, since it is hard to continue to wait for a participation request, a button image for selecting the end of the friend inviting request is further displayed. Accordingly, when the player selects the end of the invitation in the parent machine, this is notified to the game server 106 to update a request's state as to the parent machine. More specifically, the request's state is changed from "invitation" to "on line". However, if the parent machine ends the communication with the game server 106 or turns off the power, the request's state is changed from "invitation" to "off line".

The child machine selects a parent machine in order to participate in the communication game from the table of the individual request's state list display screen 600 shown in FIG. 22. The selectable partner here is only the parent machine (player) whose request's state is "invitation". When a desired parent machine is selected, the child machine performs a connection request to the parent machine on the game server 106 as shown in FIG. 16. When receiving the connection request from the child machine, the game server 106 verifies the connection request according to the request's state list. More specifically, the game server 106 checks a request's state of the parent machine about which a connection request from the child machine is issued, and determines whether or not the request's state is "invitation". Furthermore, it is determined whether or not the profile ID of the child machine is registered in the game friend list of the parent machine.

If the request's state of the parent machine is "invitation", and the profile ID of the child machine is registered in the game friend list of the parent machine, the game server 106 determines that the result of the verification is correct and transmits a connection address (IP address, for example) of the parent machine in order to accept the connection request from the child machine. Then, the parent machine and the child machine can play a communication game by making direct communications via the network 108 (peer-to-peer network).

However, if the request's state of the parent machine is not "invitation", and the profile ID of the child machine is not registered in the game friend list of the parent machine, the game server 106 determines that the result of the verification is not correct and the connection request from the child machine cannot be accepted, and notifies a message showing that it is impossible to connect to the child machine.

Figure 23:
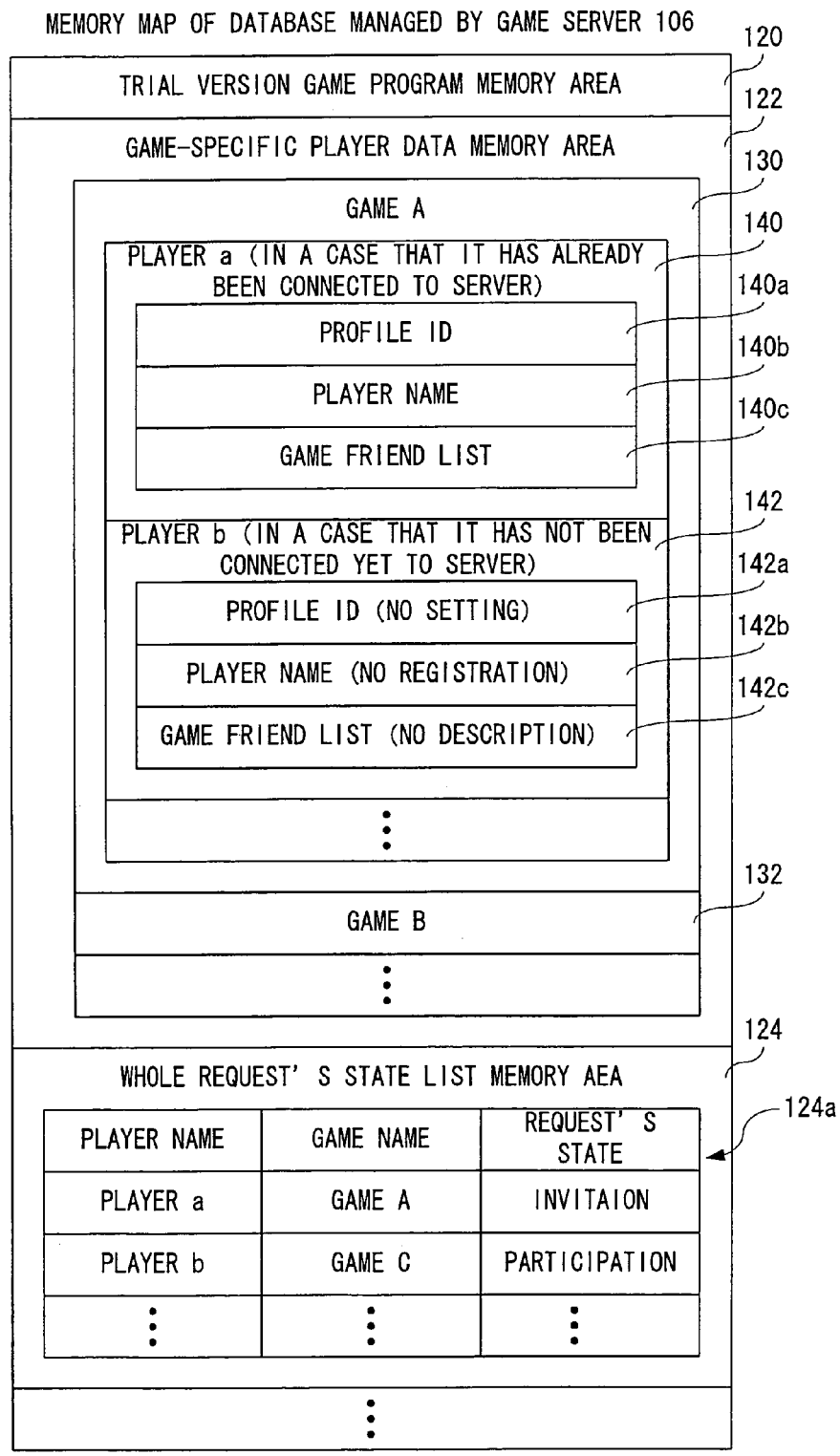
FIG. 23 is an illustrative view showing one example of a memory map of an internal memory of the game server.

FIG. 23 shows a memory map of the database (not illustrated) managed by the game server 106 shown in FIG. 8. Although illustration is omitted, the database (DB) can be provided inside or outside the game server 106. With reference to FIG. 23, the DB of the game server 106 is provided with a trial version program memory area 120, a game-specific player data memory area 122, a whole request's state list memory area 124, etc. In the trial version program memory area 120, at least a kind of the trial version game program (200') is stored.

In the game-specific player data memory area 122, player data for each game to be provided from the game server 106 is stored. For example, a player data memory area relating to the game A 130 is provided with a player a data storing memory area 140 and a player b data storing memory area 142.

In the memory area 140, three memory areas 140a, 140b, 140c are provided. The memory area 140a stores a profile ID determined in relation to the player a, the memory area 140b stores a player name of the player a, and the memory area 140c stores a game friend list of the player a. Here, the game apparatus 12 of the player a has already been connected to the game server 106 by executing a communication game of the game A, and the profile ID has already been created. Furthermore, in a case that the game friend of the player has not been registered yet, no description is made in the game friend list.

Similarly, the memory area 142 is further provided with three memory areas 142a, 142b, 142c. Here, the player b has not executed the communication game of the game A, and has not connected to the game server 106, and therefore, the profile ID has not been created. That is, no setting is made in the memory area 142a. Similarly, no player name is registered in the memory area 142b, and no message is described in the game friend list of the memory area 142c.

For convenience of explanation, in FIG. 23, the memory area 142 of the player data as to the player b which has not yet been connected to the game server 106 is shown as if it has already been reserved, but in reality, the memory area 142 is reserved when the player b (game apparatus 12) is connected to the game server 106, and the profile ID as to the player b is created.

Although illustration is omitted, similarly, the player data is stored as to game B unlike game A or other games.

In the whole request's state list memory area 124, a whole request's state list 124a is stored. The whole request's state list 124a stores request's states of all the players managed by the game server 106. In the whole request's state list 124a, a game name and a request's state are described in correspondence with a player name. However, if the request's state is "off line", no description is made in the entry field of the game name.

Accordingly, as described above, when a request of the individual request's state list is issued from the game apparatus 12, the game server 106 first detects players registered in the game friend list with reference to the game friend list of the game apparatus 12 (player). Next, the game server 106 extracts a game apparatus 12 (player) which is in execution of the same game as the game apparatus 12 as a source of the request executes out of the detected players and its request's state with reference to the whole request's state list 124a to thereby create an individual request's state list. Then, the game server 106 transmits the created individual request's state list to the game apparatus 12 as a source of the request.

In what follows, detailed processing of the game apparatus 12 and the game server 106 are explained by referring to the following flowcharts. Strictly speaking, in an illustrative embodiment, the game apparatus 12 with CPU 40 mainly executes the processing. Similarly, in the game server 106, the CPU (not illustrated) executes the processing.

Figure 24:
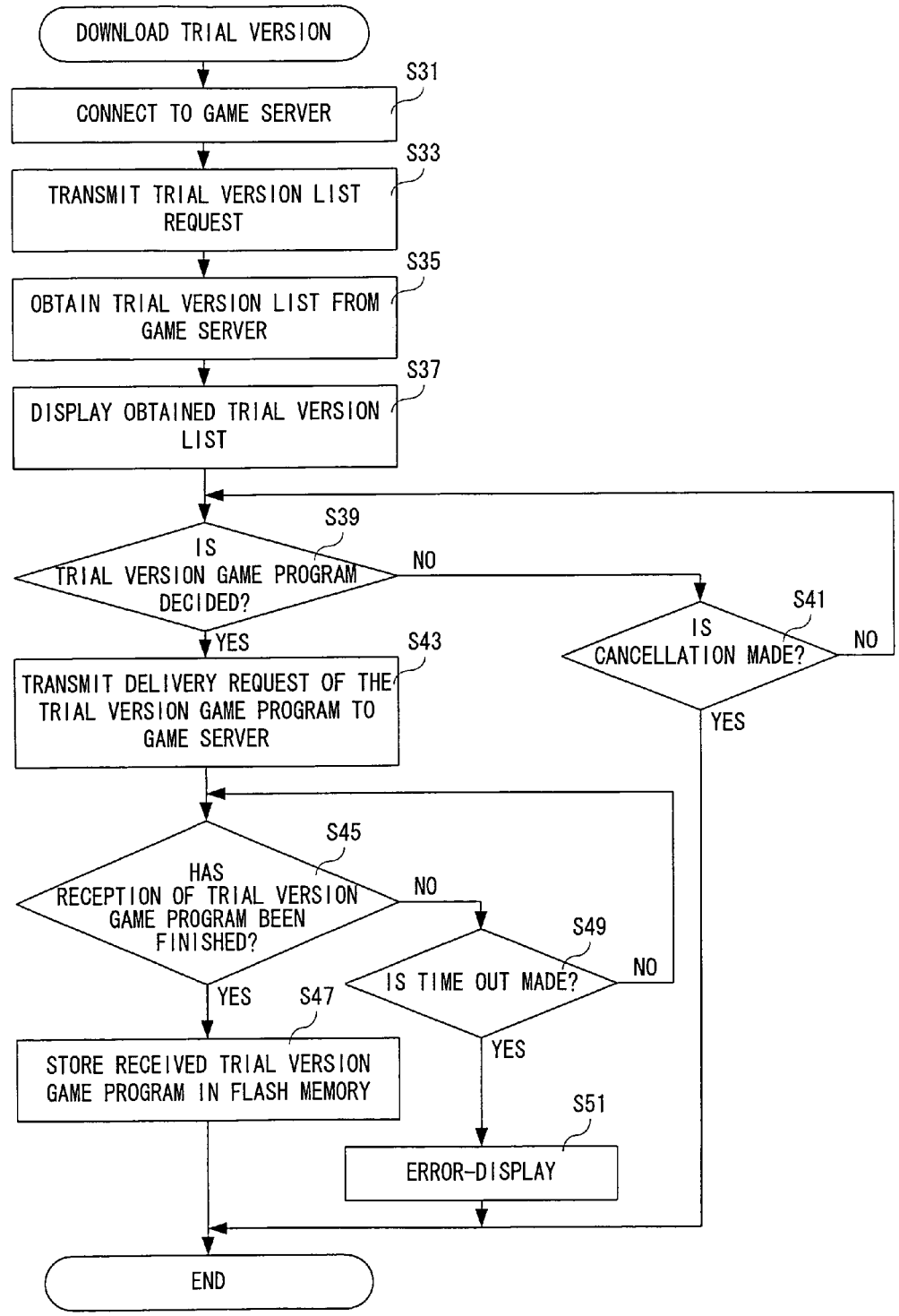
FIG. 24 is a flowchart showing trial version download processing of the game apparatus.

FIG. 24 is a flowchart showing a trial version program download processing. The trial version program download processing is executed by the CPU 40 of the game apparatus 12 according to a player's instruction. It should be noted that as explained by utilizing FIG. 12, the input-output processor 42a can download the trial version game program (200') by executing download processing according to the task.

Referring to FIG. 24, when starting the trial version program download processing, the CPU 40 starts to make a connection to the game server 106 in step S31. In step S33, a trial version list is requested. Although illustration is omitted, the trial version list is a list as to the trial version game program 200', in which, for example, a title of game software is described. In step S35, the trial version list from the game server 106 is obtained. Then, in step S37, the obtained trial version list is displayed on the monitor 34. That is, by viewing the trial version list, the player decides a trial version game program 200' to be downloaded.

Next, in step S39, it is determined whether or not a trial version game program 200' is decided. If "NO" is determined in step S39, that is, if a trial version game program 200' is not decided, it is determined whether or not a cancellation is to be made in step S41. That is, it is determined whether or not downloading the trial version game program 200' is to be stopped. If "YES" is determined in step S41, that is, if the cancellation is to be made, the download processing of the trial version is to be ended. Although illustration is omitted, the connection state to the game server 106 is cancelled at this time. On the other hand, if "NO" is determined in step S41, that is, the cancellation is not to be made, it is determined that trial version game program 200' is being selected, and the process returns to step S39.

Furthermore, if "YES" is determined in step S39, that is, if a trial version game program 200' is decided, a delivery request of the relevant (decided) trial version game program 200' is transmitted to the game server 106 in step S43. Then, in step S45, it is determined whether or not reception of the trial version game program 200' has been finished. If "YES" is determined in step S45, that is, if the reception of the trial version game program 200' has been finished, the received trial version game program 200' is stored in the flash memory 44 in step S47, and the trial version program download processing is then ended.

However, if "NO" is determined in step S45, that is, if the reception of the trial version game program 200' has not been finished, it is determined whether to time-out or not in step S49. Although a detailed description is omitted, the game apparatus 12 starts an internal timer not shown at the same time that the trial version program download processing is started to thereby count a defined time (10 minutes, for example). If the defined time expires, it is determined to be a time out of the trial version program download processing.

This is because of occurrence of communication failure to the network 108 and prevention of inappropriate processing on the game server 106.

If "NO" is determined in step S49, that is, if a time out does not occur, the process returns to step S45 as it is. On the other hand, if "YES" is determined in step S49, that is, if a time out occurs, an error display is made in step S51, and the trial version program download processing is then ended. In step S51, a message showing that a time out occurs to stop downloading the trial version game program 200' and download processing has to be executed again is displayed on the monitor 34, for example. Although illustration is omitted, if a time out occurs, the connected state to the game server 106 is cancelled.

Although illustration is omitted, in a case that the DB of the game server 106 manages a released version game program 200 to allow the released version game program 200 to be downloaded, processing approximately the same as the trial version program download processing shown in FIG. 24 is executed. However, if the released version game program 200 is downloaded, billing processing, for example, is executed at a time that the reception of the game program 200 has been finished. The billing processing may be executed on the side of the game server 106.

Figure 25:
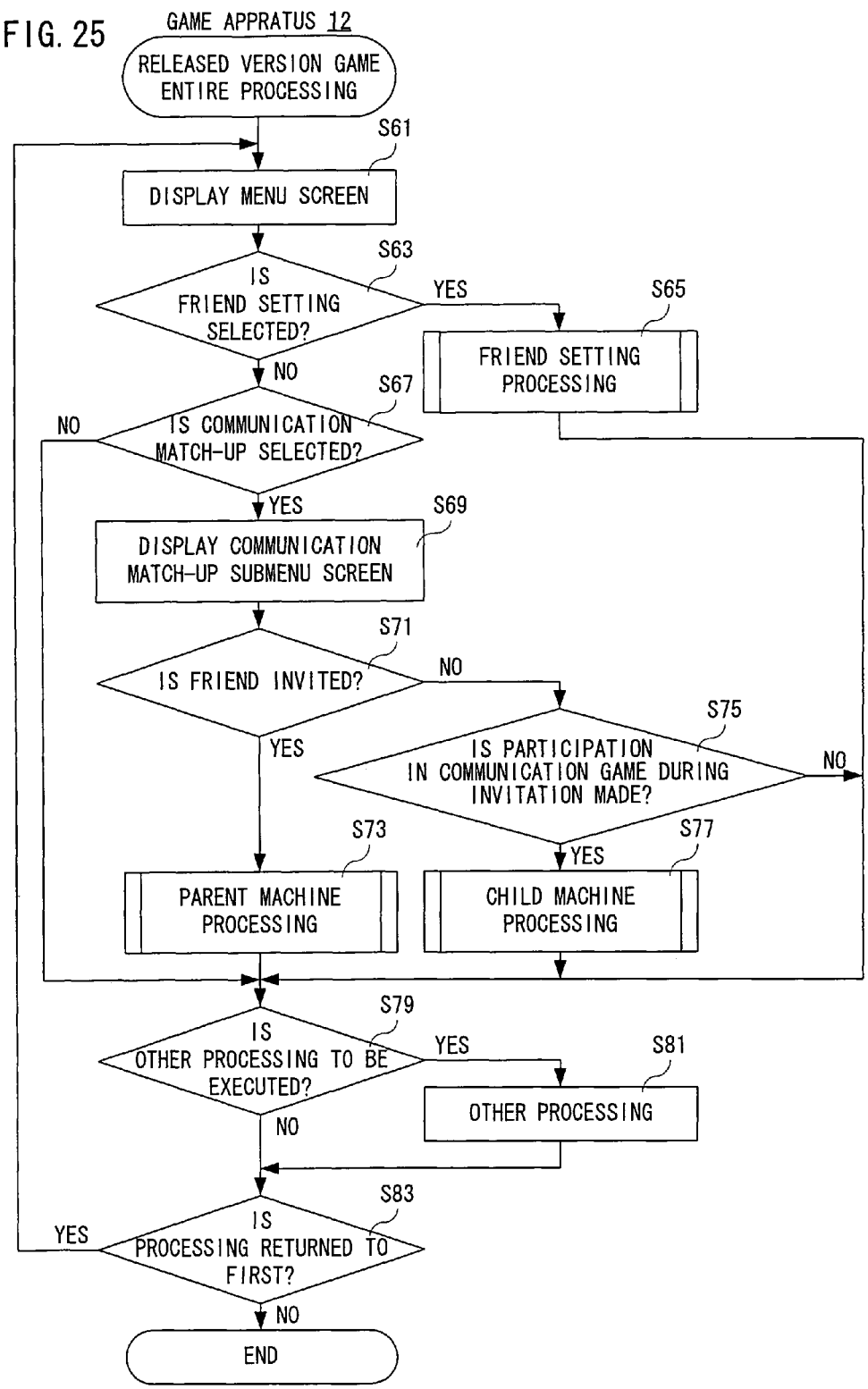
FIG. 25 is a flowchart showing released version game entire processing of the game apparatus.

FIG. 25 is a flowchart showing game entire processing of the released version of the game apparatus 12 (CPU 40). That is, the released version game entire processing is executed in the game apparatus 12 having the released version game program 200. When starting the released version game entire processing, the CPU 40 displays a menu screen 300 as shown in FIG. 17(A) on the monitor 34 in step S61. In step S63, it is determined whether or not a friend setting is selected. That is, it is determined whether or not the button image 308 on the menu screen 300 is turned on.

If "YES" is determined in step S63, that is, if the friend setting is selected, friend setting processing (see FIG. 27 and FIG. 28) described later is executed in step S65, and the process proceeds to step S79. On the other hand, if "NO" is determined in step S63, that is, if the friend setting is not selected, it is determined whether or not a communication match-up is selected in step S67. That is, it is determined whether or not the button image 306 on the menu screen 300 is turned on.

If "NO" is determined in step S67, that is, if the communication match-up is not selected, the process proceeds to step S79 as it is. On the other hand, if "YES" is determined in step S67, that is, if the communication match-up is selected, the communication match-up submenu screen 500 as shown in FIG. 21 is displayed on the monitor 34 in step S69. In step S71, it is determined whether or not a friend is invited. That is, it is determined whether or not the button image 502 on the sub menu screen 500 is turned on. If "YES" is determined in step S71, that is, if a friend is invited, parent machine processing (see FIG. 29, described later) is executed in step S73, and the process proceeds to step S79.

However, if "NO" is determined in step S71, that is, if a friend is not invited, it is determined whether or not to participate in a communication game during inviting in step S75. That is, it is determined whether or not the button image 504 on the sub menu screen 500 is turned on. If "YES" is determined in step S75, that is, if it is determined to participate in the communication game during inviting, child machine processing (see FIG. 30) described later is executed in step S77, and then, the process proceeds to step S79. On the other hand, if "NO" is determined in step S75, that is, if it is determined not to participate in the communication game during inviting, the process proceeds to step S79 as it is.

Here, for simplicity, if "NO" in step S75, the process directly proceeds to step S79, but if the button image 506 is turned on, in the sub menu screen 500 as described above, the screen returns to the menu screen 300. Accordingly, after "NO" is determined in step S75, it is determined whether or not the screen returns to the menu screen 300, and if "YES", the process returns to step S61, and if "NO", the process proceeds to step S79.

In the step S79, it is determined whether or not other processing is to be executed. Here, it is determined whether or not the button image 302 or the button image 304 is turned on, in the menu screen 300, or it is determined whether or not a game processing by a single game apparatus 12 is executed if the button images 302, 304 have already been turned on, and so forth. If "NO" is determined in step S79, that is, if other processing is not executed, the process proceeds directly to step S83. On the other hand, if "YES" is determined in step S79, that is, if other processing is to be executed, in step S81, game processing by a single game apparatus 12 is started, advanced and so forth, and the process proceeds to step S83.

In step S83, it is determined whether or not the process is to be returned to the first. That is, it is determined whether or not the screen is to be returned to the menu screen 300. If "YES" is determined in step S83, that is, if the process is to be returned to the first, the process returns to step S61. On the other hand, if "NO" is determined in step S83, that is, if the process is not to be returned to the first, the released version game entire processing is ended as it is.

Although illustration is omitted, as in the first execution of the released version game entire processing, if the own profile ID is not registered, when it is determined that the communication match-up is selected in step S67, the processing in step S65 is forcedly executed to cause the player to register the own profile ID.

Figure 26:
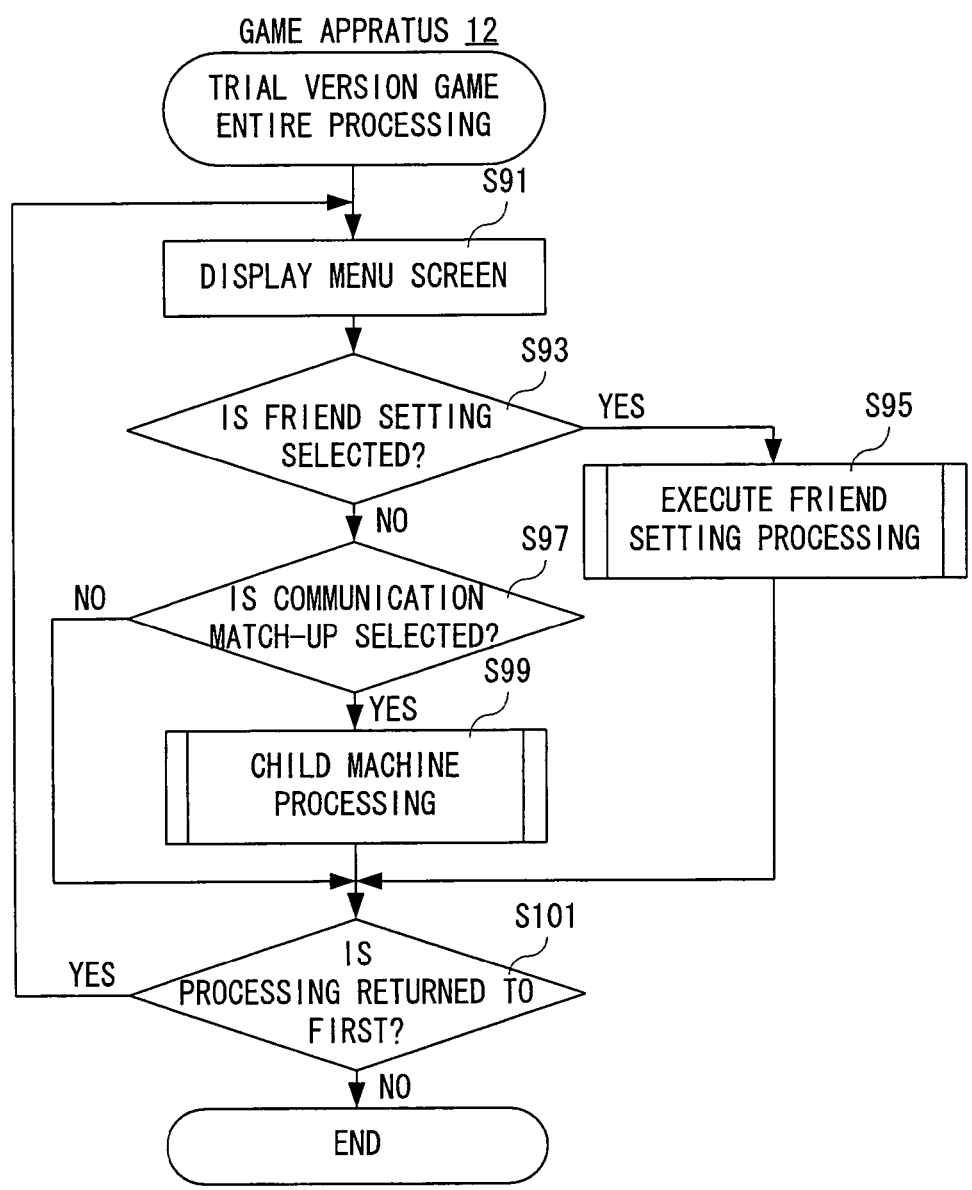
FIG. 26 is a flowchart showing trial version entire game processing of the game apparatus.

FIG. 26 is a flowchart showing the game's entire processing of the trial version by the game apparatus 12 (CPU 40). That is, the entire processing of the trial version game program is executed in the game apparatus 12 having the trial version game program 200'. When starting the trial version game entire processing, the CPU 40 displays the menu screen 300' as shown in FIG. 17(B) on the monitor 34 in step S91. In step S93, it is determined whether or not a friend setting is selected. That is, it is determined whether or not the button image 308 on the menu screen 300' is turned on.

If "YES" is determined in step S93, that is, if a friend setting is selected, friend setting processing (see FIG. 27 and FIG. 28) described later is executed in step S95, and the process proceeds to step S101. On the other hand, if "NO" is determined in step S93, that is, a friend setting not selected, the communication match-up is selected in step S97. That is, it is determined whether or not the button image 306 on the menu screen 300' is turned on.

If "NO" is determined in step S97, that is, if the communication match-up is not selected, the process directly proceeds to step S101. On the other hand, if "YES" is determined in step S97, that is, if the communication match-up is selected, child machine processing (see FIG. 30) described later is executed in step S99, and the process proceeds to step S101.

In step S101, it is determined whether or not the process is to be returned to the first. If "YES" is determined in step S101, that is, if the process is to be returned to the first, the process returns to step S91. On the other hand, if "NO" is determined in step S101, that is, if the process is not to be returned to the first, the trial version game entire processing is ended as it is.

Although illustration is omitted, if the own profile ID is not registered as in the first execution of the trial version game entire processing, when it is determined that the communication match-up is selected in step S97, the processing in step S95 is forcedly executed to cause the player to register the own profile ID.

Figure 27:
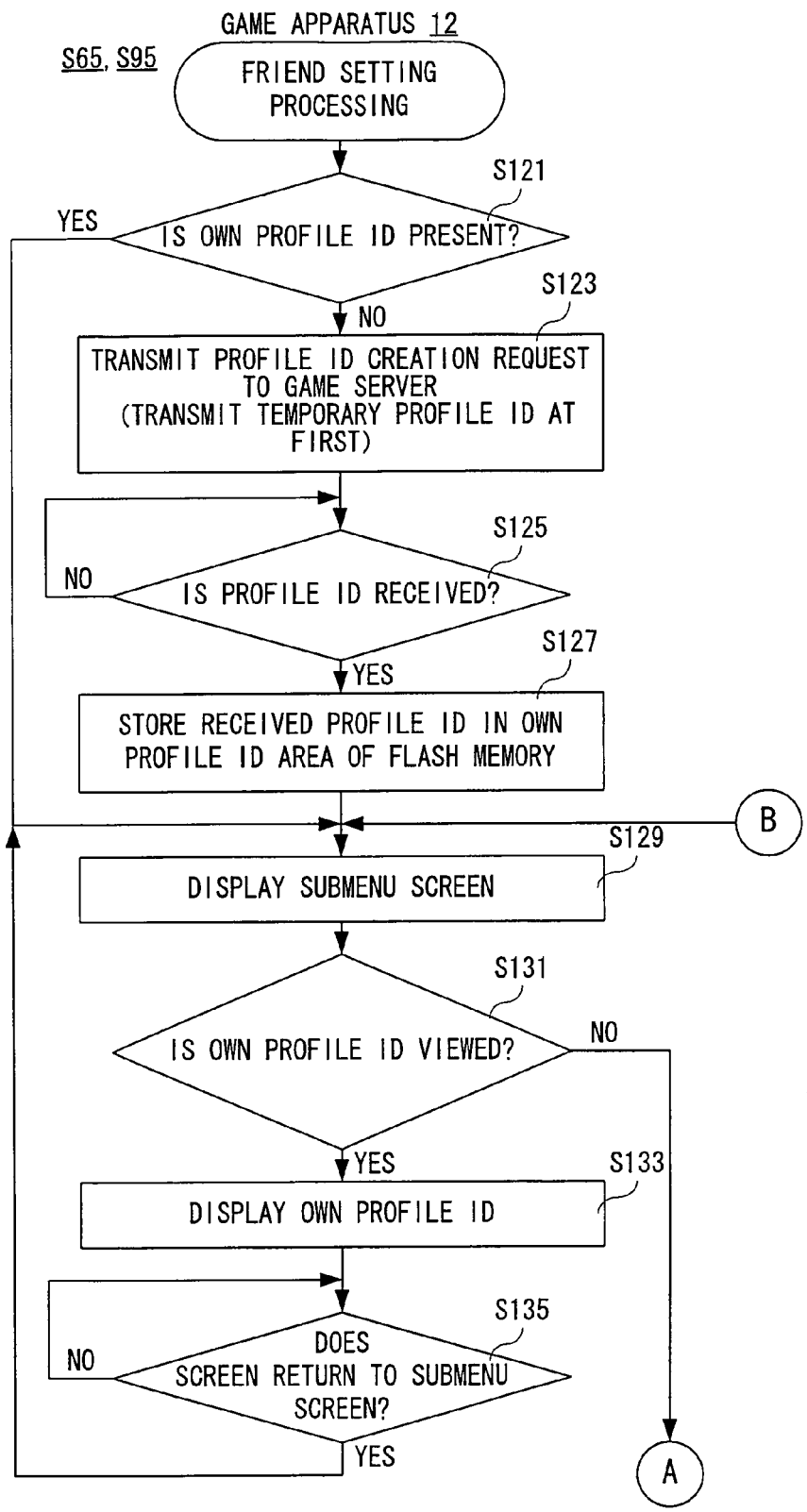
FIG. 27 is a flowchart showing a part of friend setting processing of the game apparatus.
Figure 28:
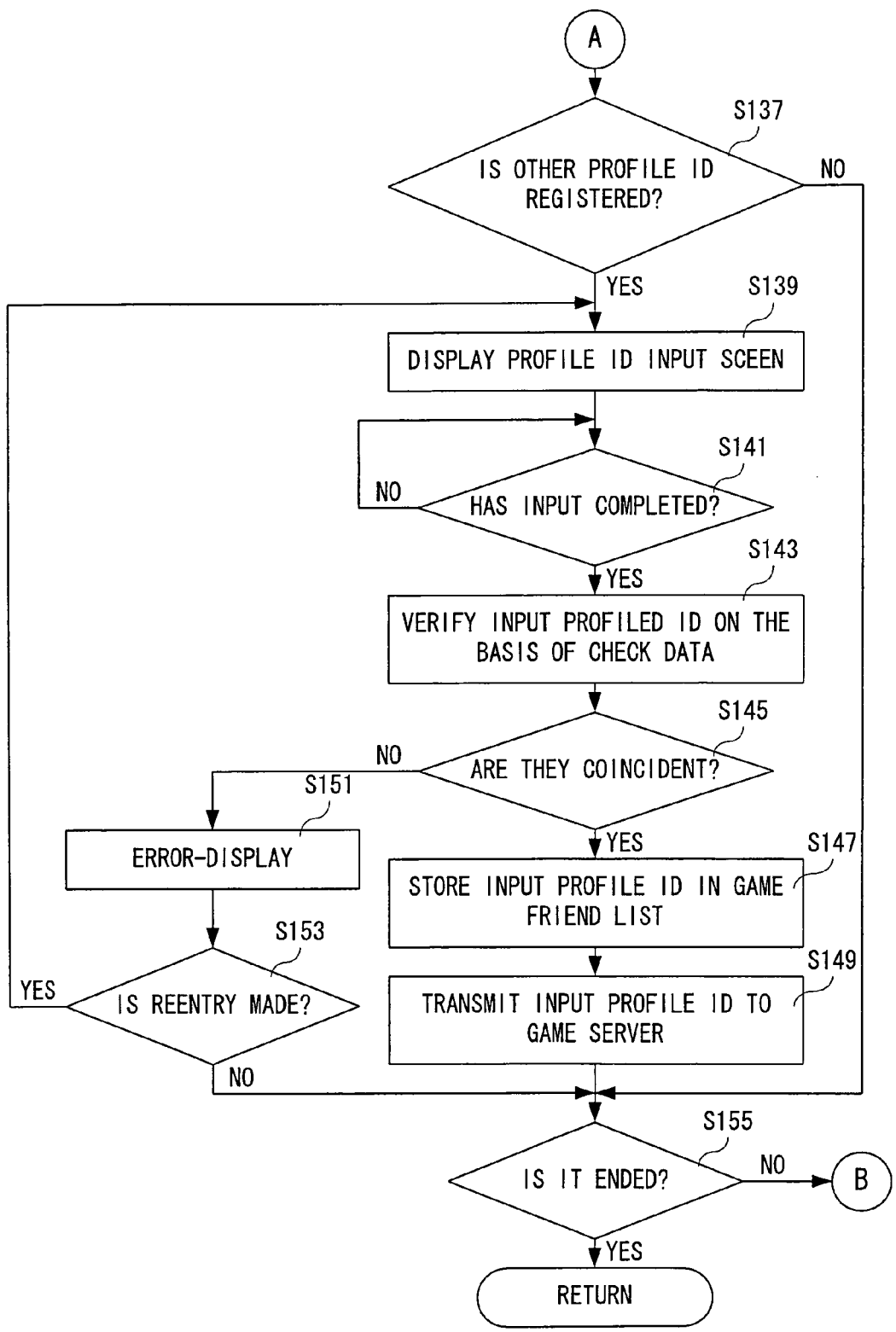
FIG. 28 is a flowchart showing another part of the friend setting processing of the game apparatus continuing from FIG. 27.

FIG. 27 and FIG. 28 are flowcharts of the friend setting processing of step S65 shown in FIG. 25 and step S95 shown in FIG. 26. Referring to FIG. 27, when starting the friend setting processing, the CPU 40 determines whether or not the own profile is present in step S121. Here, the CPU 40 determines whether or not a profile ID as to the game is stored in the management file 44c of the flash memory 44. As described above, the profile ID includes an application ID that can discern the game, so that if profile IDs as to a plurality of games are stored, it is easily discriminate one from another.

If "YES" is determined in step S121, that is, if the own profile ID is present, the process directly proceeds to step S129. On the other hand, if "NO" is determined in step S121, that is, if the own profile ID is not present, a creation request of the profile ID is transmitted to the game server 106 in step S123. For example, a temporary profile ID set (stored) in advance in the released version game program 200 or the trial version game program 200' is transmitted to the game server 106.

In step S125, it is determined whether or not the profile ID is received. If "NO" is determined in step S125, that is, if the profile ID is not received, the process returns to step S125. On the other hand, if "YES" is determined in step S125, that is, if the profile ID is received, the received profile ID is stored in the own profile ID area (management file 44c) of the flash memory 44 in step S127, and then, the process proceeds to step S129.

In step S129, the friend setting submenu screen 400 shown in FIG. 18 is displayed on the monitor 34. In step S131, it is determined that the own profile ID is to be viewed. That is, it is determined whether or not the button image 404 on the sub menu screen 400 is turned on. If "NO" is determined in step S131, that is, if the own profile ID is not viewed, the process proceeds to step S137 in FIG. 28.

However, if "YES" is determined in step S131, that is, if the own profile ID is viewed, the own profile ID is displayed in step S133. That is, the own-profile ID displaying screen 440 as shown in FIG. 19(B) is displayed on the monitor 34. At this time, at the display area 442, the own profile ID as to the game stored in the management file 44c is displayed. Then, in step S135, it is determined whether or not the screen is to be returned to the sub menu screen 400. More specifically, it is determined whether or not the button image 444 on the display screen 440 is turned on. If "NO" is determined in step S135, that is, if the screen is not to be returned to the sub menu screen 400, the process returns to step S135. On the other hand, if "YES" is determined in step S135, that is, the screen is returned to the sub menu screen 400, the process returns to step S129.

As shown in FIG. 28, in step S137, it is determined whether or not other person's profile ID is registered. That is, it is determined whether or not the button image 402 on the sub menu screen 400 is turned on. If "NO" is determined in step S137, that is, if other person's profile ID is not registered, the process directly proceeds to step S155. On the other hand, if "YES" is determined in step S137, that is, if other person's profile ID is registered, the game fiend's profile ID registration screen 420 as shown in FIG. 19(A) is displayed on the monitor 34 in step S139.

Succeedingly, in step S141, it is determined whether or not the input has been completed. Here, it is determined whether or not, on the registration screen 420, a name of a game friend is input to the entry field 422, a profile ID of the game friend is input to the entry field 424, and the button image 426 is turned on. If "NO" is determined in step S141, that is, if the input has not been finished, the process returns to step S141. On the other hand, if "YES" is determined in step S141, that is, if the input has been finished, the input profile ID is verified on the basis of the CRC checking data attached thereto in step S143.

In step S145, it is determined whether or not the verification result shows a coincidence. If "YES" is determined in step S145, that is, if the verification result shows the coincidence, by determining that the profile ID is correct, the input profile ID is stored in the game friend list in step S147, and the input profile ID is transmitted to the game server 106 in step S149, and then, the process proceeds to step S155.

In step S149, the input profile ID is registered as transmission data to be directed to the game server 106 in the transmission message box 44a, and may be transmitted to the game server 106 by message transmitting-receiving processing to be performed later.

If "NO" is determined in step S145, that is, if the verification result does not show the coincidence, an error display is executed in a step S151, and it is determined whether or not a reentry is to be executed in step S153. Although illustration is omitted, if the button image 426 is turned on without a name or a profile ID of a game friend or both being input on the registration screen 420, "NO" is determined in step S145. Although illustration is omitted, in step S151, a button image for selecting whether or not a reentry is executed is displayed on the monitor 34 together with a message showing the profile ID is not correctly input and questioning whether or not a reentry is to be executed (re-registered), for example. If "YES" is determined in step S153, that is, if the reentry is selected, the process returns to step S139. On the other hand, if "NO" is determined in step S153, that is, if the no-reentry is selected, the process proceeds to step S155.

In step S155, it is determined whether or not cancellation is to be made. That is, it is determined whether or not the button image 406 on the sub menu screen 400 is turned on. If "NO" is determined in step S155, that is, if cancellation is not to be made, the process directly returns to step S129 shown in FIG. 27. On the other hand, if "YES" is determined in step S155, that is, if cancellation is made, the process returns to the entire processing.

Although illustration is omitted, if "YES" is determined in step S155, a flag indicative of "returning to the first processing" is turned on (established). Accordingly, "YES" is determined in the step S83 in FIG. 25 or in the step S101 in FIG. 26, and the screen then returns to the menu screen 300 or the menu screen 300'. Thereafter, the flag indicative of "returning to the first processing" is turned off (unestablished).

Figure 29:
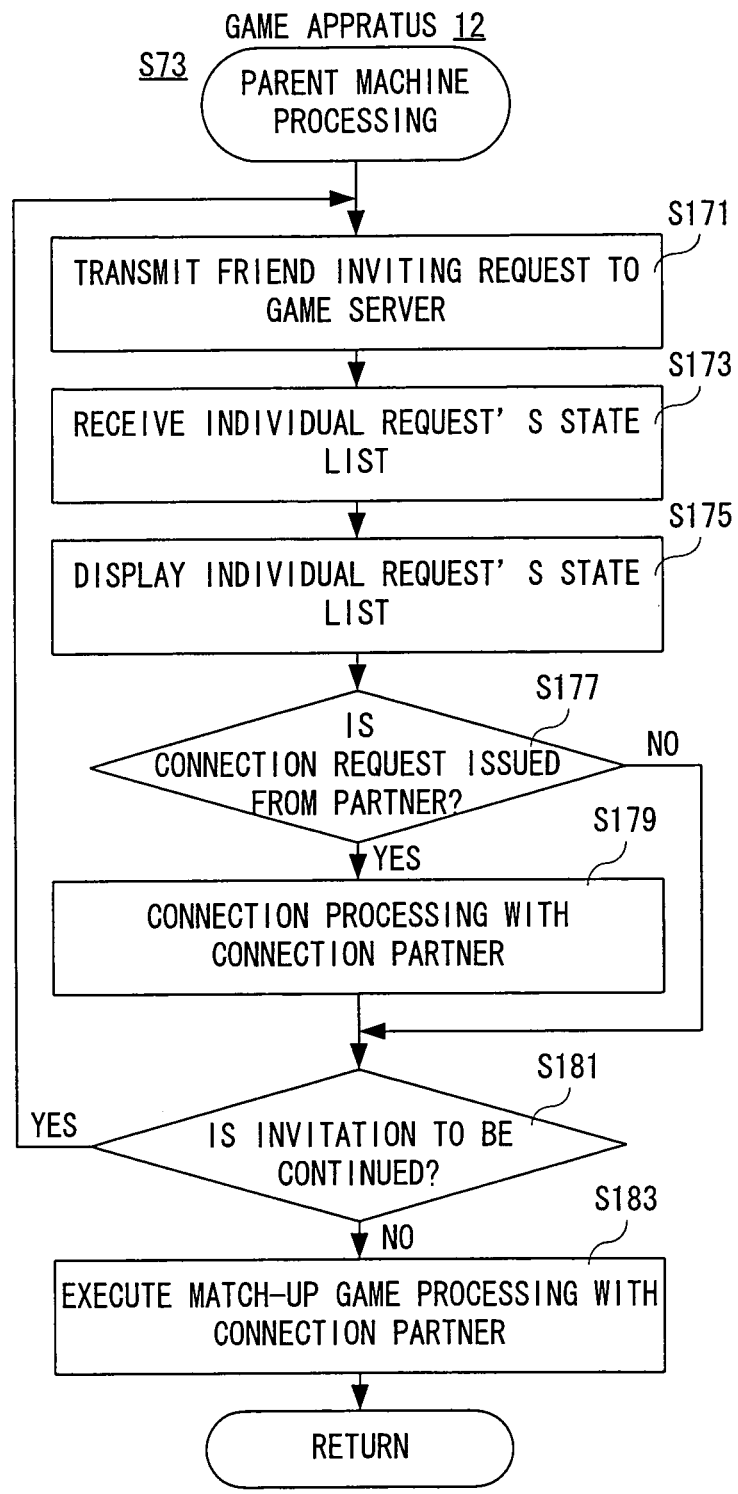
FIG. 29 is a flowchart showing parent machine processing of the game apparatus.

FIG. 29 is a flowchart showing parent machine processing in step S73 shown in FIG. 25. As shown in FIG. 29, starting a parent machine processing, the CPU 40 transmits a friend inviting request to the game server 106 in step S171. More specifically, the CPU 40 transmits the own profile ID stored in the management file 44c of the flash memory 44 along with the application ID (identification information of the game) and information of an invitation request to the game server 106. In step S173, the individual request's state list transmitted from the game server 106 is received, and in step S175, the received individual request's state list is displayed on the monitor 34.

Then, in step S177, it is determined whether or not a connection request from the partner exists. More specifically, it is determined whether or not a connection request from the game apparatus 12 belonging to the friend (player) registered in the game friend list is issued. Here, the determination whether the player registered in the game friend list or not is executed in the game server 106 as described later. Accordingly, if a connection request is issued, the partner (source of the request) is the player registered in the game friend list. Thus, in a case that a communication game is played with the game apparatus 12 from which a connection request is issued, it is possible to play it securely.

If "NO" is determined in step S177, that is, if a connection request from a partner is not issued, the process proceeds to step S181 as it is. On the other hand, if "YES" is determined in step S177, that is, if a connection request is issued from the partner, connection processing with the partner is executed in step S179, and the process proceeds to step S181. Although illustration is omitted, in step S179, a destination's address (IP address) is received from the connected partner to establish a connected state.

In step S181, it is determined whether or not the invitation is to be continued. The reason why the determination whether or not the invitation is to be continued is executed is that the invitation may be stopped by the player's instruction. The stop of the invitation is when no game apparatus 12 which desires to participate appears for a long time, participation of the player is closed at the desired number of persons in the communication game in which three or more persons are playable. Although illustration is omitted, prior to the processing in the step S181, a message saying that whether or not the invitation is to be continued and a button image for selecting any one of them are displayed on the monitor 34.

If "YES" is determined in step S181, that is, if the invitation is to be continued, the process returns to step S171. That is, the continuation of the invitation is notified to the game server 106. On the other hand, if "NO" is determined in step S181, that is, if the invitation is stopped, match-up game (communication game) processing with the connection partner is executed in step S183, and after completion of the communication game, the process returns to the entire processing.

Although illustration is omitted, if the invitation is stopped without any connection request from a connection partner, the CPU 40 directly returns to the entire processing without executing the processing in step S183.

Although illustration is also omitted, when the process returns to the entire processing after end of the parent machine processing, the flag indicative of "returning to the first processing" is turned on (established). Accordingly, "YES" is determined in step S83 in FIG. 25, and the screen returns to the menu screen 300. Thereafter, the flag indicative of "returning to the first processing" is turned off (unestablished).

Figure 30:
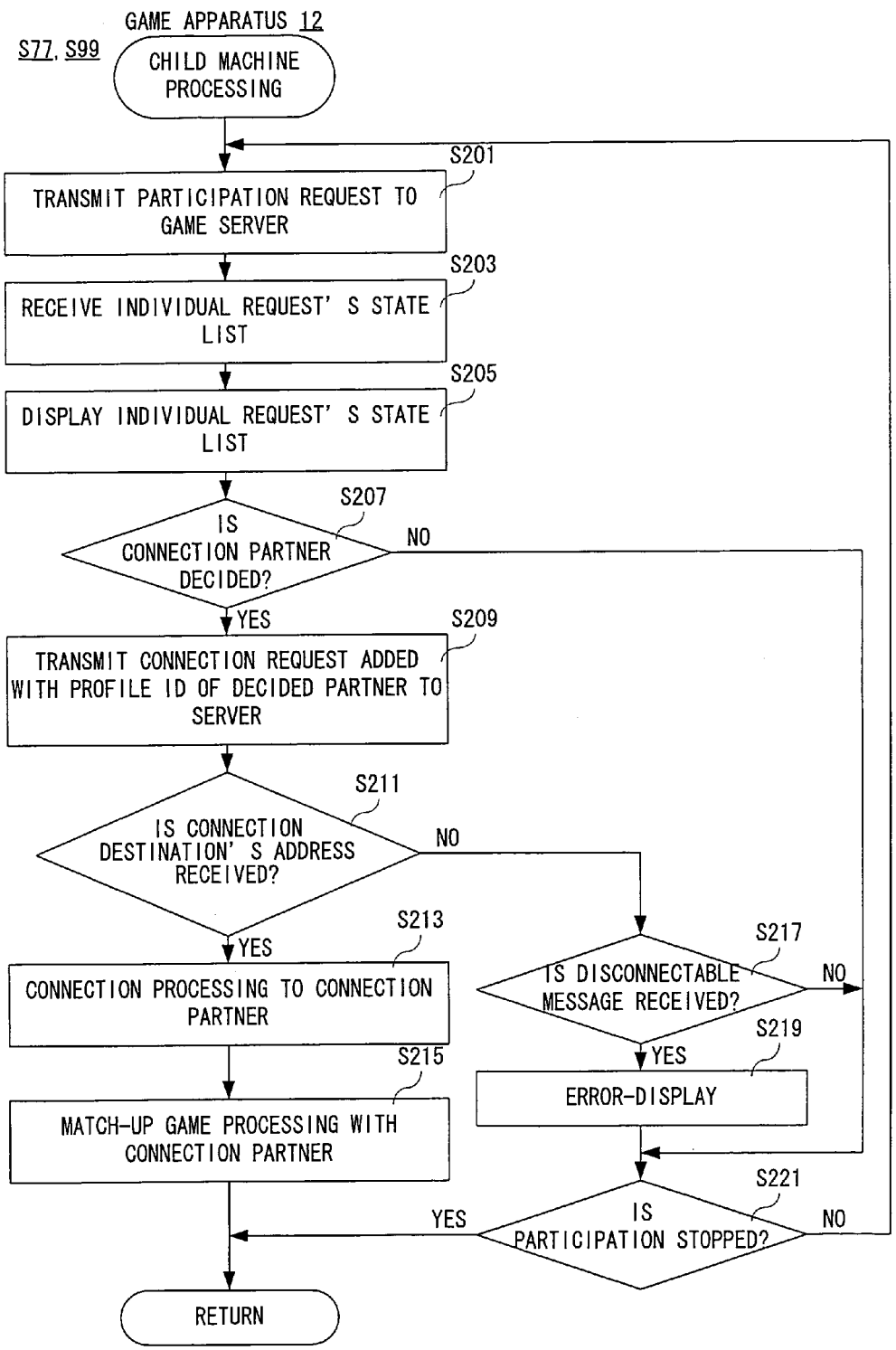
FIG. 30 is a flowchart showing child machine processing of the game apparatus.

FIG. 30 is a flowchart of the child machine processing in step S77 shown in FIG. 25 and in step S99 shown in FIG. 26. As shown in FIG. 30, when starting the child machine processing, the CPU 40 transmits a participation request to the game server 106 in step S201. More specifically, the CPU 40 transmits the own profile ID stored in the management file 44c of the flash memory 44 along with the application ID (identification information of the game) and information of a participation request to the game server 106.

In step S203, the individual request's state list transmitted from the game server 106 is received, and in step S205, the received individual request's state list is displayed. More specifically, the display screen 600 of the request's state list as shown in FIG. 22 is displayed on the monitor 34. Then, in step S207, it is determined whether or not a connection partner is decided. Here, it is determined whether or not the player decides a connection partner on the display screen 600.

If "NO" is determined in step S207, that is, if the connection partner is not decided, the process directly proceeds to step S221. On the other hand, if "YES" is determined in step S207, that is, if the connection partner is decided, a connection request added with the profile ID of the determined partner is transmitted to the server in a step S209. Here, the CPU 40 searches the profile ID of the decided partner from the game friend list stored in the save area 44f of the flash memory 44.

Succeedingly, in step S211, it is determined whether or not a connection destination's address is received from the game server 106. That is, it is determined whether or not an IP address of the game apparatus 12 of the decided partner is received. If "YES" is determined in step S211, that is, if a connection destination's address is received, connection processing to the connection partner is executed in step S213. Here, the CPU 40 transmits a connection request (own IP address) to the connection destination's address (parent machine's IP address). Then, in step S215, match-up game (communication game) is executed with the connection partner, and the process returns to the entire processing after completion of the communication game.

Alternatively, if "NO" is determined in step S211, that is, if the connection destination's address is not received, it is determined whether or not a disconnectable message is received in step S217. As described later, if the profile ID of the game apparatus 12 (child machine) is not registered in the game friend list as to the game apparatus 12 (parent machine) having the profile ID transmitted in step S209, the game server 106 transmits a disconnectable message directed to the child machine. That is, it is impossible to play a communication game between persons who are not friends or are not acquainted with each other.

If "NO" is determined in step S217, that is, if a disconnectable message is not received, the process directly proceeds to step S221. On the other hand, if "YES" is determined in step S217, that is, if a disconnectable message is received, an error display is executed in step S219, and then, the process proceeds to step S221. In step S219, a message saying whether or not the participation is stopped and a button image for selecting any one of them are displayed on the monitor 34 together with a message saying that it is impossible to play a communication game with the decided (desired) partner.

In step S221, it is determined whether or not the participation is stopped. If "NO" is determined in step S221, that is, if the participation is not stopped, the process returns to step S201. On the other hand, if "YES" is determined in step S221, that is, if the participation is stopped, the process directly returns to the entire processing.

Although illustration is omitted, if the process returns to the entire processing after the end of the child machine processing, the flag indicative of "returning to the first processing" is turned on (established). Accordingly, "YES" is determined in step S83 in FIG. 25 or in the step S101 in FIG. 26, and the screen returns to the menu screen 300 or the menu screen 300'. Thereafter, the flag indicative of "returning to the first processing" is turned off (unestablished).

Figure 31:
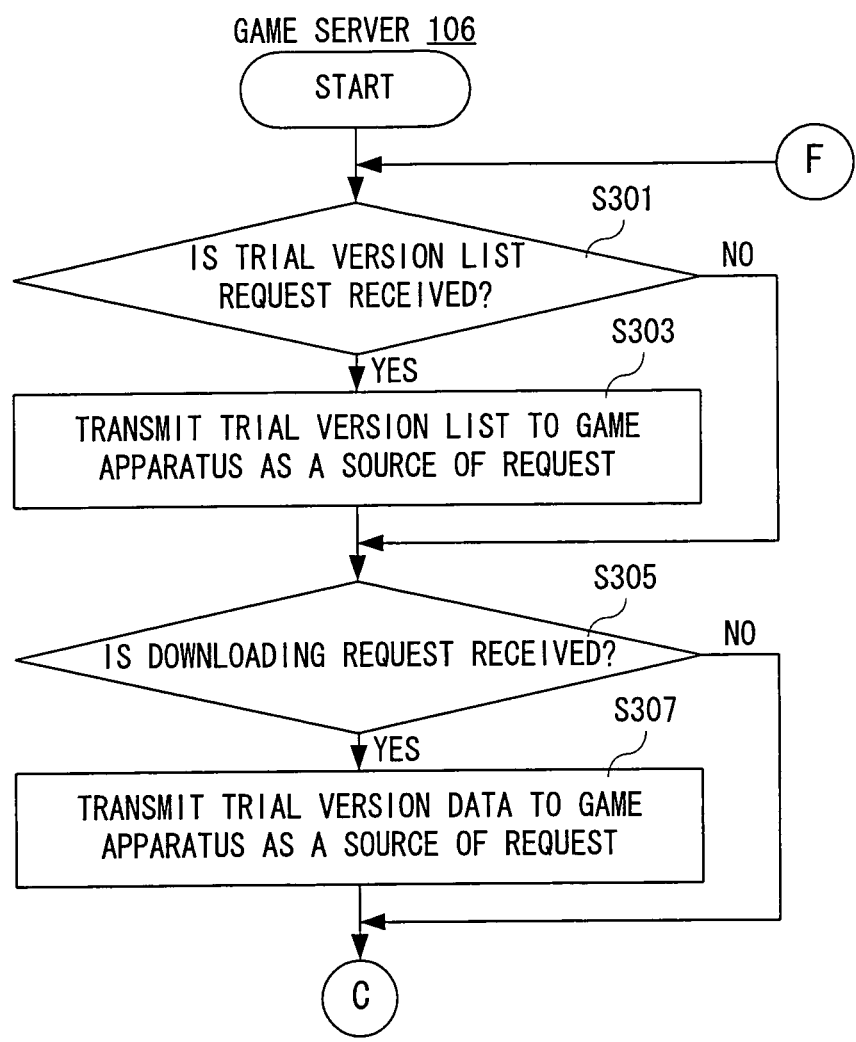
FIG. 31 is a flowchart showing a part of a whole processing of the game server.

FIG. 31-FIG. 34 is a flowchart showing entire processing of the CPU (not illustrated) of the game server 106. As shown in FIG. 31, when starting the entire processing, the CPU of the game server 106 determines whether or not a request of the trial version list is received in step S301. If "NO" is determined in step S301, that is, if the trial version list request is not received, the process proceeds to step S305 as it is. On the other hand, if "YES" is determined in step S301, that is, if a trial version list request is received, a trial version list is transmitted to the game apparatus 12 as a source of the request in step S303, and the process proceeds to step S305.

In the step S305, it is determined whether or not a downloading request is received. If "NO" is determined in step S305, that is, if a downloading request is not received, the process directly proceeds to step S309 shown in FIG. 32. On the other hand, if "YES" is determined in step S305, that is, if a downloading request is received, the requested trial version data, that is, the trial version game program 200' is transmitted to the game apparatus 12 as a source of the request in step S307, and the process proceeds to step S309.

Although illustration is omitted, if the released version game program 200 is sold via downloading, the processing similar to steps S301-S307 is executed during the entire processing of the game server 106.

Figure 32:
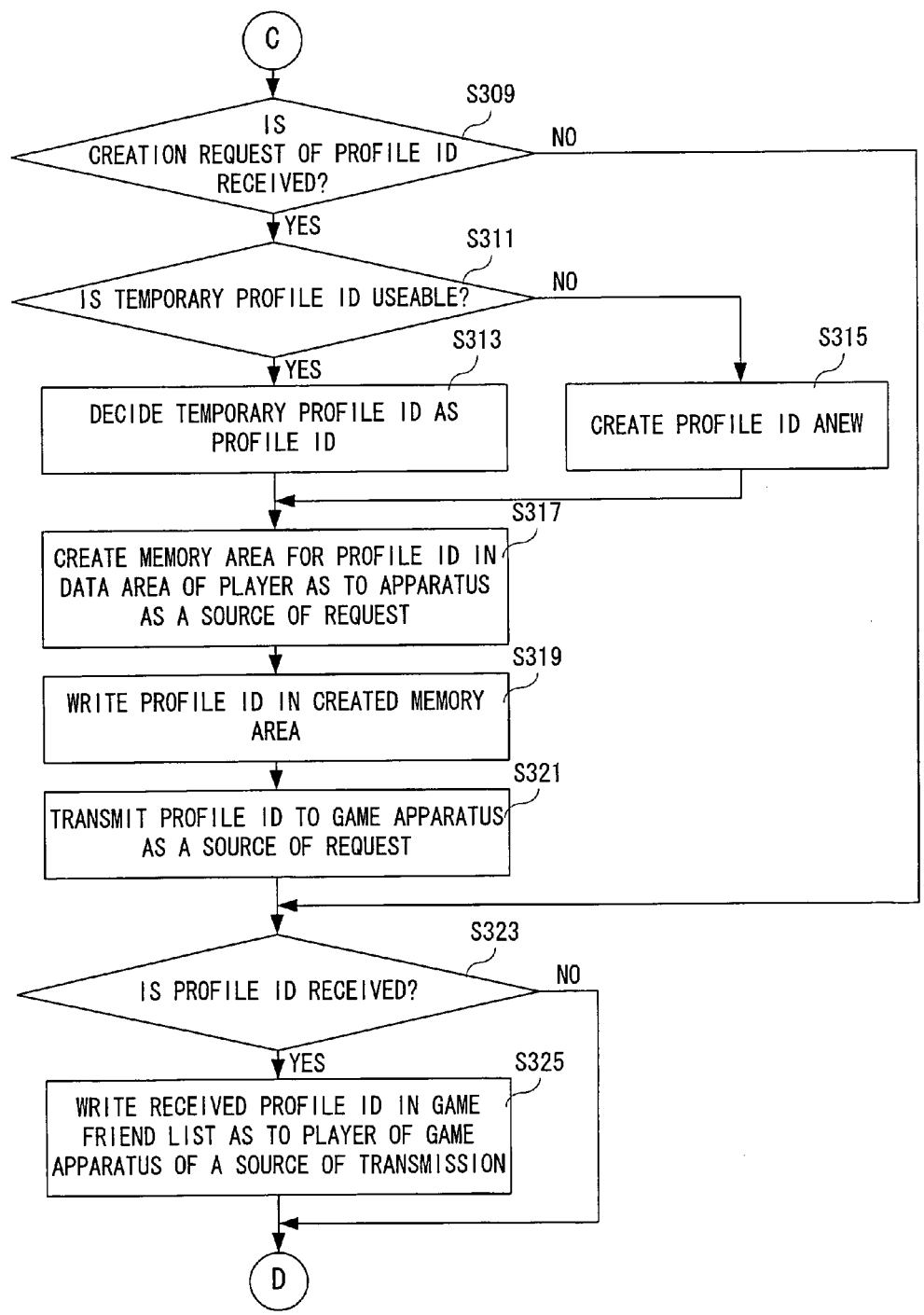
FIG. 32 is a flowchart showing another part of the whole processing of the game server continuing from FIG. 31.

In step S309 shown in FIG. 32, it is determined whether or not a creation request of a profile ID, that is, a temporary profile ID is received. If "NO" is determined in step S309, that is, if a temporary profile ID is not received, the process directly proceeds to step S323. On the other hand, if "YES" is determined in step S309, that is, if the temporary profile ID is received, it is determined whether or not the temporary profile ID is useable in step S311. Here, the game server 106 determines whether or not a profile ID, which may be the same as the received temporary profile ID, is stored with reference to the memory area (130, 132, . . . ) as to the game within the game-specific player data memory area 122 in the database. Then, if a profile ID is the same as the received temporary profile ID that is stored, the game server 106 determines that it is possible to use the temporary profile ID, whereas if a profile ID is not the same as the received temporary profile ID that is stored, it is determined that the temporary profile is useable.

If "YES" is determined in step S311, that is, if the temporary profile ID is useable, the temporary profile ID is decided as a profile ID, and the process proceeds to step S317. On the other hand, if "NO" is determined in step S311, that is, if the temporary profile is useable, a profile ID is created anew in step S315, and then, the process proceeds to step S317. However, as to the profile ID, the MAC address of the main body and the game code (application ID) are fixed, and therefore, in step S315, the random number and the CRC checking data added to the profile ID are changed.

In step S317, a memory area for the profile ID is created in the data area (memory area as to the player of the game apparatus 12 as the source of the request provided in the game-specific player data memory area 122) as to the player of the game apparatus 12 as a source of the request. Succeedingly, in step S319, the profile ID is written in the created memory area, and in a step S321, the profile ID is transmitted to the game apparatus 12 as a source of the request.

Succeedingly, in step S323, it is determined whether or not a profile ID is received. If "NO" is determined in step S323, that is, if the profile ID is not received, the process proceeds to step S327 shown in FIG. 33. On the other hand, if "YES" is determined in step S323, that is, if the profile ID is received, the received profile ID is written to the game friend list as to the player as a transmission source in step S325, and the process proceeds to step S327.

Figure 33:
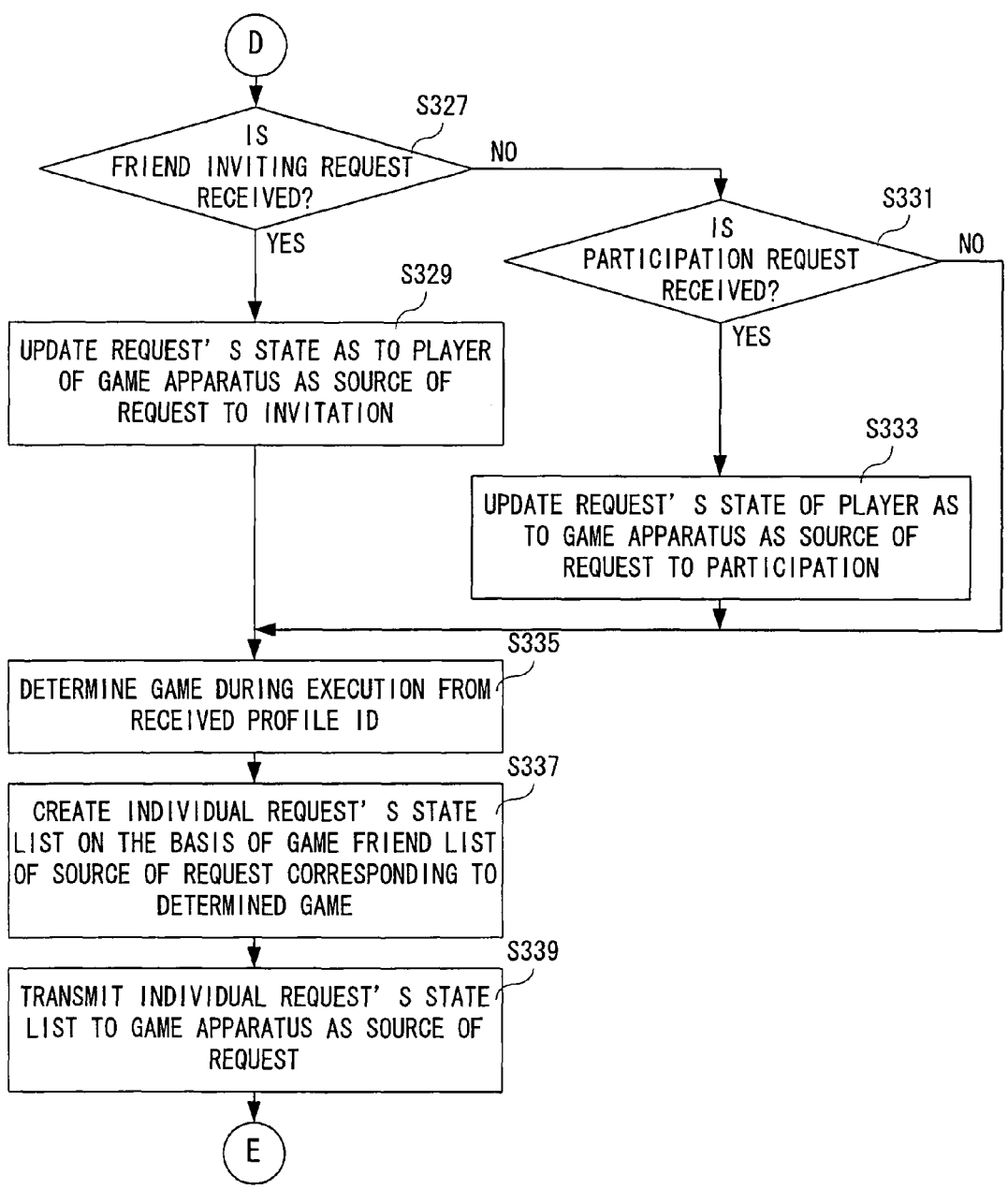
FIG. 33 is a flowchart showing a still another part of the whole processing of the game server continuing from FIG. 32.

As shown in FIG. 33, in step S327, it is determined whether or not a friend inviting request is received. If "YES" is determined in step S327, that is, if the friend invitation request is received, a request's state of the game apparatus 12 as a source of the request is updated to the invitation in a step S329, and the process proceeds to step S335. That is, in step S329, the CPU of the game server 106 updates the request's state as to the player of the game apparatus 12 as a source of the request to the invitation in the whole request's state list 124a stored in the whole request's state list memory area 124.

If "NO" is determined in step S327, that is, if a friend invitation is not received, it is determined whether or not a participation request is received in step S331. If "NO" is determined in step S331, that is, if the participation request is not received, the process directly proceeds to step S335. On the other hand, if "YES" is determined in step S331, that is, if the participation request is received, a request's state as to the player of the game apparatus 12 as a source of the request is updated to the participation in step S333, and the process proceeds to step S335. That is, in step S333, the CPU of the game server 106 updates the request's state as to the player of the game apparatus as a request source to the participation in the whole request's state list 124a stored in the whole request's state list memory area 124.

In step S335, the game (communication game) during execution is determined from the received profile ID, and in step S337, an individual request's state list as to the communication game determined in step S335 is created on the basis of the game friend list of the source of the request. That is, in step S337, a player which plays the same communication game as the game apparatus 12 as the source of the request out of the players described in the game friend list as to the player of the game apparatus 12 as a source of the request and the request's state are extracted referring to the whole request's state list 124a to thereby create an individual request's state list to be offered to the player of the game apparatus 12 as a source of the request. Then, in step S339, the individual request's state list is transmitted to the game apparatus 12 as a source of the friend inviting request or the participation request.

Figure 34:
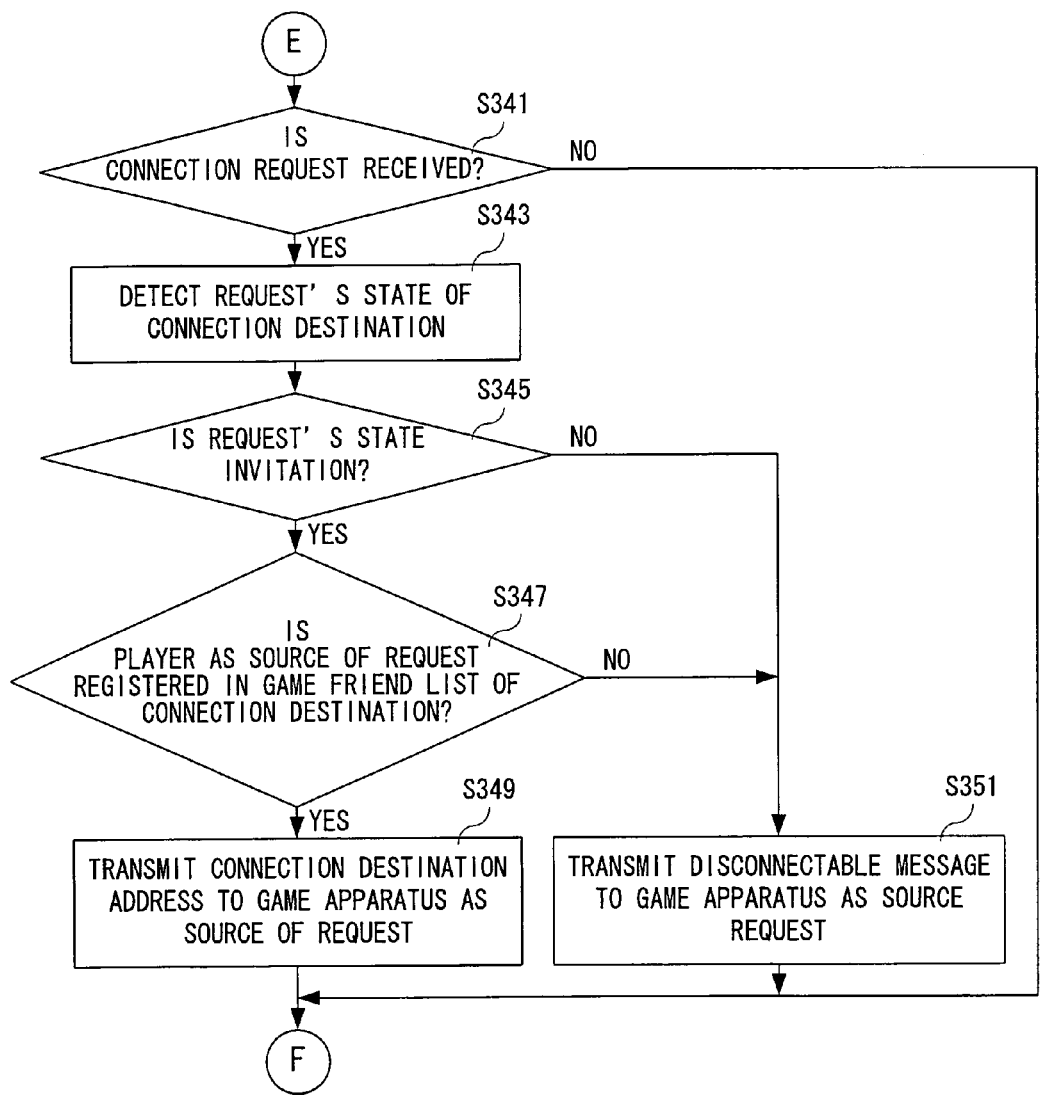
FIG. 34 is a flowchart showing a further part of the whole processing of the game server continuing from FIG. 33.

Succeedingly, in step S341 shown in FIG. 34, it is determined whether or not a connection request is received. If "NO" is determined in step S341, that is, if a connection request is not received, the process directly returns to step S301 shown in FIG. 31. On the other hand, if "YES" is determined in step S341, that is, if the connection request is received, a request's state of a connection destination is detected in step S343. That is, in step S343, the CPU of the game server 106 detects the request's state of the player as to the game apparatus 12 as a connection destination referring to the whole request's state list 124a.

In step S345, it is determined whether or not the request's state is an invitation. If "NO" is determined in the step S345, that is, if the request's state is not the invitation, a disconnectable message is transmitted to the game apparatus 12 as a source of the request in step S351, and the process returns to step S301. On the other hand, if "YES" is determined in step S345, that is, if the request's state is the invitation, it is determined whether or not the player of the connection source (source of the connection request) is registered in the game friend list of the connection destination in step S347. Here, the CPU of the game server 106 determines whether or not a player (profile ID) of the game apparatus 12 as a connection source is registered in the game friend list with reference to the game friend list as to the player of the game apparatus 12 as a connection destination.

However, whether or not the profile ID of the game apparatus 12 (player) as a connection destination is registered in the game friend list of the game apparatus 12 (player) as a connection source need not to be checked. The reason why is that in the individual request's state list, the game apparatuses 12 (player) having the profile ID registered in the game friend list of the game apparatus 12 as connection sources are described, and a game apparatus 12 (player) as a connection destination is selected from here.

If "NO" is determined in step S347, that is, if the player as a connection source is not registered in the game friend list of the connection destination, the process directly proceeds to step S351. On the other hand, if "YES" is determined in step S347, that is, if the player of the connection source is registered in the game friend list of the connection destination, a connection destination's address (IP address of the parent machine as a connection destination in this illustrative embodiment) is transmitted to the game apparatus 12 as the source of the request in step S349, and the process returns to step S301.

According to this illustrative embodiment, the second game apparatus having a trial version game program delivered for free can play a communication game only with the first game apparatus having a released version game program corresponding thereto, and registering the second game apparatus in the game friend list. That is, the released version game program is not required, so that it is possible to experience the communication game for free. Furthermore, the communication game can be played only with the partner (with which the profile ID is exchanged and registered) registered in the game friend list, so that it is possible to realize a network game in which players can easily participate in comparison with a case that a communication game is played among unspecified players.

Additionally, according to this illustrative embodiment, the trial version game program is provided with a game program and data necessary for the communication game, so that it is possible to perform a communication game between the game apparatus having the released version game program and the game apparatus having the trial version game program.

In this embodiment, when the second game apparatus having the trial version game program transmits a connection request to the game server, the game server determines whether or not a connection is possible with reference to the game friend list as to the first game apparatus indicated by the connection request. However, identification information inherent to each of the released version game program and the trial version game program are contained, and whether the game program belonging to the game apparatus as a destination of the request is the released version game program or the trial version game program is determined on the basis of the identification information, so that whether a connection is possible or not may be determined. This makes it possible to easily determine whether a connection is possible or not, and prevents the second game apparatuses having the trial version game programs from being erroneously connected with each other. This holds true for the released version game program, and identification information inherent to each of the released version game program is contained, so that, whether or not an invitation request is possible can easily be determined on the basis of the identification information.

Furthermore, in this illustrative embodiment, profile IDs can be notified by transmitting and receiving messages between the players each is registered in each-other's main-body's friend lists as described above. Thus, when the game apparatus registers the own profile ID, for example, the message including the profile ID are transmitted to the game apparatuses of all the players registered in the main-body's friend list, and when a message including the profile ID transmitted from other game apparatus is received, if the profile ID included in the message is registered in the game friend list, it is possible to automatically exchange the profile ID and register it in the game friend list.

In addition, in this illustrative embodiment, the trial version game program is stored in the game server in advance. However, the trial version game program may be included in the released version game program, the trial version game program is uploaded from the game apparatus having the released version game program to the game server, and whereby, the uploaded trial version game program may be delivered to the game apparatuses of the players registered in the game friend list of the game apparatus having the released version game program.

Furthermore, although only the network game system utilizing a video game system separately provided with a game apparatus and a monitor is described in this embodiment, it is not limited thereto. In place of the game system, it is possible to utilize a versatile computer with a game function, a handheld type game apparatus integrally formed with a game apparatus and a monitor, a mobile terminal like a cellular phone, a PC, a PDA, or the like having a game function.

Although the illustrative embodiments have been described and illustrated in detail, it is clearly understood that the same is by way of illustration and example only and is not to be taken by way of limitation. The spirit and scope of the present invention is to be limited only by the terms of the appended claims.

What is claimed is:

1. A network game system comprising a plurality of game apparatuses and a server, where each of the plurality of game apparatuses are capable of communicating with the server via a network, wherein the plurality of game apparatuses includes a first game apparatus having a released version game program for executing a predetermined game and a second game apparatus having a trial version game program corresponding to said released version game program, said first game apparatus includes:
  a connection accepting programmed logic circuitry for performing a connection acceptance to permit a connection from said second game apparatus on said server, said second game apparatus includes:
  a connection requesting programmed logic circuitry for performing a first connection request to said first game apparatus on said server by executing said trial version game program,
  a connection information receiving programmed logic circuitry for receiving connection permission information from said server, and
  a communication game processing programmed logic circuitry for, when the connection permission information is received by said connection information receiving programmed logic circuitry, performing a communication game on the basis of said trial version game program by making communications with the first game apparatus indicated by said connection permission information, said server includes:
  connection acceptance determining programmed logic circuitry for determining whether or not said first game apparatus performs the connection acceptance when the first connection request is received from said second game apparatus,
  connection permission information transmitting programmed logic circuitry for, when it is determined by said connection acceptance determining programmed logic circuitry that the connection acceptance is performed, transmitting the connection permission information relating to said first game apparatus which at least performs said connection acceptance to said second game apparatus which has preformed said first connection request, and
  a game version determination programmed logic circuitry that, in response to a second connection request from the second game apparatus, determines a game version associated with the second connection request, and when the game version for a third game apparatus, that is not the second game apparatus, associated with the second connection request is determined to be the trial version game program, denies the second connection request from the second game apparatus to the third game apparatus that is associated with the second connection request.

2. The network game system according to claim 1, wherein said plurality of game apparatuses each further includes an other machine identification information transmitting programmed logic circuitry for transmitting identification information to identify at least one other game apparatus to said server, said server further includes:
  an other machine identification information registering programmed logic circuitry for writing the identification information received from each game apparatus of the plurality of game apparatuses to an other machine identification information storing area assigned for each game apparatus of the plurality of game apparatuses, and
  a registration determining programmed logic circuitry for determining whether or not the identification information of said second game apparatus which has performed said first connection request is registered in the other machine identification information storing area as to said first game apparatus which performs said connection acceptance when it is determined by said connection acceptance determining programmed logic circuitry that the connection acceptance is performed, wherein
  said connection permission information transmitting programmed logic circuitry transmits the connection permission information to said second game apparatus when it is determined by said registration determining programmed logic circuitry that the identification information of said second game apparatus is registered.

3. The network game system according to claim 2, wherein said server further comprises:
  a selection information transmitting programmed logic circuitry for transmitting selection information, which includes the identification information registered in said other machine identification information storing area as to said second game apparatus, is to said second game apparatus when said server accepts the first connection request from said second game apparatus, and
  an identification information receiving programmed logic circuitry for receiving the identification information notified from said second game apparatus, said second game apparatus further includes:
  a selection information receiving programmed logic circuitry for receiving said selection information, and
  a connection partner notifying programmed logic circuitry for notifying to said server the identification information of said first game apparatus selected on the basis of the selection information received by said selection information receiving programmed logic circuitry, wherein
  said registration determining programmed logic circuitry determines whether or not the identification information of said second game apparatus which has notified the said identification information is registered in said other machine identification information storing area as to the first game apparatus indicated by the identification information received by said identification information receiving programmed logic circuitry.

4. The network game system according to claim 3, wherein said server further includes:
a connection state setting programmed logic circuitry for setting a connection state of said first game apparatus to a connectable state when receiving a connection acceptance from said first game apparatus, setting a connection state of said second game apparatus to a connection requesting state when receiving a connection request from said second game apparatus, wherein
said selection information further includes a connection state of another game apparatus, and
said second game apparatus further includes other machine information displaying programmed logic circuitry for displaying another game apparatus and a connection state of said other game apparatus on the basis of said selection information.

5. The network game system according to claim 3, wherein said identification information further includes game kind information for identifying a kind of a game,
said connection requesting programmed logic circuitry transmits an own identification information to said server as said first connection request,
said selection information transmitting programmed logic circuitry transmits the selection information in which the identification information including the same game kind information as the game kind information included in the identification information transmitted from said connection requesting programmed logic circuitry and registered in said other machine identification information storing area as to said second game apparatus is at least made selectable on the side of said second game apparatus to said second game apparatus.

6. The network game system according to claim 1, wherein said trial version game program is a communication game processing program being a part of said released version game program.

7. A game apparatus capable of communicating with a server via a network, comprising:
a processing system that includes at least one processor, the processing system configured to:
send a connection request to a second game apparatus that has a released version game program corresponding to a trial version game program on said server by executing said trial version game program;
receive connection permission information from said server; and
in accordance with reception of the connection permission information from the server, perform a communication game on the basis of said trial version game program by communicating with the second game apparatus indicated by said connection permission information,
wherein another connection request from the game apparatus to a third game apparatus is denied when the third game apparatus has a trial version game program and not the released version game program.

8. A non-transitory computer readable storage medium storing computer-readable instructions for use with a first game apparatus capable of communicating with a server via a network, the stored instructions including a trial version of a predetermined game program, the stored instructions comprising instructions that cause the first game apparatus to:
send a connection request to the server, the connection request including information on a second game apparatus that is set to have a released version of the predetermined game program, the released version and the trial version of the predetermined game program associated with each other on said server;
accept connection permission information from said server;
connect to the second game apparatus based on the received connection permission information;
execute a communication game of the predetermined game program by transmitting and receiving data with the second game apparatus indicated by said connection permission information;
send another connection request to the server, requesting a connection to another game apparatus to play the predetermined game program; and
accept a notification from the server denying the another connection request to the another game apparatus when the another game apparatus has the trial version of the predetermined game program.

9. A game controlling method for a game apparatus capable of communicating with a server via a network, the method comprising:
(a) performing, by using a computer processor of the game apparatus, a connection request to a second game apparatus having a released version game program corresponding to a trial version game program on said server by executing said trial version game program, wherein the trial version game program has a partial subset of functions provided by the released version game program,
(b) receiving connection permission information from said server, and
(c) performing a communication game on the basis of said trial version game program by making communications with the second game apparatus indicated by said connection permission information when the connection permission information is received by (b),
wherein the game apparatus is prohibited from communicating with a third game apparatus that has the trial version game program.

10. A server which is configured to communicate with a plurality of game apparatuses, the plurality of game apparatuses including a first game apparatus and a second game apparatus, the first game apparatus having a first game version program and the second game apparatus having a second game version program, the second game version program having only a partial subset of functions provided by the first game version program, the server comprising:
a communications module operable to communicate with the plurality of game apparatuses; and
a processing system that includes one or more processors, the processing system configured to:
receive a connection request from the second game apparatus that has the second game version program, the connection request including data requesting connection to the first game apparatus;
determine whether or not a connection acceptance has been received from the first game apparatus after the connection request is received from the second game apparatus;
transmit, to the second game apparatus, connection permission information relating to the first game apparatus when it is determined that the connection acceptance has been received from the first game apparatus; and
deny another connection request when a requesting game apparatus is associated with the second game version and a destination game apparatus is also associated with the second game version.

11. The server of claim 10, wherein the server is further configured to:
   write identification information received from each of the first and second game apparatuses to a storage area assigned for the other of the first and second game apparatuses;
   determine whether or not the identification information of said second game apparatus is written in the storing area assigned to said first game apparatus when the connection acceptance has been received; and
   transmit the connection permission information to said second game apparatus when it is determined that the identification information of the second game apparatus has been written in the storage area assigned for the first game apparatus.

12. The server according to claim 11, wherein said server is further configured to transmit selection information in which the identification information written in said storing area assigned to the first game apparatus as to said second game apparatus is at least made selectable on the side of said second game apparatus to said second game apparatus when said server accepts the connection request from said second game apparatus.

13. The server according to claim 12 wherein said selection information further includes a connection state of another game apparatus.

14. The server according to claim 10, wherein the server is further configured to transmit the first game version program to the first game apparatus and transmit the second game version program to the second game apparatus.

15. The system of claim 1, wherein the released version game program and the trial version game program are different, but interoperable, versions of a game program.

16. The medium of claim 8, wherein the released version of the predetermined game program and the trial version of the predetermined game program are different versions of the predetermined game program.

17. The game apparatus of claim 7, wherein the released version game program and the trial version game program are different, but interoperable, versions of a game program.

18. The system of claim 1, wherein performance of the communication game between the first game apparatus and the second game apparatus is done via peer-to-peer communication between the first and second game apparatuses.

19. The apparatus of claim 7, wherein the performance of the communication game between the game apparatus and the second game apparatus is done independently of communications with the server.

20. The server of claim 10, wherein communication between the first and second game apparatus for performing functionality associated with the partial subset of the functions is done independently of communication with the server.

21. The medium of claim 8, wherein execution of the communication is performed via a direct connection between the first game apparatus and the second game apparatus.

* * * * *